United States Patent
Azimi et al.

(10) Patent No.: US 12,305,260 B2
(45) Date of Patent: May 20, 2025

(54) METHODS FOR RECOVERING A TARGET METAL FROM IRON OR STEEL SLAG USING AT LEAST ONE OF A CARBOTHERMIC REDUCTION PROCESS AND A PYRO-HYDROMETALLURGICAL PROCESS

(71) Applicants: THE GOVERNING COUNCIL OF THE UNIVERSITY OF TORONTO, Toronto (CA); TENOVA GOODFELLOW INC., Mississauga (CA)

(72) Inventors: Gisele Azimi, Toronto (CA); Jihye Kim, Toronto (CA); Vittorio Scipolo, Etobicoke (CA); Enrico Malfa, Zanica (IT)

(73) Assignees: THE GOVERNING COUNCIL OF THE UNIVERSITY OF TORONTO, Toronto (CA); TENOVA GOODFELLOW INC., Mississauga (CA)

( * ) Notice: Subject to any disclaimer, the term of this patent is extended or adjusted under 35 U.S.C. 154(b) by 700 days.

(21) Appl. No.: 17/442,750

(22) PCT Filed: Mar. 27, 2020

(86) PCT No.: PCT/CA2020/050410
§ 371 (c)(1),
(2) Date: Sep. 24, 2021

(87) PCT Pub. No.: WO2020/191504
PCT Pub. Date: Oct. 1, 2020

(65) Prior Publication Data
US 2022/0364200 A1 Nov. 17, 2022

Related U.S. Application Data

(60) Provisional application No. 62/824,588, filed on Mar. 27, 2019.

(51) Int. Cl.
C22B 7/04 (2006.01)
C22B 7/00 (2006.01)
(Continued)

(52) U.S. Cl.
CPC ............ *C22B 7/04* (2013.01); *C22B 7/007* (2013.01); *C22B 34/124* (2013.01);
(Continued)

(58) Field of Classification Search
CPC ......... C21B 3/04; C21B 2400/02; C22B 1/02; C22B 3/04; C22B 34/1236; C22B 34/124;
(Continued)

(56) References Cited

U.S. PATENT DOCUMENTS 2,589,910 A 3/1952 Schneider
3,053,625 A 9/1962 Doll et al.
(Continued)

FOREIGN PATENT DOCUMENTS

CN 1721559 A 1/2006
CN 1904097 A 1/2007
(Continued)

OTHER PUBLICATIONS

Qu, X. et al. "Performance of sulfuric acid leaching of titanium from titanium-bearing electric furnace slag." 2016. Journal of materials science research. 5. p. 1-9. (Year: 2016).*
(Continued)

*Primary Examiner* — Nicholas A Wang
(74) *Attorney, Agent, or Firm* — Nolte Lackenbach Siegel

(57) ABSTRACT

Pyro-hydrometallurgical methods are described to economically and environmentally recover a target metal from iron slag or steel slag. For instance, the method can enable subjecting an iron or steel slag feed to acid-baking with an acid to produce a dried mixture comprising at least one soluble metal salts, then subjecting the dried mixture to
(Continued)

water leaching to an aqueous solution comprising an aqueous leachate rich in said target metal and solid residues and subsequently separating the aqueous leachate rich in said target metal from the solid residues. This acid-baking water-leaching method facilitates efficient recovery of target metal compared to conventional methods.

16 Claims, 17 Drawing Sheets

(51) Int. Cl.
  *C22B 34/12* (2006.01)
  *C22B 34/24* (2006.01)
  *C22B 59/00* (2006.01)
  *C22B 61/00* (2006.01)

(52) U.S. Cl.
  CPC .......... *C22B 34/1259* (2013.01); *C22B 34/24* (2013.01); *C22B 59/00* (2013.01); *C22B 61/00* (2013.01)

(58) Field of Classification Search
  CPC ..... C22B 34/1259; C22B 34/24; C22B 59/00; C22B 61/00; C22B 7/007; C22B 7/04
  See application file for complete search history.

(56) References Cited

U.S. PATENT DOCUMENTS

| | | | |
|---|---|---|---|
| 5,082,638 A | | 1/1992 | Saikkonen et al. |
| 2007/0084306 A1* | | 4/2007 | Jones ............... C22B 5/06 75/316 |
| 2008/0250899 A1* | | 10/2008 | Mecchi ............. C21B 3/08 75/582 |
| 2013/0340571 A1 | | 12/2013 | Eramet |

FOREIGN PATENT DOCUMENTS

| | | |
|---|---|---|
| CN | 101078052 A | 11/2007 |
| CN | 102616851 A | 8/2012 |
| CN | 103415631 A | 11/2013 |
| CN | 103588235 A | 2/2014 |
| CN | 103589872 A | 2/2014 |
| CN | 103667728 B | 9/2015 |
| CN | 105925812 A | 9/2016 |
| CN | 105969978 A | 9/2016 |
| CN | 106755651 A | 5/2017 |
| CN | 107190188 A | 9/2017 |
| CN | 108291273 A | 7/2018 |
| CN | 108359802 A | 8/2018 |
| JP | 03505612 A | 12/1991 |
| WO | 2017089651 A1 | 6/2017 |

OTHER PUBLICATIONS

Third Office Action for corresponding China Patent Application N° 202080039382.2 dated Feb. 8, 2024, 9 pages with 16 pages of English Translation.
First Office Action for corresponding Chinese Patent Application N° 2020800393822 dated Feb. 10, 2023. 26 pages.
Kim, J. et al, Hydrometallurgy 191 (2020).
Qu, X et al, J. Mater. Sci. Res 5 (2016), 1-9.
PCT/CA2020/050410 International Search Report dated Jun. 30, 2020.
PCT/CA2020/050410 Written Opinion dated Jun. 30, 2020.
First Office Action for corresponding Japanese Patent Application N° 2021-560138 dated Apr. 2, 2024, 9 pages with 9 pages of English Translation.
Search Report for corresponding European Patent Application N° 20776945.6 dated Jun. 6, 2023, 7 pages.
Valighazvini Farzaneh et al. "Recovery of Titanium from Blast Furnace Slag", Industrial & Engineering Chemistry Research, vol. 52, No. 4, Dated: Jan. 17, 2013, XP093026347, pp. 1723-1730.
Soltani Faraz et al. "Leaching and recovery of phosphate and rare earth elements from an iron -rich fluorapatite concentrate: Part II: Selective leaching of calcium and phosphate and acid baking of the residue", Hydro Metallurgy, vol. 184, Dated: Dec. 24, 2018, XP085613648, pp. 29-38.
Second Office Action for corresponding China Patent Application N° 202080039382.2 dated Oct. 26, 2023, 7 pages with 14 pages of English Translation.
Dimitrijevic, et al.; Recovery of Copper From Smelting Slag By Suphation Roasting and Water Leaching; http://dx.doi.org/10.5277/00mp160134, Jul. 7, 2015, 13 pages.
Bulut, Gulay, "Recovery of Cooper and Cobalt From Ancient Slag"; Waste Manage Res 2006: 24: 118-124, 7 pages.
Anawati, et al; "Integrated Carbothermic Smelting—Acid Baking—Water Leaching Process for Extraction of Scandium, Aluminum, and Iron From Bauxite Residue"; Journal of Cleaner Production 330 (2022); 15 pages.
Kart, Elif Uzun; "Evaluation of Sulphation Baking and Autogenous Leaching Behaviour of Turkish Metallurgical Slag Flotation Tailings"; Physicochem. Probl. Miner. Process., 57(4), 2021, 107-116; 10 pages.
Alkan, et al., "Selective Silica Gel Free Scandium Extraction From Iron-Depleted Red Mud Slags By Dry Digestion"; Hydrometallurgy 185 (2019) 266-272; 7 pages.
Kim, et al., "Sulfuric Acid Baking-Water Leaching for Gold Enrichment and Arsenic Removal From Gold Concentrate"; MDPI, Minerals 2021, 11, 1332; 15 pages.

* cited by examiner

METHODS FOR RECOVERING A TARGET METAL FROM IRON OR STEEL SLAG USING AT LEAST ONE OF A CARBOTHERMIC REDUCTION PROCESS AND A PYRO-HYDROMETALLURGICAL PROCESS

RELATED APPLICATION

This application is a Section 371 nationalization of International Application No. PCT/CA2020/050410, filed Mar. 27, 2020, which claimed priority under appliable laws to U.S. provisional application Ser. No. 62/824,588, filed on Mar. 27, 2019. The contents of both these applications are hereby incorporated by reference for all purposes, including the right of priority, as if expressly set forth verbatim herein.

TECHNICAL FIELD

The technical field generally relates to methods for recovering at least one valuable element from a metallurgical slag, such as iron and steel slags, and more particularly, to methods which utilize at least one of a carbothermic reduction process and a pyro-hydrometallurgical process to recover at least one target metal from iron and steel slags.

BACKGROUND

With an increasing emphasis on the importance of waste valorization for establishing the circular economy, technospheric mining (i.e., extraction of strategic materials from alternative secondary resources such as industrial waste residue) has been brought to the fore. For instance, the alternative secondary resources can be metallurgical slags such as ferrous slag including iron and steel slags generated by the iron and steel-making industry or the iron and steel refining industry during the separation of molten iron or steel from its impurities in an iron making or a steelmaking furnace.

Approximately 15 to 20 million tons of steel slag is produced annually in the United States alone. Disposal of steel slag poses environmental hazards. Indeed, about 15% to 40% of the steel slag is stockpiled at steel plants and then sent to landfills.

Iron and steel slags comprise significant amounts of valuable materials, such as titanium, niobium, platinum group metals (abbreviated as the PGMs), gold, silver and rare earth elements (abbreviated as the REEs). For example, electric-arc-furnace (EAF) slag is a compelling potential source for many valuable metals including, but not limiting to, iron, manganese, magnesium, chromium, niobium, and aluminum.

These valuable materials can be recovered by extractive metallurgy and valorized. As a result, the extraction of valuable materials conserves the natural resources and helps preserve landfill space. It also means an increase in revenue for the iron and steel-making industry in an environmentally sustainable way.

Conventionally, extraction of Nb, Ti and REEs from primary and secondary sources is performed by hydrometallurgical methods such as direct acid leaching (Valighazvini et al., Industrial & Engineering Chemistry Research 52, no. 4 (2013): 1723-1730; El-Hussaini et al., Hydrometallurgy 64, no. 3 (2002): 219-229; and Kim et al., Minerals 6, no. 3 (2016): 63).

However, several challenges can be faced when using conventional hydrometallurgical methods. For instance, conventional hydrometallurgical methods require several pre-treatment steps. Major concerns associated with conventional hydrometallurgical methods include the consumption of large amounts of acids, base and organic solvents and the production of large volumes of hazardous waste. In another example, Zheng et al., prepared titanium dioxide from Ti-bearing electric furnace slag by $NH_4HF_2$—HF leaching and using a hydrolyzing process (Zheng et al., Journal of hazardous materials 344 (2018): 490-498). However, the use of hydrofluoric acid-based leaching agents has significant negative environmental impacts.

Processes based on a combined pyro-hydrometallurgical method such as acid bake-leach processes are alternative processes to direct leaching. Using a pyro-hydrometallurgical method, the metal bearing sample is mixed with concentrated acid and baked in a furnace at elevated temperature and then leached at ambient temperature. This process results in increased extraction efficiency, in shorter residence times, smaller leachate volumes, and significantly reduced acid consumption compared to traditional hydrometallurgical methods.

There are only a few reports regarding the extraction of valuable materials by pyro-hydrometallurgical methods. For example, Wu et al., proposed roasting Ta—Nb ore with concentrated sulfuric acid and leached the baked sample with dilute sulfuric acid (Wu et al., In Advanced Materials Research, vol. 997, pp. 651-654. Trans Tech Publications Ltd, 2014). Even though Wu et al., obtained high leaching efficiency, there are several disadvantages associated with acid leaching and high leaching temperatures. In another example, Qu et al., proposed extracting titanium from a titanium-bearing electric arc furnace slag by acid baking and leaching with water at an elevated temperature of 50° C. to 80° C. (Qu, et al., Journal of Materials Science Research Vol. 5, No. 4 (2016)). Qu et al., only achieved a moderate leaching efficiency of 84.3% and used high-leaching temperatures.

Carbothermic reduction processes are also used to reduce metal oxides to thereby produce metals. For example, using this type of process, iron oxides are reduced by carbonaceous materials, such as coal, coke, and natural gas to extract metals.

Accordingly, there is a need for processes that overcome one or more of the disadvantages encountered with conventional iron and steel slags technospheric mining processes.

SUMMARY

According to a first aspect, the present technology relates to a method for recovering a target metal from iron or steel slag, the method comprising the steps of:
 mixing iron or steel slag particles and an acid together in an acid-to-iron or steel slag particles mass ratio in the range of from about 0.5 to about 5 to produce a mixture;
 baking the mixture at a temperature of from about 100° C. to about 600° C. to digest the mixture, to remove excess water and acid, and to produce pyrolysis gas and a dried mixture comprising at least one soluble metal salt;
 leaching the dried mixture by adding water to obtain a density in the range of from about 50 g/L to about 250 g/L to produce an aqueous solution comprising an aqueous leachate rich in said target metal and solid residue; and
 separating the aqueous leachate rich in said target metal from the solid residue.

In one embodiment, the target metal is at least one of titanium, niobium, manganese, chromium, iron, scandium, neodymium, yttrium, lanthanum, cerium, samarium, gadolinium, dysprosium, praseodymium, europium, terbium, erbium, calcium, magnesium, aluminum, copper, silicon, ruthenium, rhodium, palladium, osmium, iridium, and platinum.

In another embodiment, the method further includes grinding the iron or steel slag particles prior to mixing. In one example, the grinding is performed by ball milling.

In another embodiment, the method further includes classifying and separating the iron or steel slag particles by size into fractions. In one example, the iron or steel slag particles have a size of less than about 200 mesh. In another example, the iron or steel slag particles have a diameter in the range of from about 1 µm to about 150 µm, or from about 1 µm to about 140 µm, or from about 1 µm to about 130 µm, or from about 1 µm to about 120 µm, or from about 1 µm to about 110 µm, or from about 1 µm to about 100 µm, or from about 1 µm to about 90 µm, or from about 5 µm to about 90 µm.

In another embodiment, the method further includes drying the iron or steel slag particles prior to mixing. In one example, the drying is carried out at a temperature in the range of from about 50° C. to about 80° C. In another example, the drying is carried out for a time period within the range of from about 12 hours to about 24 hours.

In another embodiment, the acid is selected from the group consisting of sulfuric acid, hydrochloric acid, nitric acid, and a mixture of at least two thereof. In one example, the acid comprises sulfuric acid and the soluble metal salt comprises at least one soluble metal sulfate salt.

In another embodiment, the acid-to-iron or steel slag particles mass ratio is in the range of from about 1 to about 3, or from about 2 to about 3, or from about 1 to about 1.75.

In another embodiment, the baking is carried out at a temperature of from about 100° C. to about 500° C., or from about 200° C. to about 600° C., or from about 200° C. to about 500° C., or from about 200° C. to about 400° C., or from about 300° C. to about 400° C.

In another embodiment, the baking is carried out for a time period within the range of from about 30 minutes to about 240 minutes, or from about 30 minutes to about 120 minutes, or from about 30 minutes to about 60 minutes.

In another embodiment, the method further includes recycling pyrolysis gas. In one example, the recycling pyrolysis gas includes reusing the pyrolysis gas in the mixing step.

In another embodiment, the leaching step is carried out for a time period within the range of from about 30 minutes to about 360 minutes, or from about 120 minutes to about 360 minutes, or from about 180 minutes to about 360 minutes.

In another embodiment, the density of the dried mixture is in the range of from about 100 g/L to about 200 g/L, or from about 125 g/L to about 200 g/L, from about 150 g/L to about 200 g/L.

In another embodiment, the method further includes stirring the aqueous solution comprising the aqueous leachate rich in said target metal and the solid residue. In one example, the stirring is carried out at an agitation rate of from about 150 rpm to about 650 rpm.

In another embodiment, separating includes filtrating the aqueous solution comprising the aqueous leachate rich in said target metal and the solid residue.

In another embodiment, the method further includes purifying the aqueous leachate rich in said target metal. In one example, the purifying step is performed by at least one of selective precipitation, solvent extraction and ion exchange.

According to another aspect, the present technology relates to a method for recovering niobium from iron or steel slag, the method comprising the steps of:

mixing iron or steel slag particles and an acid together in an acid-to-iron or steel slag particles mass ratio in the range of from about 2.5 to about 3.5 to produce a mixture;

baking the mixture at a temperature of from about 375° C. to about 425° C. to digest the mixture, to remove excess water and acid, and to produce pyrolysis gas and a dried mixture comprising at least one soluble niobium salt;

leaching the dried mixture by adding water to obtain a density in the range of from about 175 g/L to about 225 g/L to produce an aqueous solution comprising an aqueous leachate rich in niobium and a solid residue; and separating the aqueous leachate rich in niobium from the solid residue.

In one embodiment, the acid is selected from the group consisting of sulfuric acid, hydrochloric acid, nitric acid, and a mixture of at least two thereof. In one example, the acid comprise sulfuric acid and the soluble niobium salt comprises at least one soluble niobium sulfate salt.

In another embodiment, the acid-to-iron or steel slag particles mass ratio is about 3.

In another embodiment, the baking is carried out at a temperature of about 400° C.

In another embodiment, the density of the dried mixture is about 200 g/L.

In another embodiment, the baking is carried out for a time period within the range of from about 30 minutes to about 240 minutes. In one example, the baking is carried out for a time period of about 120 minutes.

In another embodiment, the method further includes stirring the aqueous solution comprising the aqueous leachate rich in niobium and the solid residue at an agitation rate of from about 150 about 600 rpm. In one example, the agitation rate is about 150 rpm.

According to another aspect, the present technology relates to a method for recovering titanium from iron or steel slag, the method comprising the steps of:

mixing iron or steel slag particles and an acid together in an acid-to-iron or steel slag particles mass ratio in the range of from about 2 to about 3 to produce a mixture;

baking the mixture at a temperature of from about 200° C. to about 400° C. to digest the mixture, to remove excess water and acid, and to produce pyrolysis gas and a dried mixture comprising at least one soluble titanium salt;

leaching the dried mixture by adding water to obtain a density in the range of from about 50 g/L to about 200 g/L to produce an aqueous solution comprising an aqueous leachate rich in titanium and a solid residue; and separating the aqueous leachate rich in titanium from the solid residue.

In one embodiment, the acid is selected from the group consisting of sulfuric acid, hydrochloric acid, nitric acid, and a mixture of at least two thereof. In one example, the acid comprises sulfuric acid and the soluble titanium salt comprises at least one soluble titanium sulfate salt.

In another embodiment, the baking is carried out for a time period within the range of from about 30 minutes to about 120 minutes, or from about 30 minutes to about 90 minutes.

In another embodiment, the density of the dried mixture is in the range of from about 60 g/L to about 200 g/L.

In another embodiment, the method further includes stirring the aqueous solution comprising the aqueous leachate rich in titanium and the solid residue at an agitation rate in the range of from about 150 rpm to about 550 rpm. In one example, the agitation rate is in the range of from about 200 rpm to about 550 rpm.

In another embodiment, the steel slag is an electric arc furnace slag, the acid-to-steel slag particles mass ratio is about 3, the baking is carried out at a temperature of about 400° C. and the density of the dried mixture is about 200 g/L. In one example, the baking is carried out for a time period of about 120 minutes. In another example, the method further includes stirring the aqueous solution comprising the aqueous leachate rich in titanium and the solid residue at an agitation rate of about 150 rpm.

In another embodiment, the iron slag is a blast furnace slag, the acid-to-iron slag particles mass ratio is about 2, the baking is carried out at a temperature of about 200° C. and the density of the dried mixture is about 62 g/L. In one example, the baking is carried out for a time period of about 90 minutes. In another example, the method further includes stirring the aqueous solution comprising the aqueous leachate rich in titanium and the solid residue at an agitation rate of about 600 rpm.

According to another aspect, the present technology relates to a method for recovering scandium from iron or steel slag, the method comprising the steps of:
mixing iron or steel slag particles and an acid together in an acid-to-iron or steel slag particles mass ratio in the range of from about 1.5 to about 2.5 to produce a mixture;
baking the mixture at a temperature of from about 175° C. to about 225° C. to digest the mixture, to remove excess water and -acid, and to produce pyrolysis gas and a dried mixture comprising at least one soluble scandium salt;
leaching the dried mixture by adding water to obtain a density in the range of from about 50 g/L to about 70 g/L to produce an aqueous solution comprising an aqueous leachate rich in scandium and a solid residue; and
separating the aqueous leachate rich in scandium from the solid residue.

In one embodiment, the acid is selected from the group consisting of sulfuric acid, hydrochloric acid, nitric acid, and a mixture of at least two thereof. In one example, the acid comprise sulfuric acid and the soluble scandium salt comprises at least one soluble scandium sulfate salt.

In another embodiment, the acid-to-iron or steel slag particles mass ratio is to about 2.

In another embodiment, the baking is carried out at a temperature of about 200° C.

In another embodiment, the density of the dried mixture is about 60 g/L.

In another embodiment, the baking is carried out for a time period within the range of from about 60 minutes to about 120 minutes. In one example, the baking is carried out for a time period of about 90 minutes.

In another embodiment, the method further includes stirring the aqueous solution comprising the aqueous leachate rich in scandium and the solid residue at an agitation rate of about 600 rpm.

According to another aspect, the present technology relates to a method for recovering neodymium from iron or steel slag, the method comprising the steps of:
mixing iron or steel slag particles and an acid together in an acid-to-iron or steel slag particle mass ratio in the range of from about 1.5 to about 2.5 to produce a mixture;
baking the mixture at a temperature of from about 175° C. to about 225° C. to digest the mixture, to remove excess water and -acid, and to produce pyrolysis gas and a dried mixture comprising at least one soluble neodymium salt;
leaching the dried mixture by adding water to obtain a density in the range of from about 50 g/L to about 70 g/L to produce an aqueous solution comprising an aqueous leachate rich in neodymium and a solid residue; and
separating the aqueous leachate rich in neodymium from the solid residue.

In one embodiment, the acid is selected from the group consisting of sulfuric acid, hydrochloric acid, nitric acid, and a mixture of at least two thereof. In one example, the acid comprise sulfuric acid and the soluble neodymium salt comprises at least one soluble neodymium sulfate salt.

In another embodiment, the acid-to-iron or steel slag particles mass ratio is about 2.

In another embodiment, the baking is carried out at a temperature of about 200° C.

In another embodiment, the density of the dried mixture is about 60 g/L.

In another embodiment, the baking is carried out for a time period within the range of from about 30 minutes to about 60 minutes. In one example, the baking is carried out for a time period of about 30 minutes.

In another embodiment, the method further includes stirring the aqueous solution comprising the aqueous leachate rich in neodymium and the solid residue at an agitation rate of about 600 rpm.

According to another aspect, the present technology relates to a method for recovering a target metal from iron or steel slag, the method comprising the steps of:
mixing iron or steel slag particles, at least one a reducing agent in a reducing agent-to-iron or steel slag particles mass ratio in the range of from about 0.06 to about 0.12, and at least one fluxing agent in a fluxing agent-to-iron or steel slag particles mass ratio in the range of from 0 to about 0.1 to produce a mixture;
smelting the mixture at a temperature of from about 1300° C. to about 1800° C. to form a metallic phase comprising the target element and a slag phase; and
separating the metallic phase comprising the target element from the slag phase to produce a metallic phase comprising the target element and a slag phase.

In one embodiment, the target metal is at least one of iron, manganese, chromium, and niobium. In one example, the target metal is iron.

In another embodiment, the iron or steel slag is an electric arc furnace slag.

In another embodiment, the reducing agent comprises a carbon source. In one example, the carbon source is selected from the group consisting of metallurgical coal, charcoal, petroleum coke, pet coke, natural gas, and a combination of at least two thereof. In one example of interest, the carbon source is lignite coal.

In another embodiment, the reducing agent-to-iron or steel slag particles mass ratio is about 0.06, about 0.09, or about 0.12.

In another embodiment, the fluxing agent is selected from the group consisting of silica, alumina, and a mixture thereof. In one example of interest, the fluxing agent is alumina. In another example of interest, the fluxing agent is silica. In another example of interest, the fluxing agent is a mixture of silica and alumina.

In another embodiment, the reducing agent-to-iron or steel slag particles mass ratio is about 0.05, or about 0.1.

In another embodiment, the method further includes grinding the iron or steel slag particles prior to mixing. In one example, the grinding is performed using at least one of a jaw crusher and a disk mill.

In another embodiment, the method further includes classifying and separating the iron or steel slag particles by size into fractions.

In another embodiment, the iron or steel slag particles have a size of less than about 200 mesh.

In another embodiment, the method further includes drying the iron or steel slag particles prior to mixing. In one example, the drying is carried out at a temperature of at least about 50° C. In another example, the drying is carried out at a temperature in the range of from about 50° C. to about 80° C. In another example, the drying is carried out for a time period of at least about 24 hours.

In another embodiment, the method further includes pelletizing the mixture prior to the smelting step.

In another embodiment, the separating step is carried out by a mechanical separation method. In one example, the separating step is carried out manually.

In another embodiment, the method further includes grinding the slag phase to obtain slag particles.

In another embodiment, the method further includes classifying and separating the slag particles by size into fractions.

In another embodiment, the method further includes reducing the target metal content in the slag phase to produce a target metal-depleted slag. In one example, reducing the target metal content in the slag phase is carried out by magnetic separation. For example, the magnetic separation is performed using a Davis™ tube.

In another embodiment, the smelting step is carried out at a temperature in the range of from about 1300° C. to about 1700° C., or from about 1300° C. to about 1600° C., or from about 1400° C. to about 1800° C., or from about 1400° C. to about 1700° C., or from about 1400° C. to about 1600° C., or from about 1500° C. to about 1800° C., or from about 1500° C. to about 1700° C., or from about 1500° C. to about 1600° C. In one example, the smelting step is carried out at a temperature in the range of from about 1500° C. to about 1600° C.

In another embodiment, the iron or steel slag is a by-product of an iron or steel-making process. In one example, the iron or steel-making process provides heat energy to the iron or steel slag. For instance, the iron or steel slag particles are at an elevated temperature prior to the mixing step.

In another embodiment, the iron or steel slag particles and the reducing agent undergo an oxidation reduction (redox) reaction releasing chemical energy. For instance, the redox reaction produces heat as a by-product (exothermic reaction). Alternatively, the iron or steel slag particles and the reducing agent undergo an oxidation reduction (redox) reaction without releasing chemical energy.

In another embodiment, the method further includes subjecting the target metal-depleted slag to a pyro-hydrometallurgical process to recover a second target metal. In one example, the pyro-hydrometallurgical process is a method as described herein.

DETAILED DESCRIPTION

Figure 1:
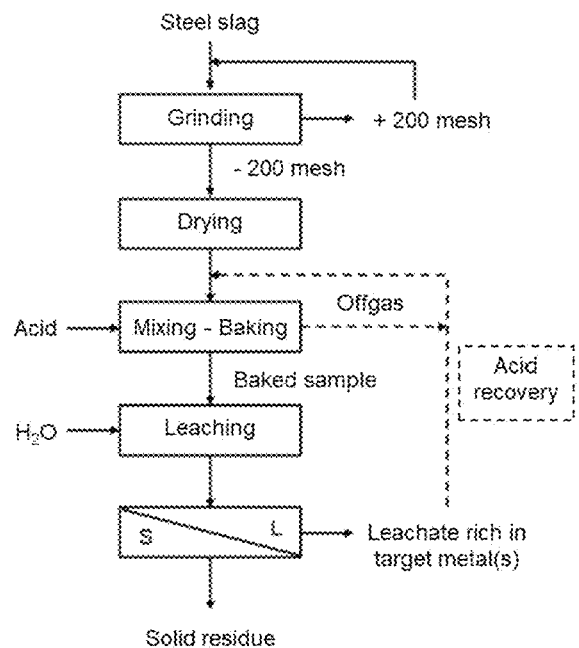
FIG. 1 is a flow diagram of a process for recovering valuable elements from iron and steel slags according to one embodiment.

The following detailed description and examples are illustrative and should not be interpreted as further limiting the scope of the invention. On the contrary, it is intended to cover all alternatives, modifications and equivalents that can be included as defined by the present description. The objects, advantages and other features of the methods will be more apparent and better understood upon reading the following non-restrictive description and references made to the accompanying drawings.

All technical and scientific terms and expressions used herein have the same definitions as those commonly understood by the person skilled in the art when relating to the present technology. The definition of some terms and expressions used herein is nevertheless provided below for clarity purposes.

When the term "about" are used herein, it means approximately, in the region of or around. When the term "about" is used in relation to a numerical value, it modifies it; for example, by a variation of 10% above and below its nominal value. This term can also take into account the rounding of a number or the probability of random errors in experimental measurements; for instance, due to equipment limitations. When a range of values is mentioned in the present application, the lower and upper limits of the range are, unless otherwise indicated, always included in the definition. When a range of values is mentioned in the present application, then all intermediate ranges and subranges, as well as individual values included in the ranges, are intended to be included.

The expression "particle size" is described herein by its distribution of particle size $d_x$. Therein, the value dx represents the diameter relative to which x % of the particles have diameters less than $d_x$. For example, the $d_{10}$ value is the particle size at which 10% of all particles are smaller than that particle size. The $d_{90}$ value is the particle size at which 90% of all particles are smaller than that particle size. The $d_{50}$ value is thus the median particle size, i.e. 50% of all particles are bigger and 50% are smaller than that particle size.

When the term "equilibrium" is used herein, it refers to a steady state in which the stated variable has no observable impact (or no net impacts) on the properties of the system, although the ongoing process strives to change it.

When the term "pore" is used herein, it refers to the space that is found within particles, i.e. the void space within porous particles (intraparticle pores).

As used herein, the term "drying" refers to a process according to which at least a portion of water is removed from a material to be dried. As used herein, the term "dried" or its equivalent term "dry" material defines the total moisture content of said material which, unless specified otherwise, is less than or equal to 5.0 wt. % based on the total weight of the dried material.

As used herein, the term "digestion" or its equivalent term "to digest" refers to the decomposition or the dissolution of a sample in strong acids such as concentrated sulfuric acid ($H_2SO_4$), hydrochloric acid (HCl) and nitric acid ($HNO_3$) in order to obtain the sample in a paste form and then increasing the temperature to obtain the sample in a powder form.

It is worth mentioning that throughout the following description when the article "a" is used to introduce an element, it does not have the meaning of "only one" and rather means "one or more". It is to be understood that where the specification states that a step, component, feature, or characteristic "may", "might", "can" or "could" be included, that particular component, feature or characteristic is not required to be included in all alternatives. When the term "comprising" or its equivalent terms "including" or "having" are used herein, it does not exclude other elements. For the purposes of the present invention, the expression "consisting of" is considered to be a preferred embodiment of the term "comprising". If a group is defined hereinafter to include at least a certain number of embodiments, it is also to be understood to disclose a group, which preferably consists only of these embodiments.

Various methods described herein are related to the recovery of at least one valuable element from a ferrous slag (e.g. iron and steel slags) by a pyro-hydrometallurgical process. For instance, the pyro-hydrometallurgical process includes both acid-baking and water-leaching, hereinafter named acid-baking water-leaching (ABWL).

More particularly, the present technology relates to methods for recovering at least one valuable element from an iron slag or a steel slag. The valuable element is a target metal. For instance, the target metal can be selected from a transition metal, a platinum-group metals, a metalloid, a post-transition metal, an alkaline earth metal and/or a rare earth metal. Non-limiting examples of target metals include titanium, niobium, manganese, chromium, iron, scandium, neodymium, yttrium, lanthanum, cerium, samarium, gadolinium, dysprosium, praseodymium, europium, terbium, erbium, calcium, magnesium, aluminum, copper, silicon, ruthenium, rhodium, palladium, osmium, iridium, and platinum. Preferably, the target metal includes at least one include titanium, niobium, manganese, chromium, iron, scandium, neodymium, yttrium, lanthanum, cerium, samarium, gadolinium, dysprosium, praseodymium, europium, terbium, erbium, calcium, magnesium, aluminum, copper, and silicon. According to a variant of interest, the target metal includes at least one of titanium, niobium, scandium, and neodymium.

In some embodiments, more than one valuable element can be co-recovered (or co-extracted). Alternatively, one valuable element can be selectively recovered (or extracted) while hindering the co-recovery (or co-extraction) of other elements.

The iron or steel slag can include at least one component selected from the group consisting of silicon dioxide ($SiO_2$), calcium oxide (CaO), iron(III) oxide ($Fe_2O_3$), iron(II) oxide (FeO), aluminum oxide ($Al_2O_3$), magnesium oxide (MgO), manganese(II) oxide (MnO), phosphorus pentoxide ($P_2O_5$), sulfur, and a combination of at least two thereof. For example, the iron or steel slag mainly includes $SiO_2$, CaO, $Fe_2O_3$, FeO, $Al_2O_3$, MgO, MnO, $P_2O_5$, and/or sulfur.

In some cases, the steel slag is a steel-furnace slag. For example, the steel-furnace slag can be a basic-oxygen-furnace (BOF) slag, an electric-arc-furnace (EAF) slag, or a ladle slag. In one variant of interest, the steel-furnace slag is an EAF slag or a BOF slag. For example, the components of the EAF slag can include, but are not limited to, FeO, $Fe_2O_3$, MnO, CaO, and a combination of at least two thereof. For example, the EAF slag is mainly composed of FeO, $Fe_2O_3$, MnO, and/or CaO.

In other cases, the iron slag is a blast-furnace (BF) slag (ironmaking slag). The components of the BF slag can include $Al_2O_3$, MgO, and sulfur. For example, the BF slag is mainly composed of $Al_2O_3$, MgO, and/or sulfur.

In some embodiments, the iron or steel slag further includes at least one other component including, but not limited to, magnesium, calcium, vanadium, tungsten, copper, lead, zinc, REEs, uranium, thorium.

For a more detailed understanding of the disclosure, reference is first made to FIG. 1, which provides a flow diagram of a method for recovering at least one valuable element from an iron or a steel slag in accordance with a possible embodiment.

As illustrated in FIG. 1, the method for recovering at least one valuable element (or target metal) from a slag includes the step of mixing iron or steel slag particles and an acid together to produce a mixture.

The iron or steel slag particles and the acid are mixed together in an acid-to-iron or steel slag particle mass ratio in the range of from about 0.5 to about 5. For example, the acid-to-iron or steel slag particle mass ratio can be in the range of from about 1 to about 4, or from about 1 to about 3.5, or from about 1 to about 3, or from about 2 to about 3, or from about 1 to about 2, or from about 1 to about 1.75.

According to a variant of interest, the acid-to-iron or steel slag particle mass ratio is in the range of from about 2 to about 3.

For example, the acid can be selected from the group consisting of sulfuric acid, hydrochloric acid, nitric acid, and a mixture of at least two thereof when applicable. In one variant of interest, the acid includes sulfuric acid.

The acid can be a concentrated acid. For instance, the acid can have a concentration in the range of from about 95% to about 99.999%.

Still referring to FIG. 1, the method also includes the step of baking the mixture to digest the mixture, to remove excess water and acid and to produce pyrolysis gas and a dried mixture comprising at least one soluble metal salt.

The baking is carried out at a temperature in the range of from about 100° C. to about 600° C. For example, the baking may be carried out at a temperature in the range of from about 200° C. to about 600° C., or from about 200° C. to about 550° C., or from about 200° C. to about 500° C., or from about 200° C. to about 450° C., or from about 200° C. to about 400° C., or from about 200° C. to about 300° C., or from about 300° C. to about 400° C. According to a variant of interest, the baking is carried out at a temperature in the range of from about 200° C. to about 400° C.

In some embodiments, the baking is carried out for a time period of at least 30 minutes. For example, the baking may be carried out for a time period in the range of from about 30 minutes to about 240 minutes, or from about 30 minutes to about 180 minutes, or from about 30 minutes to about 120 minutes, or from about 30 minutes to about 90 minutes, or from about 30 minutes to about 60 minutes. In one variant of interest, the baking is carried out for a time period of about 120 minutes.

In examples where the acid includes sulfuric acid, the soluble metal salt includes at least one soluble metal sulfate salt.

In examples where the acid includes sulfuric acid, the pyrolysis gas may include at least one of sulfur trioxide and sulfur dioxide. As illustrated in FIG. 1, the pyrolysis gas produced during the baking step can be recycled. For instance, the pyrolysis gas can be reused in the mixing step, thereby reducing chemical costs and increasing the environmental sustainability of the method.

The mixing and baking steps can be performed sequentially, simultaneously, or partially overlapping in time with each other. In some embodiments, the mixing and baking steps are performed sequentially and the mixing step is performed before the baking step.

In some embodiments, the mixing and baking steps are performed in a pyroprocessing device, for example, in a rotary kiln.

In some embodiments, the iron or steel slag is a by-product of an iron or steel-making process (not shown in FIG. 1). For instance, the iron or steel-making process provides heat energy to the iron or steel slag and the iron or steel slag particles can be at an elevated temperature prior to the mixing and baking steps, thereby reducing the energy input required to obtain the temperature needed in the baking step.

Still referring to FIG. 1, the method also includes leaching the dried mixture by adding water to produce an aqueous solution comprising an aqueous leachate that is rich in said target metal and a solid residue.

The water is added to obtain a water-to-dried mixture density in the range of from about 50 g/L to about 250 g/L. In at least one embodiment, the water to dried mixture density is in the range of from about 60 g/L to about 200 g/L, or from about 75 g/L to about 200 g/L, or from about 100 g/L to about 200 g/L, or from about 125 g/L to about 200 g/L, or from about 150 g/L to about 200 g/L, or from about 55 g/L to about 200 g/L.

In some embodiments, the leaching step is carried out at an ambient temperature. In some embodiments, the leaching step is carried out until the system reaches equilibrium. For instance, the leaching step is carried out for a time period within the range of from about 30 minutes to about 360 minutes, or from about 120 minutes to about 360 minutes or from about 180 minutes to about 360 minutes.

Still referring to FIG. 1, the method also includes separating the aqueous leachate rich in said target metal from the solid residue.

In some embodiments, separating includes filtrating the aqueous solution comprising the aqueous leachate rich in said target metal and the solid residue. For example, the filtration may be at least one of vacuum filtration, pressure filtration and the like. Alternatively, in a variant of interest, separating includes a settling step, in which the solid residue settle at the bottom of a vessel containing the aqueous leachate rich in said target metal and form a sediment or a slurry. For instance, the settling may be gravity settling or centrifugal settling.

As illustrated in FIG. 1, the method may further include grinding the iron or steel slag to obtain the iron or steel slag particles prior to mixing. According to a variant of interest, the grinding is performed by ball milling. For instance, ball milling may activate the particles thereby increasing the extraction efficiency. In some embodiments, the method further includes classifying and separating the iron or steel slag particles by size into fractions. For example, the slag particles may be screened and classified into narrow sized fractions to obtain iron or steel slag particles having a size of less than about 200 mesh. In some embodiments, the iron or steel slag particles are substantially uniform in size. For example, the iron or steel slag particles may have a diameter in the range of from about 1 µm to about 150 µm, or from about 1 µm to about 140 µm, or from about 1 µm to about 130 µm, or from about 1 µm to about 120 µm, or from about 1 µm to about 110 µm, or from about 1 µm to about 100 µm, or from about 1 µm to about 90 µm, or from about 5 µm to about 90 µm. According to a variant of interest, the iron or steel slag particles have a diameter in the range of from about 1 µm to about 130 µm.

Still referring to FIG. 1, in accordance with some embodiments, the method may further include drying the iron or steel slag particles prior to mixing. For instance, the drying may be carried out at a temperature of at least about 50° C. For example, the drying may be carried out at a temperature in the range of from about 50° C. to about 80° C. For instance, the drying may be carried out for a time period of at least about 12 hours. For example, the drying may be carried out for a time period in the range of from about 12 hours to about 24 hours.

In some embodiments, the method further includes stirring the aqueous solution comprising an aqueous leachate rich in said target metal and the solid residue (not shown in FIG. 1). The stirring and leaching can be performed sequentially, simultaneously, or partially overlapping in time with each other. In some embodiments, the stirring and leaching are performed simultaneously. For instance, the stirring may be carried out at an agitation rate in the range of from about 150 rpm to about 650 rpm. For example, the agitation rate may be in the range of from about 200 rpm to about 600 rpm.

As illustrated in FIG. 1, excess acid may be recovered after the separating step. For example, the recovered acid may be reused in the mixing step, thereby reducing costs and increasing the environmental sustainability of the method.

In some embodiments, the method may further include purifying the aqueous leachate rich in said target metal (not shown in FIG. 1). For example, the purifying step may be performed by at least one of a selective precipitation method, a solvent extraction method and an ion exchange method.

In at least one embodiment, the target metal is niobium. The acid-to-iron or steel slag particle mass ratio is in the range of from about 2.5 to about 3.5, and preferably about 3. The baking is carried out at a temperature of from about 375° C. to about 425° C., and preferably at a temperature of about 400° C. The density of the dried mixture is in the range of from about 175 g/L to about 225 g/L, and is preferably about 200 g/L. For example, the baking may be carried out for a time period within the range of from about 30 minutes to about 240 minutes, or from about 30 minutes to 150 minutes, or from about 30 minutes to about 120 minutes, and preferably for about 120 minutes. For example, the method can include stirring the aqueous solution comprising the aqueous leachate rich in niobium and the solid residue at an agitation rate in the range of from about 150 rpm to 600 rpm, and preferably of about 150 rpm.

In some embodiments, the extraction efficiency of niobium may be of at least about 90%. For example, the niobium extraction efficiency may be of at least about 92%, or at least about 95%, or in the range of from about 92% to about 99%, or from about 92% to about 98%, or from about 92% to about 97%.

In at least one embodiment, the target metal is titanium. The acid-to-iron or steel slag particle mass ratio is in the range of from about 2 to about 3. The baking is carried out at a temperature of from about 200° C. to about 400° C. The density of the dried mixture is in the range of from about 50 g/L to about 200 g/L, or from about 60 g/L to about 200 g/L. For example, the baking may be carried out in the range of from about 30 minutes to about 120 minutes, or from about 30 minutes to about 90 minutes. For instance, the method further includes stirring the aqueous solution comprising an aqueous leachate rich in titanium and the solid residue at an agitation rate in the range of from about 150 rpm to about 550 rpm, or from about 200 rpm to about 550 rpm. In one embodiment, the steel slag is an electric arc furnace slag, the acid-to-steel slag particle mass ratio is to about 3, the baking is carried out at a temperature of about 400° C. and the density of the dried mixture is about 200 g/L. The baking is carried out for a time period of about 120 minutes and the agitation rate is about 150 rpm. In one embodiment, the iron slag is a BF slag, the acid-to-iron slag particle mass ratio is to about 2, the baking is carried out at a temperature of about 200° C. and the density of the dried mixture is about 62 g/L. The baking is carried out for a time period of about 90 minutes and the agitation rate is about 600 rpm.

In some embodiments, the extraction efficiency of titanium may be of at least about 90%. For example, the titanium extraction efficiency can be of at least about 92%, or at least about 95%, or at least about 97%.

In at least one embodiment, the target metal is scandium. The acid-to-iron or steel slag particle mass ratio is in the range of from about 1.5 to about 2.5, and preferably about 2. The baking is carried out at a temperature of from about 175° C. to about 225° C., and preferably at a temperature of about 200° C. The density of the dried mixture is in the range of from about 50 g/L to about 70 g/L, preferably about 60 g/L. The baking is carried out for a time period within the range of from about 60 minutes to about 120 minutes, preferably about 90 minutes. The method can further include stirring the aqueous solution comprising an aqueous leachate rich in scandium and the solid residue at an agitation rate in the range of from about 550 rpm to about 650 rpm, preferably about 600 rpm.

In some embodiments, the extraction efficiency of scandium may be of at least about 70%. For example, the scandium extraction efficiency can be in the range of from about 70% to about 98%, or from about 70% to about 89%, or from about 70% to about 85%, or from about 75% to about 85%, or from about 75% to about 82%.

In at least one embodiment, the target metal is neodymium. The acid-to-iron or steel slag particle mass ratio is in the range of from about 1.5 to about 2.5, and preferably about 2. The baking is carried out at a temperature of from about 175° C. to about 225° C., preferably at a temperature of about 200° C. The density of the dried mixture is in the range of from about 50 g/L to about 70 g/L, preferably about 60 g/L. The baking is carried out for a time period within the range of from about 30 minutes to about 60 minutes, preferably about 30 minutes. The method may further include stirring the aqueous solution comprising an aqueous leachate rich in neodymium and the solid residue at an agitation rate in the range of from about 550 rpm to about 650 rpm, preferably about 600 rpm. In some embodiments, the extraction efficiency of neodymium is less than about 60%, or less than about 40%.

In some embodiments, the extraction efficiency of iron can be of at least about 85%. For example, the Fe extraction efficiency can be of at least about 90%, or at least about 91%. In some embodiments, the extraction efficiency of manganese can be of at least about 90%. For example, the Mn extraction efficiency can be of at least about 95%, or at least about 97%. In some embodiments, the extraction efficiency of magnesium can be of at least about 95%. For example, the Mg extraction efficiency can be of at least about 97%, or at least about 98%. In some embodiments, the extraction efficiency of aluminum can be of at least about 58%. For example, the Al extraction efficiency can be of at least about 65%, or at least about 75%, or at least about 80%. In some embodiments, the extraction efficiency of chromium can be of at least about 90%. For example, the Cr extraction efficiency can be of at least about 95%, or at least about 97%, or at least about 98%.

Figure 2:
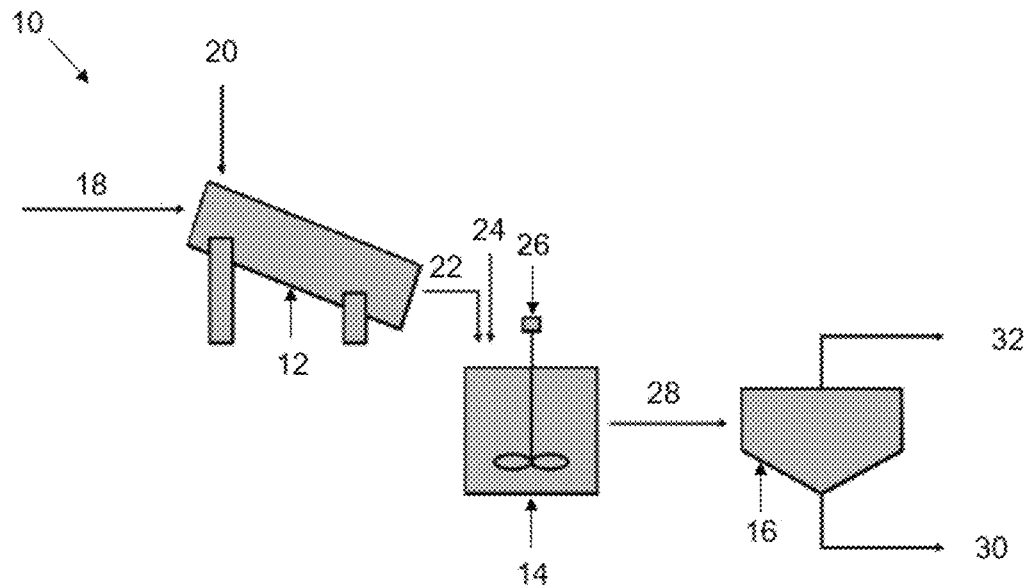
FIG. 2 is a schematic representation of a process for recovering valuable elements from iron and steel slags according to one embodiment.

For a more detailed understanding of the disclosure, reference is now made to FIG. 2, which provides a schematic representation of an ABWL recovery system 10, in accordance with a possible embodiment. The ABWL recovery system 10 includes a pyroprocessing device 12 and a water leaching unit 14. In accordance with one embodiment, the recovery system 10 may further include a settling vessel 16.

In some embodiments, the pyroprocessing device 12 configured to receive a first feed stream 18 comprising an iron or a steel slag, for example, directly from an industrial effluent line (not shown in FIG. 2), and to receive a second feed stream 20 comprising acid, for example, sulfuric acid. As illustrated in FIG. 2, the pyroprocessing device 12 is further configured to release a dried mixture 22. Still referring to FIG. 2, the water leaching unit 14 is configured to receive the dried mixture 22 and a third feed stream 24 comprising water. In accordance with one embodiment, the water leaching unit 14 may further include a stirring device 26. The water leaching unit 14 is further configured to release an aqueous solution 28 comprising an aqueous leachate rich in target metal and a solid residue. As illustrated in FIG. 2, the settling vessel 16 is configured to receive the aqueous solution 28 comprising the aqueous leachate rich in target metal and the solid residue and to release solid residue 30 and a leachate rich in target metal 32.

The present application also described various methods related to the recovery of at least one valuable element from an iron or a steel slag by a carbothermic reduction process. For instance, the carbothermic reduction process can be used alone or in combination with a pyro-hydrometallurgical process.

In some embodiments, the carbothermic reduction process can be used in combination with a pyro-hydrometallurgical process, for instance, the ABWL process as described herein.

In some embodiments, the carbothermic reduction process can be carried out prior to the pyro-hydrometallurgical process.

More particularly, the present technology also relates to methods for recovering at least one valuable element from an iron or a steel slag. The valuable element is a target metal. For instance, the target metal can be selected from a transition metal, a metalloid, a post-transition metal, an alkaline earth metal and/or a rare earth metal. Non-limiting examples of target metals include iron, calcium, silicon, manganese, aluminum, chromium, strontium, copper, nickel, titanium, niobium. According to a variant of interest, the target metal includes at least one of iron, manganese, chromium, niobium, magnesium, and aluminum.

In some embodiments, the steel slag is EAF slag. For instance, the EAF slag can include at least one of iron, manganese, chromium, magnesium, niobium, and aluminum.

In some embodiments, more than one valuable element can be co-recovered (or co-extracted). Alternatively, one valuable element can be selectively recovered (or extracted) while hindering the co-recovery (or co-extraction) of other elements.

In some embodiments, at least one valuable element can be selectively extracted as a metallic phase from the iron or steel slag by the carbothermic reduction process. For example, at least one of iron, manganese, chromium, and, niobium can be selectively extracted as the metallic phase from the iron or steel slag by the carbothermic reduction process. In one variant of interest, iron is selectively extracted as the metallic phase.

In some embodiments, at least one valuable element can be selectively extracted as the metallic phase from the iron or steel slag by the carbothermic reduction process and at least one other valuable element can be extracted by a subsequent pyro-hydrometallurgical process. For instance, at least one of magnesium and aluminum can be extracted by the subsequent pyro-hydrometallurgical process. In some examples, at least one of iron, manganese, chromium, and, niobium can be selectively extracted as the metallic phase from the iron or steel slag by the carbothermic reduction process, and at least one of magnesium and aluminum can be extracted by the subsequent pyro-hydrometallurgical process.

For instance, the carbothermic reduction process can be used to substantially reduce the presence of at least one valuable element from the iron or steel slag and to substantially increase the extraction of at least one target metal by the subsequent pyro-hydrometallurgical process.

Figure 3:
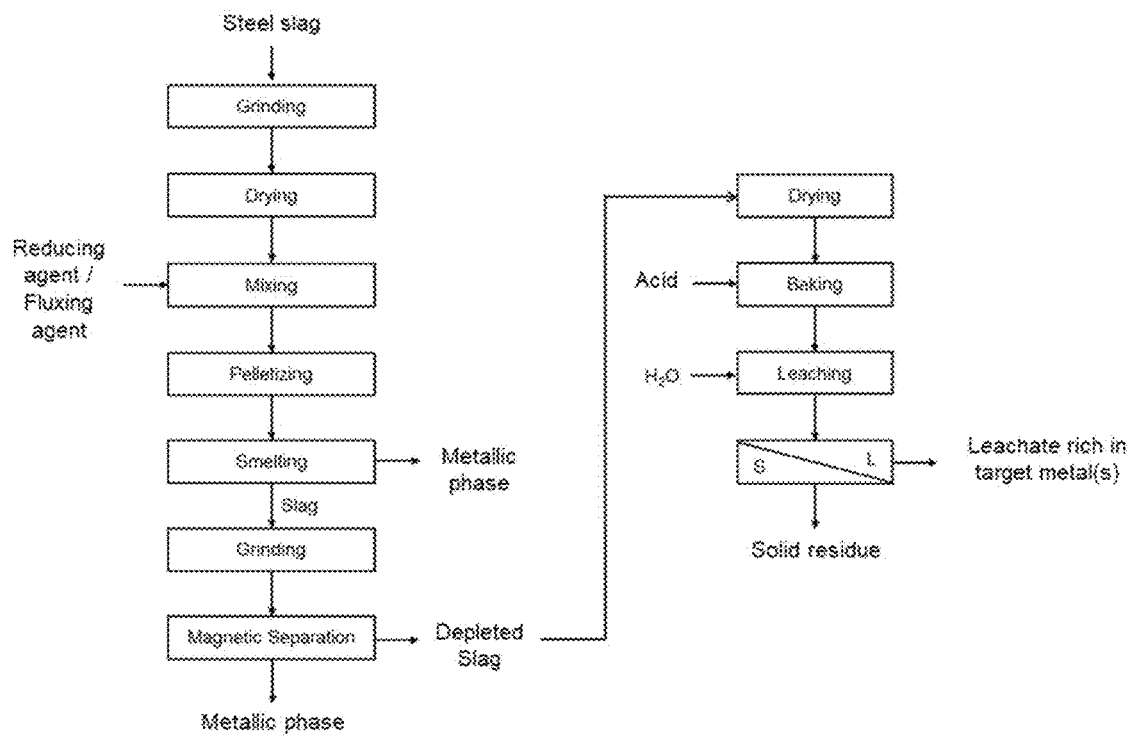
FIG. 3 is a flow diagram of a process for recovering valuable elements from iron and steel slags according to another embodiment.

For a more detailed understanding of the disclosure, reference is now made to FIG. 3, which provides a flow diagram of a method for recovering at least one valuable element from an iron or a steel slag in accordance with a possible embodiment.

As illustrated in FIG. 3, the method for recovering at least one valuable element (or target metal) from an iron or a steel slag includes the step of mixing iron or steel slag particles and at least one a reducing agent and optionally at least one fluxing agent.

Non-limiting examples of suitable reducing agents include carbon sources such as metallurgical coal, charcoal, petroleum coke, pet coke, natural gas, or a combination of at least two thereof. In one variant of interest, the reducing agent includes lignite coal.

In some embodiments, the iron or steel slag particles and the reducing agent are mixed in a carbon-to-slag mass ratio of at least about 0.06 g of carbon per g of iron or steel slag. For example, the iron or steel slag particles and the reducing agent are mixed in a carbon-to-slag mass ratio in the range of from about 0.06 to about 0.12 g of carbon per g of iron or steel slag, limits included. For instance, the iron or steel slag particles and the reducing agent are mixed in a carbon-to-slag mass ratio of about 0.06 g of carbon per g of iron or steel slag, or about 0.09 g of carbon per g of iron or steel slag, or about 0.12 g of carbon per g of iron or steel slag.

Examples of suitable fluxing agents include, but are not limited to silica ($SiO_2$), alumina ($Al_2O_3$), and a combination of at least two thereof. In one variant of interest, the fluxing agent is silica. In another variant of interest, the fluxing agent is alumina. In another variant of interest, the fluxing agent includes both alumina and silica. For instance, the fluxing agent can be selected for its ability to promote liquid phase formation or to remove chemical impurities from the metal phase of the iron or steel slag.

In some embodiments, the iron or steel slag particles and the fluxing agent are mixed in a flux-to-slag mass ratio in the range of from 0 to about 0.1 g of fluxing agent per g of iron or steel slag. For instance, the iron or steel slag particles and the fluxing agent are mixed in a flux-to-slag mass ratio 0 g of fluxing agent per g of iron or steel slag, or about 0.05 g of fluxing agent per g of iron or steel slag, or about 0.1 g of fluxing agent per g of iron or steel slag.

As illustrated in FIG. 3, the method can further include grinding the iron or steel slag to obtain the iron or steel slag particles prior to mixing. For example, any compatible grinding method is contemplated. According to a variant of interest, the grinding is performed using at least one of a jaw crusher and a disk mill. In some embodiments, the method further includes classifying and separating the iron or steel slag particles by size into fractions. For example, the slag particles may be screened and classified into narrow sized fractions to obtain iron or steel slag particles having a size of less than about 200 mesh (about 74 μm). In some examples, the iron or steel slag particles are substantially uniform in size.

Still referring to FIG. 3, the method can further include drying the iron or steel slag particles prior to mixing in order to remove the water content. For instance, the drying can be carried out at a temperature of at least about 50° C. For example, the drying may be carried out at a temperature in the range of from about 50° C. to about 80° C. For instance, the drying may be carried out for a time period of at least about 24 hours.

Still referring to FIG. 3, the method can further include the step of pelletizing the mixture including the iron or steel slag particles, the reducing agent and the fluxing agent to produce a pellet. For instance, the pelletizing step can be carried out in order to increase substantially the contact area between the reducing agents and the iron or steel slag particles to increase the reduction rate during a subsequent smelting step.

In some embodiments, the pelletizing step can be performed by pressing the mixture into a pellet using a press. Any compatible pelletizing method is contemplated. According to a variant of interest, the pelletizing is performed by pressing the mixture into a pellet using a pneumatic/hydraulic press. In some examples, the pelletizing is carried out at a pressure of about 250 MPa for about 3 minutes, for instance, under these conditions the pellet has a diameter of about 28.6 mm.

Still referring to FIG. 3, the method also includes the step of smelting the mixture including the iron or steel slag particles, the reducing agent and the fluxing agent or the pellet to obtain a slag phase and the target metal as a metallic phase. The smelting step is performed by applying heat to mixture or the pellet in order to extract the target metal. Any compatible means of applying heat is contemplated. For example, the smelting step is performed using a melting or a smelting furnace.

In some examples, the smelting step is carried out at a temperature in the range of from about 1300° C. to about 1800° C., with a heating rate of about 180° C. per hour, a cooling rate of about 180° C. per hour, and a holding time of about 1.5 hours. For example, the smelting step is carried out at a temperature in the range of from about 1300° C. to about 1700° C., or from about 1300° C. to about 1600° C., or from about 1400° C. to about 1800° C., or from about 1400° C. to about 1700° C., or from about 1400° C. to about 1600° C., or from about 1500° C. to about 1800° C., or from about 1500° C. to about 1700° C., or from about 1500° C. to about 1600° C., limits included. In one variant of interest, the smelting step is carried out at a temperature in the range of from about 1500° C. to about 1600° C., limits included. In some examples, the smelting step can be performed under an inert atmosphere, for example, under an argon atmosphere. In one variant of interest, the smelting step is carried out at a temperature of about 1500° C. In another variant of interest, the smelting step is carried out at a temperature of about 1550° C. In yet another variant of interest, the smelting step is carried out at a temperature of about 1600° C. For instance, increasing the smelting temperature reduces the viscosity of the iron or steel slag and thereby enhances the separation of the target metal as a metallic phase from the slag phase resulting in an increased extraction efficiency.

In some embodiments, the iron or steel slag is a by-product of an iron or steel-making process (not shown in FIG. 3). For instance, the iron or steel-making process provides heat energy to the iron or steel slag and the iron or steel slag particles can be at an elevated temperature prior to the mixing and smelting steps, thereby reducing the energy input required to obtain the temperature needed in the smelting step.

In some embodiments, the iron or steel slag particles and the reducing agent undergo an oxidation reduction (redox) reaction releasing chemical energy. For instance, the redox reaction produces heat as a by-product (exothermic reaction). Alternatively, the iron or steel slag particles and the reducing agent undergo an redox reaction without releasing chemical energy. For instance, when the redox reaction releases chemical energy, it may reduce the energy input required to obtain the temperature needed in the smelting step.

As also illustrated in FIG. 3, the method also includes the step of separating the metallic phase (e.g. iron) from the slag phase. Any compatible means of separating the metallic phase from the slag phase is contemplated. For example, the metallic phase can be separated from the slag phase manually, for instance, using any compatible mechanical separation method.

Still referring to FIG. 3, the method can further include the step of grinding the slag phase to obtain the slag particles. For example, any compatible grinding method is contemplated. In some embodiments, the method further includes classifying and separating the slag particles by size into fractions. For example, the slag particles may be screened and classified into narrow sized fractions to obtain slag particles having a substantially reduced size. In some examples, the slag particles are substantially uniform in size.

Still referring to FIG. 3, the method can optionally include the step of further reducing the metallic phase (e.g. iron) content in the slag phase to produce a slag depleted of the target metal, for instance, an iron depleted slag.

In some embodiments, the step of further reducing the metallic phase content in the slag phase can be performed by magnetic separation. Any magnetic separation method is contemplated. For example, the magnetic separation can be performed using a Davis™ tube.

Still referring to FIG. 3, the method can further include subjecting the slag depleted of the target metal (e.g. iron depleted slag) to a pyro-hydrometallurgical process to recover at least one valuable element from the slag depleted of the target metal. For example, the pyro-hydrometallurgical process can be the ABWL process as described herein.

The recovery of valuable elements from an iron or a steel slag may tackle the sustainability challenges associated with the supply of strategic materials, protection of the natural resources and effectively unveils the hidden value of industrial wastes. The technology described herein may significantly reduce the volume of waste to be disposed, leading to cost savings and environmental benefits. In addition, recycling the pyrolysis gas and waste leachate generated in the hydrometallurgical process may further reduce chemical costs. This acid-baking water-leaching method may facilitate efficient recovery of target metal compared to conventional methods. Another advantage of the technology described herein is that it may be possible to use the remaining heat of the iron or steel-making process in the acid baking step, which also means reducing the costs and benefitting the environment by proposing a method that is further environmentally sustainable. Thus, this method is applicable to the iron or steel slag valorization.

EXAMPLES

The following non-limiting examples are illustrative embodiments and should not be construed as limiting the scope of the present invention. These examples will be better understood with reference to the accompanying Figures.

Example 1: Recovery of Valuable Elements from EAF Slag by ABWL

EAF Slag Particles Preparation and Characterization

EAF slag samples were crushed and ground using a ball mill to obtain EAF slag particles. The EAF slag particles were then screened and classified into narrow sized fractions to obtain a substantially uniform −200 mesh particle size. The screened EAF slag particles were then dried in a convection oven for more than 24 hours.

The EAF slag particles were characterized by X-ray diffraction (XRD), scanning electron microscopy with energy dispersive spectroscopy (SEM-EDS), inductively coupled plasma mass spectrometry (ICP-MS) and inductively coupled plasma optical emission spectrometry (ICP-OES).

Figure 4:
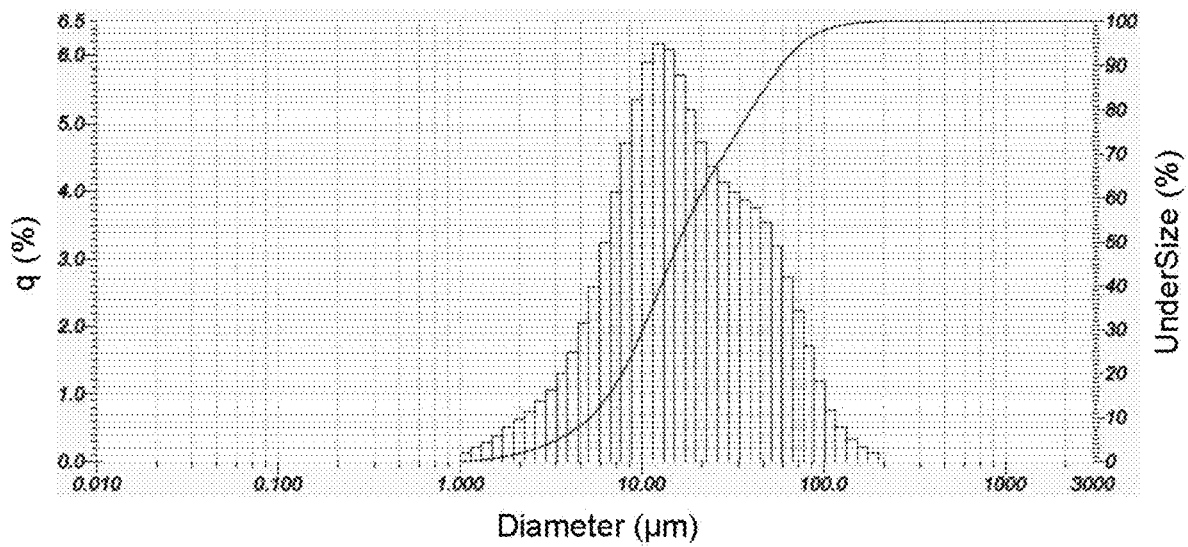
FIG. 4 is a graph of the particle-size distribution of a ground electric-arc-furnace (EAF) slag, as described in Example 1 (a).

The particle-size distribution of ground EAF slag was measured using a particle size analyzer. As can be seen in FIG. 4, the median particle size is about 16.0 µm, the mean particle size is about 25.3 µm, and the $D_{90}$ is about 58.4 µm.

Figure 5:
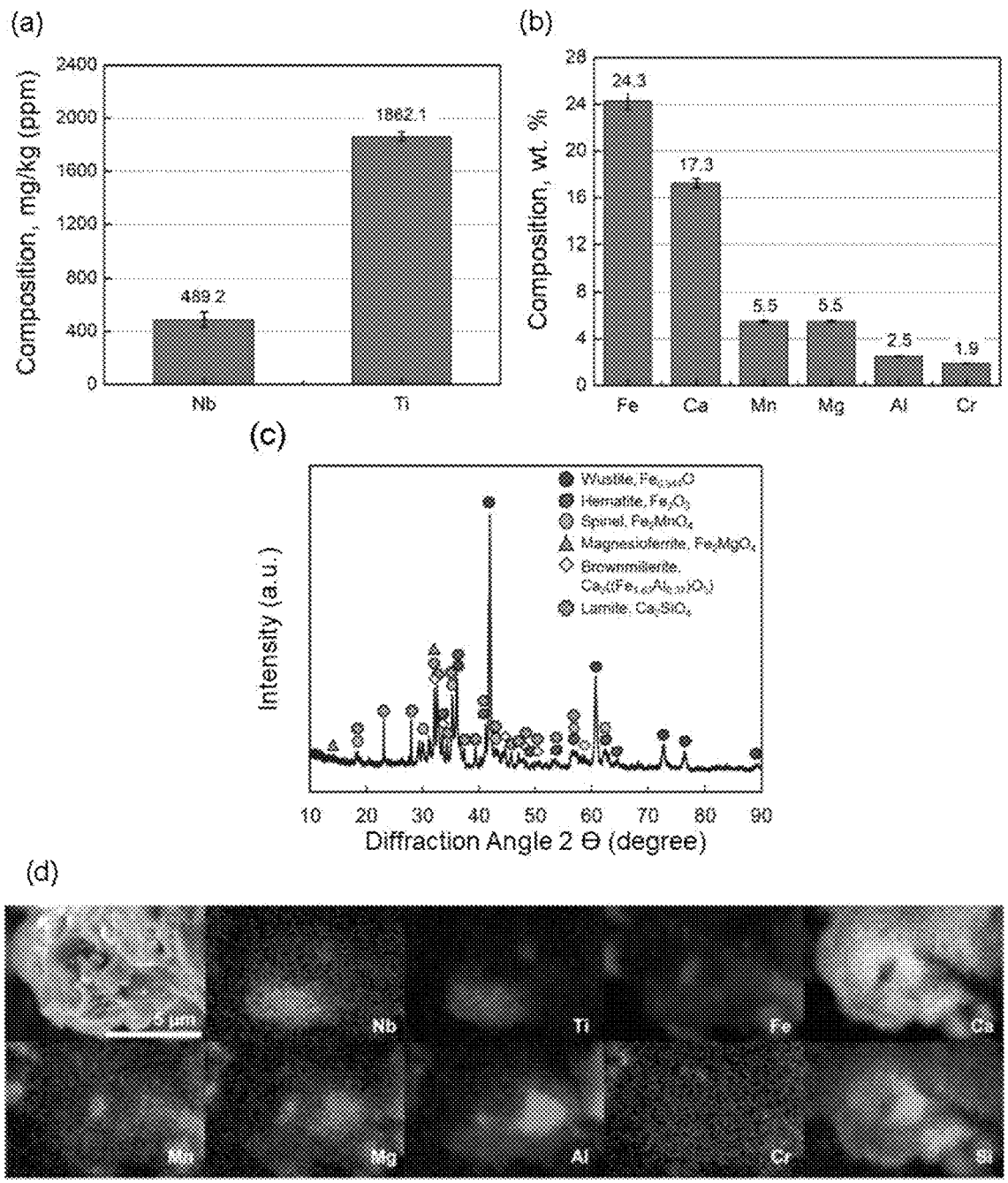
FIG. 5 displays characterization results for a ground EAF slag, showing in (a) and (b) graphs of the inductively coupled plasma optical emission spectroscopy (ICP-OES) results indicating elemental compositions, in (c) an X-ray diffraction pattern, in (d) a scanning electron microscope (SEM) image of a slag particle (scale bar represents 5 μm) and energy-dispersive X-ray spectroscopy (EDS) elemental mapping of the slag particle, as described in Example 1(a).

As shown in FIG. 5, the elemental composition of the EAF slag was characterized by ICP-OES after an aqua regia digestion (FIGS. 5 (a) and (b)). The EAF slag sample contained about 0.05 wt. % of Nb, about 0.19 wt. % of Ti, about 24 wt. % of Fe, about 17 wt. % of Ca, about 6 wt. % of Mn, about 6 wt. % of Mg, about 3 wt. % of Al, and about 2 wt. % of Cr.

As shown in FIG. 5 (c), several oxide phases were detected including wüstite $Fe_{0.944}O$, hematite $Fe_2O_3$, brownmillerite $Ca_2((Fe_{1.63}Al_{0.37})O_5)$, spinel magnesioferrite $Fe_2MgO_4$, and larnite $Ca_2Si$. Although the results indicated that the sample was mainly in an oxide form, other phases, that were not identified because of the complexity of the sample peaks, could also be present. Furthermore, the low concentrations of Nb and Ti precluded the detection of phases comprising these elements.

The surface morphology and elemental mapping were investigated using SEM-EDS, as shown in FIG. 5 (d). The EDS results indicated that Nb and Ti are concentrated in particular regions and are highly associated with each other and with Ca. For instance, Ti can exist as calcium titanate and Nb can exist in the same compound through isomorphous substitution.

Recovery of Metals from EAF Slag Particles

After drying, several samples were prepared by mixing 2 g of the screened EAF slag particles prepared in Example 1 (a) with concentrated (96 wt. %) $H_2SO_4$ and then baking the mixture in a furnace at different temperatures between 200° C. to 400° C. The acid baked samples were then leached in water at a temperature of 25° C. under magnetic stirring for 6 hours at different slag-to-water density and agitation rates. The leachate solutions were diluted using a Hamilton™ Microlab 600™ dual diluter and dispenser system and characterized by ICP-OES. The samples were characterized by XRD and SEM-EDS before and after acid baking.

Experimental Design and Empirical Model Building

A systematic study was performed to investigate the quantitative effect of five operating factors namely the acid baking temperature ($X_1$), the acid-to-slag particle mass ratio ($X_2$), the acid baking time ($X_3$), the leaching pulp density (or slag particles-to-water density) ($X_4$), the agitation rate ($X_5$), and the combinations of these factors on the extraction efficiency of Nb, Ti, Fe, Ca, Mn, Mg, Al, and Cr.

For the statistical investigation, the test factors were coded to low (−1), mid (0), and high (+1) levels to allow direct comparison of the relative effect of each factor based on the magnitude of the factor model coefficients.

Detailed information about the factor levels is presented in Table 1. Upper and lower limits of factor levels were selected on the basis of preliminary experiments, within the operating region in which the system response could be substantially linear.

TABLE 1

Summary of factor −1, 0, and +1 levels for test factors

| Factor | Factor description | −1 Level | 0 Level | +1 Level |
|---|---|---|---|---|
| $X_1$ | Baking temperature (° C.) | 200 | 300 | 400 |
| $X_2$ | Acid-to-slag mass ratio | 1 | 2 | 3 |
| $X_3$ | Baking time (min) | 30 | 75 | 120 |
| $X_4$ | Slag-to-water density (g/L) | 50 | 125 | 200 |
| $X_5$ | Agitation rate (rpm) | 150 | 350 | 550 |

The experimental matrix with its five operating factors was designed using a fractional factorial design methodology, which is one of the statistical methods used to assess the effect of each factor and the interactions between the factors on the responses. A series of $A2_V^{5-1}$ factorial tests were carried out on the basis of the design matrix a total nineteen runs, including three centre-point experiments for the estimation of run variance. Although the experimental runs are shown in standard order, the actual runs were performed in a randomized order to minimize the possibility of a random error.

Additional tests were carried out at $X_2$ of 1.25, 1.50, and 1.75 to investigate the effects of $X_2$ and kinetic studies were conducted at $X_1=200°$ C. and 400° C. for 7 hours. These experiments made the design matrix unbalanced, and therefore not included in the empirical model building dataset.

The $A2_V^{5-1}$ experimental design matrix for empirical model building is presented in Table 2 below.

TABLE 2

A $2_V^{5-1}$ Experimental design matrix for empirical model building

| Experiments | $X_1$ | $X_2$ | $X_3$ | $X_4$ | $X_5$ |
|---|---|---|---|---|---|
| 1 | −1 | −1 | −1 | −1 | 1 |
| 2 | −1 | 1 | −1 | −1 | −1 |
| 3 | −1 | −1 | 1 | −1 | −1 |
| 4 | −1 | 1 | 1 | −1 | 1 |
| 5 | −1 | −1 | −1 | 1 | −1 |
| 6 | −1 | 1 | −1 | 1 | 1 |
| 7 | −1 | −1 | 1 | 1 | 1 |
| 8 | −1 | 1 | 1 | 1 | −1 |
| 9 | 1 | −1 | −1 | −1 | −1 |
| 10 | 1 | 1 | −1 | −1 | 1 |
| 11 | 1 | −1 | 1 | −1 | 1 |
| 12 | 1 | 1 | 1 | −1 | −1 |
| 13 | 1 | −1 | −1 | 1 | 1 |
| 14 | 1 | 1 | −1 | 1 | −1 |
| 15 | 1 | −1 | 1 | 1 | −1 |
| 16 | 1 | 1 | 1 | 1 | 1 |
| Validation tests (3 replicates) | 0 | 0 | 0 | 0 | 0 |
| −1 Level | 200 | 1 | 30 | 50 | 150 |
| 0 Level | 300 | 2 | 75 | 125 | 350 |
| +1 Level | 400 | 3 | 120 | 200 | 550 |

The experimental response of the target element i ($y_i$) was determined on the basis of the ICP-OES measurement of the concentration and the calculated extraction efficiency as outlined in Equation 1.

$$y_i = \left(\frac{C_i V_i}{m_o}\right) \times 100 \quad [eq.\ 1]$$

Where $C_i$ is the concentration of the analyte (the target element) in the leachate, $V_i$ is the volume of the leachate, and $m_0$ is the weight of each target element present in the used raw sample.

The effect of each studied factor and combinations of these factors on the extraction efficiency was quantitatively assessed by fitting the experimental data and the empirical models for each target element given in Equation 2 (below) were built to estimate the extraction efficiency of target elements ($\hat{Y}_i$) and optimize the ABWL process.

The models were fit to the experimental data by Multiple Linear Least Squares Regression (mLLSR) shown in Equation 3 (below), where $\hat{\beta}$ is the vector containing each of the model factors, the constant factor ($\beta_0$) corresponds to the baseline bias for that analyte, $\beta_1$ corresponds to the acid baking temperature, $\beta_2$ represents the acid-to-slag mass ratio, $\beta_3$ corresponds to the acid baking time, $\beta_4$ represents the slag-to-water density, $\beta_5$ corresponds to the agitation rate. $\beta_{ij}$ corresponds to the combination of the two factors $X_i$ is the experimental design matrix (Table 2), and $Y_i$ is the response matrix containing the measured extraction efficiency for analyte i.

$$\hat{y}_i = \beta_0 + \beta_1 X_1 + \beta_2 X_2 + \beta_3 X_3 + \beta_4 X_4 + \beta_5 X_5 + \beta_{12} X_1 X_2 + \beta_{13} X_1 X_3 + \beta_{14} X_1 X_4 + \beta_{15} X_1 X_5 + \beta_{23} X_2 X_3 + \beta_{24} X_2 X_4 + \beta_{25} X_2 X_5 + \beta_{34} X_3 X_4 + \beta_{35} X_3 X_5 + \beta_{45} X_4 X_5 \quad [eq.\ 2]$$

$$\hat{\beta} = (X^T X)^{-1} (X^T Y_i) \quad [eq.\ 3]$$

On the basis of a two-tailed t-distribution shown in Equation 4 (below), the significance of each of the model parameters was verified by determining 95% confidence intervals ($CI_{95}\%$). The parameter variance ($s_\beta^2$) was estimated as the square of the pooled standard deviation of each of the pairs of replicating runs. Any parameters for which the confidence interval includes zero were removed from the model, leaving only the parameters which have a significant effect on the response.

$$CI_{95\%} = \hat{\beta}_j \pm t_{m, 0.05/2} \times \sqrt{\frac{s_\beta^2}{n_j}} \quad [eq.\ 4]$$

The analysis of variance (ANOVA) was performed for the simplified models to assess the accuracy of the fit for the models. The coefficient of determination ($R^2$), a measure of the correlation between the measured analyte extraction efficiency ($y_i$) and the predicted values ($\hat{y}_i$), was determined according to Equation 5. The significance of the models was then assessed by an F test (Equations 6 and 7), and the adequacy of the models was evaluated by an R test (Equations 8 and 9).

$$R^2 = 1 - \frac{ResSS}{TSS_{cfm}} = \frac{RSS_{cfm}}{TSS_{cfm}} = \frac{\sum_{k=1}^{p}(\hat{y}_{i,k} - \bar{y}_i)^2}{\sum_{k=1}^{p}(y_{i,k} - \bar{y}_i)^2} \quad [eq.\ 5]$$

$$ResSS = \sum_{k=1}^{p}(\hat{y}_{i,k} - y_{i,k})^2 = TSS_{cfm} - RSS_{cfm} \quad [eq.\ 6]$$

Reject $H_o$ if: [eq. 7]

$$F = \frac{RSS_{cfm}}{ResSS} \times \frac{dof_{ResSS}}{dof_{RSS_{cfm}}} > F_{dof_{RSS_{cfm}}, dof_{ResSS}, 0.05}$$

$$SSLF = ResSS - SSPE = ResSS - s_\beta^2 \times m \quad [eq.\ 8]$$

Reject $H_o$ if: [eq. 9]

$$R = \frac{SSLF}{SSPE} \times \frac{dof_{SSPE}}{dof_{SSLF}} > F_{dof_{SSLF}, dof_{SSPE}, 0.05}$$

(a) Determination of the Operating Parameters and Evaluation of their Effects on Nb, Ti, Fe, Ca, and Other Elements Extraction Efficiency The effect of ABWL operating parameters on Nb, Ti, Fe, Ca, and other elements extraction efficiency was investigated with respect to $X_1$, $X_2$, $X_3$, $X_4$, and $X_5$.

A summary of operating conditions and the corresponding extraction efficiency for Nb, Ti, Fe, Ca, Mn, Mg, Al, and Cr is provided in Table 3 below. In these trials, the maximum extraction efficiency of Nb and Ti was 100% and other elements such as Fe, Mn, and Mg were co-extracted at more than 95% efficiency.

TABLE 3

Summary of the experimental runs with corresponding operating parameters and extraction efficiency for the recovery of Nb, Ti, Fe, Ca, and other impurities

| Run # | $X_1$ | $X_2$ | $X_3$ | $X_4$ | $X_5$ | Extraction Efficiency (%) | | | | | |
|---|---|---|---|---|---|---|---|---|---|---|---|
| | | | | | | Nb | Ti | Fe | Ca | Mn | Mg |
| 1 | 200 | 1 | 30 | 50 | 550 | 32.2 | 52.6 | 44.2 | 16.2 | 41.2 | 45.0 |
| 2 | 200 | 3 | 30 | 50 | 150 | 30.8 | 75.4 | 71.3 | 35.1 | 73.9 | 73.9 |
| 3 | 200 | 1 | 120 | 50 | 150 | 49.3 | 62.2 | 45.1 | 15.3 | 40.6 | 46.5 |
| 4 | 200 | 3 | 120 | 50 | 550 | 74.5 | 97.8 | 100.0 | 38.7 | 100.0 | 100.0 |
| 5 | 200 | 1 | 30 | 200 | 150 | 40.7 | 59.5 | 48.3 | 3.9 | 50.1 | 51.1 |
| 6 | 200 | 3 | 30 | 200 | 550 | 30.4 | 74.9 | 78.6 | 7.6 | 82.7 | 80.4 |
| 7 | 200 | 1 | 120 | 200 | 550 | 51.3 | 68.5 | 49.1 | 4.0 | 47.7 | 51.9 |
| 8 | 200 | 3 | 120 | 200 | 150 | 84.2 | 95.1 | 100.0 | 9.9 | 99.2 | 98.1 |
| 9 | 400 | 1 | 30 | 50 | 150 | 85.0 | 56.2 | 46.0 | 13.3 | 40.6 | 46.2 |
| 10 | 400 | 3 | 30 | 50 | 550 | 77.6 | 100.0 | 100.0 | 29.2 | 100.0 | 100.0 |
| 11 | 400 | 1 | 120 | 50 | 550 | 77.1 | 45.1 | 38.8 | 13.0 | 38.5 | 43.9 |
| 12 | 400 | 3 | 120 | 50 | 150 | 100.0 | 89.8 | 99.0 | 20.3 | 100.0 | 100.0 |
| 13 | 400 | 1 | 30 | 200 | 550 | 82.9 | 54.0 | 47.4 | 3.3 | 46.3 | 48.2 |
| 14 | 400 | 3 | 30 | 200 | 150 | 90.0 | 100.0 | 100.0 | 7.5 | 100.0 | 100.0 |
| 15 | 400 | 1 | 120 | 200 | 150 | 83.8 | 55.7 | 42.3 | 3.4 | 44.6 | 46.2 |
| 16 | 400 | 3 | 120 | 200 | 550 | 94.9 | 89.4 | 98.8 | 5.4 | 96.9 | 100.0 |
| 17 | 300 | 2 | 75 | 125 | 350 | 68.3 | 95.0 | 80.9 | 10.1 | 83.6 | 100.0 |
| 18 | 300 | 2 | 75 | 125 | 350 | 65.3 | 94.9 | 79.2 | 10.0 | 83.6 | 99.2 |
| 19 | 300 | 2 | 75 | 125 | 350 | 67.1 | 95.0 | 82.5 | 10.0 | 83.7 | 98.2 |
| 20 | 300 | 2 | 75 | 125 | 350 | 61.0 | 93.2 | 81.5 | 9.2 | 84.0 | 92.4 |
| 21 | 300 | 2 | 75 | 125 | 350 | 59.2 | 92.5 | 80.2 | 9.1 | 86.5 | 91.3 |

In Table 3, runs number 17 to 21 are validation runs analyzed with standard stock solutions of Nb and Ti with a concentration of 100 mg/L and that of Fe, Ca, Mn, Mg, Al, and Cr with a concentration of 1000 mg/L supplied by Inorganic Ventures, Inc™.

Figure 6:
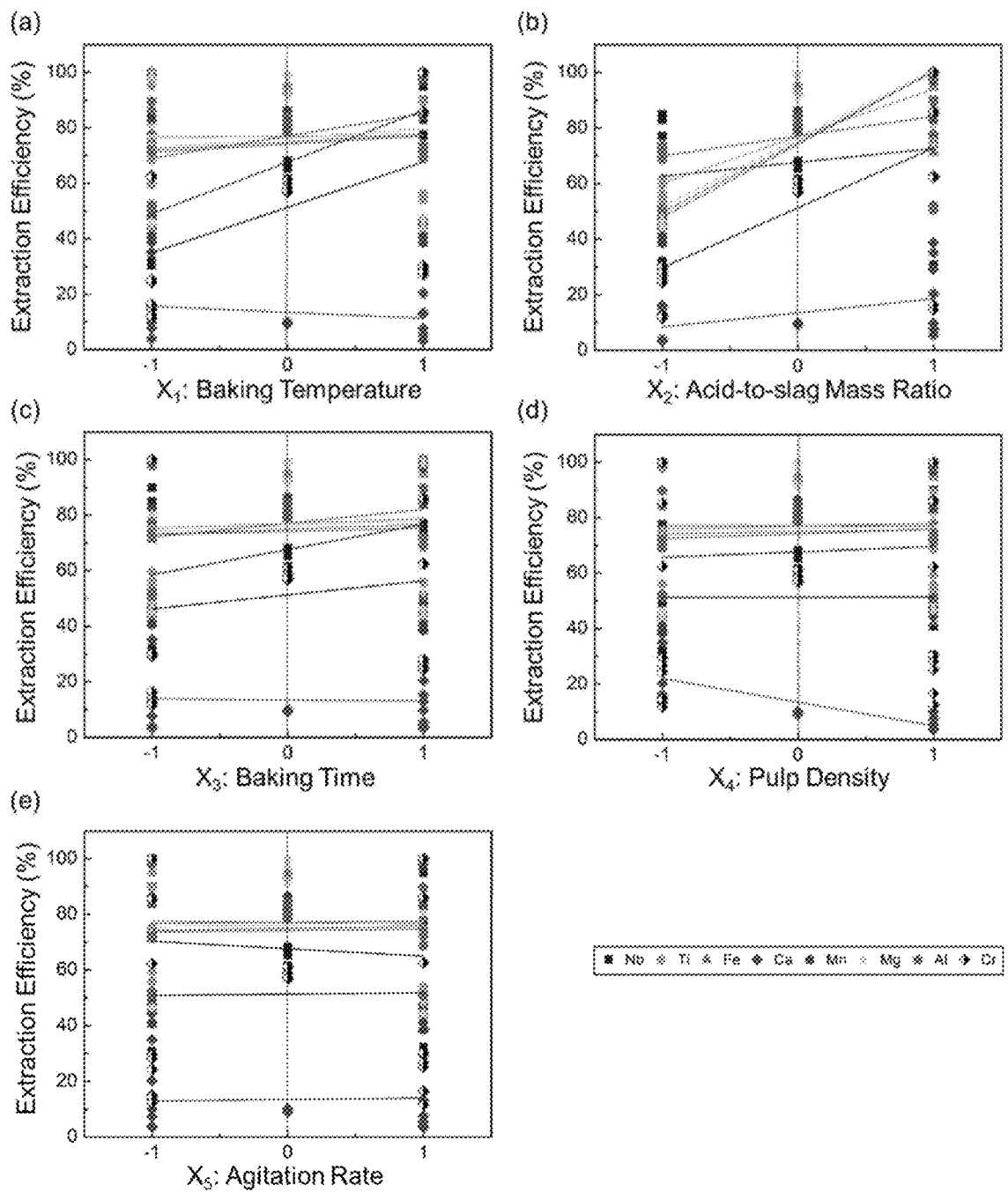
FIG. 6 displays extraction efficiency results for several elements with different factor levels, showing in (a) a graph of the baking temperature, in (b) the acid-to-slag mass ratio, in (c) the baking time, in (d) slag-to-water density and in (e) the agitation rate, as described in Example 1(d).

The effect of each factor ($X_1$ to $X_5$) was determined, the extraction efficiency of each element with different factor levels are presented in FIG. 6.

As can be seen in FIG. 6 (a), $X_1$ has a substantial positive impact on the extraction efficiency of Nb and Cr with a leaching time of 6 hours. For the same leaching time, the Ca extraction efficiency is negatively affected by increasing $X_1$.

As can be seen in FIG. 6 (e), $X_5$ has a substantially negligible effect on the extraction efficiency of almost all the elements; except for Ca, where $X_5$ has a slight but positive impact. These results indicate that an $X_5$ of 150 rpm is sufficient for the system to reach chemical equilibrium and to extract almost all elements from the EAF slag, although the second-order effect of this parameter should be considered to accurately predict the maximum extraction efficiency.

Figure 7:
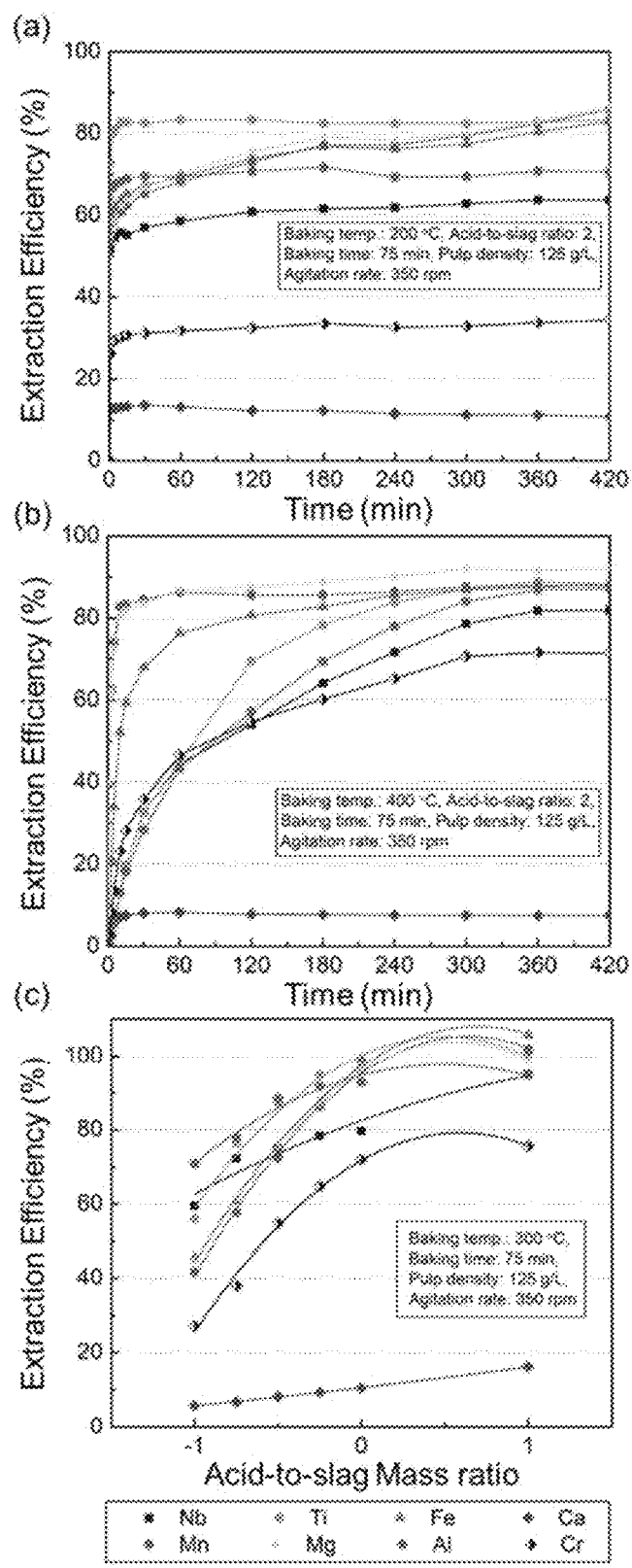
FIG. 7 shows in (a) and (b) graphs of kinetic test results of various elements respectively at a baking temperature of 200° C. and 400° C.; in (c) a graph of the extraction efficiency of various elements at different acid-to-slag mass ratio, including additional test results at a ratio of 1.25, 1.50 and 1.75, as described in Example 1(d).

As shown in FIGS. 7 (a) and (b), kinetic water leaching experiments were performed on samples baked at 200° C. and 400° C. for up to 7 hours, which indicated that the kinetic of the leaching process is slower for samples prepared at $X_1$=400° C. compared with samples prepared at $X_1$=200° C.; and if a sufficient amount time is allowed to reach equilibrium, increasing $X_1$ has a positive effect on the leaching efficiency of all elements, except for Ca, possibly because Ca precipitates as $CaSO_4$ in sulfate media, which has very low solubility in water.

Among the operating factors investigated, $X_2$ showed the most significant positive impact on the extraction of the most elements, which may be attributed to the fact that, at higher acid-to-slag ratios, there are more acid molecules to react with the slag particles sample, effectively leading to a substantial increase in extraction efficiency.

It should be noted that for Fe and Ti, $X_2$=2 is sufficient to reach their respective maximum extraction efficiency.

Therefore, center-point results at a factor level 0 (ratio of 2) were similar to those at a factor level +1 (ratio of 3). Thus, additional experiments, in the range of factor level −1 (ratio of 1) to level 0 (ratio of 2), were required to gain further insight into the effects of this factor on the extraction efficiency of Fe and Ti. Additional tests were carried out at acid-to-slag mass ratios of 1.25, 1.50, and 1.75 and the results are presented in FIG. 7 (c).

As shown in FIG. 7 (c), the extraction efficiency of Nb and Ca has a linear relationship with $X_2$, more particularly in the range of 1 to 3, while second-order interactions can also be observed between $X_2$ and Fe, Ti, as well as other elements (second-order curvatures).

(a) Empirical Model Building

Figure 8:
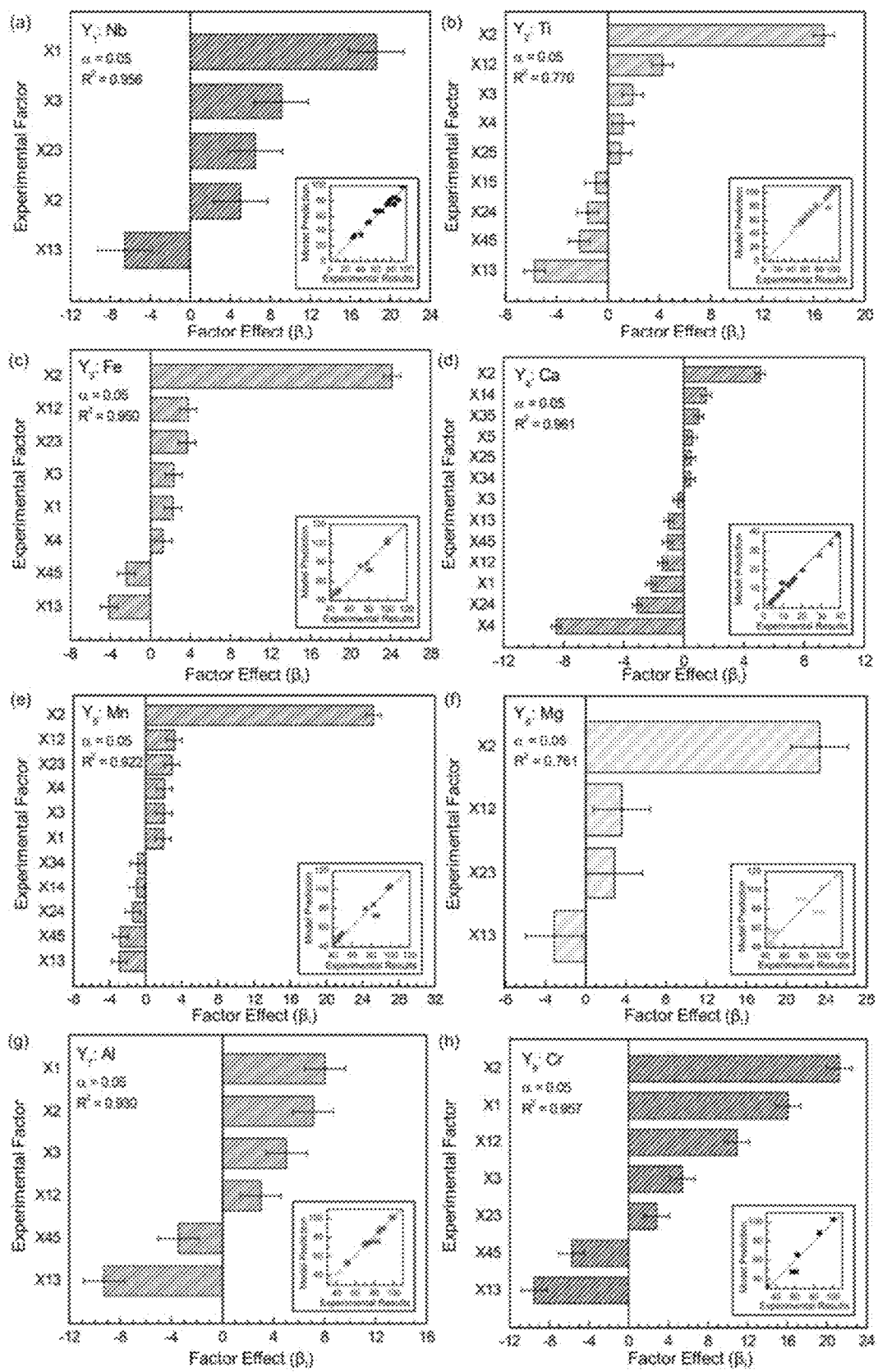
FIG. 8 is a graph of the factor effect coefficients for an empirical extraction model, showing in (a) results for Nd, in (b) results for Ti, in (c) results for Fe, in (d) results for Ca, in (e) results for Mn, in (f) results for Mg, in (g) results for Al and in (h) results for Cr, as described in Example 1 (e). The inset graphs show the correlation between the predicted results from the empirical models and the experimental results.

An empirical extraction model was built by mLLSR, as shown in Equation 2, to assess the relative effects of the primary experimental factors and aliased second-order interactions. FIG. 8 presents the ordered factor effect coefficients for empirical extraction models for each element.

As shown in FIG. 8 (a), the factors with the most significant positive impact on Nb extraction are $X_1$ and $X_3$. The reason behind this observation is that $Nb^{5+}$ is likely to replace $Ti^{4+}$ in the $CaTiO_3$ phase. Because the charge density of $Nb^{5+}$ is greater than that of $Ti^{4+}$, this substitution results in a greater stability. Therefore, more energy is required for the Nb sulfation reaction. Also, it is known that the Nb oxide starts dissolving in a sulfate media only at high temperatures. Another reason for the positive effect of $X_1$ and $X_3$ is that increasing $X_1$ to 400° C. results in the conversion of $(H_3O)Fe(SO_4)_2$ phases to $Fe_2(SO_4)_3$ phases which releases $H_2SO_4$ and thereby increases the extraction efficiency of Nb. Increasing $X_3$ increases the residence time and thus results in a positive effect on the extraction efficiency.

In addition to $X_1$ and $X_3$, Nb extraction is slightly positively affected by increasing $X_2$. On the basis of the Eh-pH diagram (or Pourbaix diagram, also known as a potential/pH diagram), under the acidic conditions of the water leaching step, $Nb_2O_5$ is soluble which explains the less significant effect of $X_2$ on Nb extraction efficiency.

In the case of Ti, the extraction efficiency significantly increases with increasing $X_2$, which suggests that in the digestion reaction, acid is the limiting reagent; thus, when more acid molecules are available, more Ti molecules transform to soluble Ti sulfate (FIG. 8 (b)). As mentioned above, Ti can exist within Ca-bearing phases as $CaTiO_3$ which has a cubic crystal structure. Because Ti is at the center of the unit cell and is surrounded by Ca atoms, Ca must first react with $H_2SO_4$ to extract Ti during the acid baking process. This explains the positive effect of $X_2$ on Ti extraction efficiency. According to the Eh-pH diagram, $Ti_2(SO_4)_3$ is only soluble at low pH which further explains the positive effect of $X_2$.

Other elements (Fe, Mn, Mg) have a similar extraction behavior to Ti, but the magnitude of each factor effect is slightly different (FIGS. 8 (c), (e), and (f)). $X_4$ shows a negligible or slight positive impact on the extraction efficiency of all elements except for Ca (FIG. 8 (d)). $X_5$ has a negligible effect on the extraction efficiency of all elements except Ca which can be expected since the positive effect of the agitation rate can only be observed if the film diffusion is the rate-limiting step. Thus, a 150 rpm agitation rate is adequate to extract almost all elements from the EAF slag.

$X_4$ has a positive effect on the extraction efficiency of almost all elements. For this reason, 200 g/L can be considered adequate to extract almost all elements from the EAF slag.

Ca shows a distinctive extraction behavior, in which $X_4$ has a negative impact and $X_2$ has a positive impact. At high $X_4$, more solids are available for leaching if there is enough acid for extraction; however, the solubility of $CaSO_4$ is low in water. Therefore, more Ca from the solution precipitates at high $X_4$, hence a decrease in extraction efficiency can be observed. The positive impact of $X_2$ can be attributed to the fact that $CaSO_4$ solubility increases with increasing $H_2SO_4$ concentration in the pH range investigated in the present examples.

Detailed information concerning the primary and secondary effects on the extraction efficiency of Nb, Ti, Fe, Ca, Mn, Mg, Al, and Cr is presented in Table 4.

TABLE 4

Effect of factors on the extraction efficiency

| Factor | Nb | Ti | Fe | Ca | Mn | Mg | Al | Cr |
|---|---|---|---|---|---|---|---|---|
| $\beta_1$ | 18.6 | 0.0 | 2.2 | −2.2 | 2.0 | 0.0 | 8.0 | 16.1 |
| $\beta_2$ | 5.0 | 16.8 | 24.1 | 5.1 | 25.2 | 23.3 | 7.1 | 21.2 |
| $\beta_3$ | 9.1 | 1.9 | 2.3 | −0.4 | 2.0 | 0.0 | 5.0 | 5.4 |
| $\beta_4$ | 0.0 | 1.1 | 1.3 | −8.5 | 2.1 | 0.0 | 0.0 | 0.0 |
| $\beta_5$ | 0.0 | 0.0 | 0.0 | 0.6 | 0.0 | 0.0 | 0.0 | 0.0 |
| $\beta_{12}$ | 0.0 | 4.2 | 3.8 | −1.4 | 3.2 | 3.6 | 3.0 | 10.9 |
| $\beta_{13}$ | −6.6 | −5.7 | −4.1 | −1.0 | −2.9 | −3.1 | −9.3 | −9.5 |
| $\beta_{14}$ | 0.0 | 0.0 | 0.0 | 1.5 | −1.0 | 0.0 | 0.0 | 0.0 |
| $\beta_{15}$ | 0.0 | −0.9 | 0.0 | 0.0 | 0.0 | 0.0 | 0.0 | 0.0 |
| $\beta_{23}$ | 6.5 | 0.0 | 3.7 | 0.0 | 2.9 | 2.9 | 0.0 | 2.8 |

TABLE 4-continued

Effect of factors on the extraction efficiency

| Factor | Nb | Ti | Fe | Ca | Mn | Mg | Al | Cr |
|---|---|---|---|---|---|---|---|---|
| $\beta_{24}$ | 0.0 | −1.6 | 0.0 | −3.1 | −1.4 | 0.0 | 0.0 | 0.0 |
| $\beta_{25}$ | 0.0 | 1.0 | 0.0 | 0.5 | 0.0 | 0.0 | 0.0 | 0.0 |
| $\beta_{34}$ | 0.0 | 0.0 | 0.0 | 0.4 | −0.9 | 0.0 | 0.0 | 0.0 |
| $\beta_{35}$ | 0.0 | 0.0 | 0.0 | 1.0 | 0.0 | 0.0 | 0.0 | 0.0 |
| $\beta_{45}$ | 0.0 | −2.2 | −2.4 | −1.1 | −2.8 | 0.0 | −3.4 | −5.8 |

(a) Acid-Baking Water-Leaching Process

From this empirical extraction model, the optimized recovery conditions were determined to be high $X_1$ (400° C., +1 level), high $X_2$ (3, +1 level), high $X_3$ (120 min, +1 level), high $X_4$ (200 g/L, +1 level), and low $X_5$ (150 rpm, +1 level). Experiments under optimum conditions were conducted to verify the applicability of the empirical model. The predicted extraction efficiency from the empirical model along with the actual leaching efficiency are presented in Table 5.

TABLE 5

Predicted and actual extraction efficiencies of Nb, Ti, and other elements at optimum operating conditions

| Elements | Predicted extraction efficiency (%) | Measured extraction efficiency (%) |
|---|---|---|
| Nb | 99.6 | 98.7 |
| Ti | 97.4 | 93.4 |
| Fe | 107.7 | 97.9 |
| Ca | 2.5 | 5.6 |
| Mn | 106.5 | 99.5 |
| Mg | 103.4 | 100.0 |
| Al | 92.9 | 85.2 |
| Cr | 100.5 | 88.9 |

As can be seen in Table 5, 98.7% of Nb, 93.4% of Ti, and more than 97% of Fe, Mn, and Mg extraction were achieved under these conditions. Thus, it was concluded that the empirical models built in this study can successfully predict the optimum operating conditions and the corresponding extraction efficiency with high accuracy (absolute average relative deviation (AARD)=12.8%).

(b) Characterization of the EAF Slag Before and After the Acid Baking Process

Figure 9:
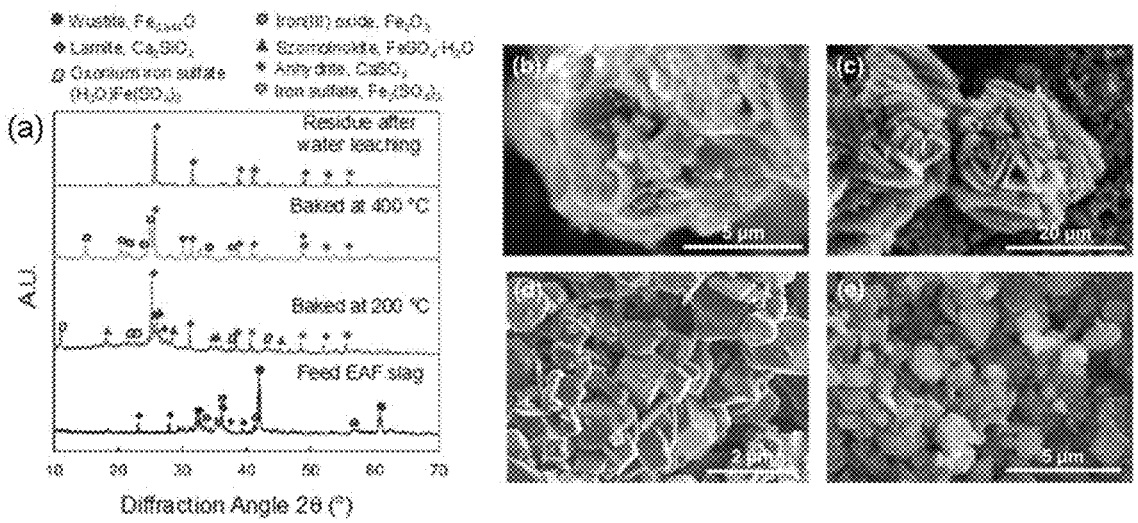
FIG. 9 displays the characterization of the EAF slag before and after the acid baking process results, showing in (a) XRD (X-ray Powder Diffraction) diffractogram of the EAF slag before and after the acid baking process, in (b) to (e) SEM images for various slag particle samples prepared with various acid-baking conditions, as described in Example 1 (g).

The crystal structure and surface morphology of the EAF slag before and after acid baking under different operating conditions were investigated by XRD and SEM-EDS (FIG. 9). FIG. 9 (a) shows XRD diffractograms of the EAF slag particles before and after the acid baking and water leaching process. SEM-EDS images are presented in FIGS. 9 (b) to (e), showing in (b) the raw EAF slag particles, in (c) a sample prepared at 200° C., in (d) a sample baked at 400° C., in (e) a residue obtained after water leaching step.

These samples were selected to study the impact of acid baking, baking temperature, and water leaching. XRD and SEM results are presented in FIG. 9. In EAF slag, Nb and Ti are present in trace amounts and are associated with Ca, as previously describe in relation with FIG. 5 (d). Hence, the investigation into the digestion mechanism of Nb and Ti requires observation of the mineralogical and morphological changes of major elements (i.e., Ca or Fe) phases during digestion in the acid baking process.

To investigate the mineralogical changes of the Ca and Fe phases during acid baking, samples baked at 200° C. and 400° C. were characterized by XRD. As can be seen in FIG. 9 (a), XRD results indicate that during the acid baking process, Fe major phases, i.e., wustite (FeO) and hematite (Fe$_2$O$_3$) and the Ca bearing phase (Ca$_2$SiO$_4$) are digested and replaced with sulfate phases. At lower baking temperature (200° C.), oxonium iron double sulfate ((H$_3$O)Fe(SO$_4$)$_2$), szomolnokite (FeSO$_4$·H$_2$O), and anhydrite (CaSO$_4$) are formed, but iron phases converts to anhydrous Fe$_2$(SO$_4$)$_3$ at higher baking temperature. On the basis of the XRD results, at 200° C., the following reactions are expected to take place:

$$4FeO_{(s)}+8H_2SO_{4(aq)}+O_{2(g)} \rightarrow (H_3O)Fe(SO_4)_{2(s)}+2H_2O_{(g)} \quad [eq. 10]$$

$$Ca_2SiO_{4(s)}+2H_2SO_{4(aq)} \rightarrow 2CaSO_{4(s)}+H_4SiO_{4(aq)} \quad [eq. 11]$$

At a higher baking temperature (400° C.), FeSO$_4$·H$_2$O and (H$_3$O)Fe(SO$_4$)$_2$ phases transformed to Fe$_2$(SO$_4$)$_3$, as can be seen in FIG. 9 (a), according to the following reactions:

$$2(H_3O)Fe(SO_4)_{2(s)} \rightarrow Fe_2(SO_4)_{3(s)}+H_2SO_{4(g)}+2H_2O_{(g)} \quad [eq. 12]$$

$$4FeSO_4 \cdot H_2O_{(s)}+4H_2SO_{4(aq)} \rightarrow 2Fe_2(SO_4)_{3(s)}+2SO_{2(g)}+8H_2O_{(g)} \quad [eq. 13]$$

$$4FeSO_4 \cdot H_2O_{(s)}+2H_2SO_{4(aq)}+O_{2(g)} \rightarrow 2Fe_2(SO_4)_{3(s)}+6H_2O_{(g)} \quad [eq. 14]$$

As can be seen in Equation 12, the conversion of (H$_3$O)Fe(SO$_4$)$_2$ to Fe$_2$(SO$_4$)$_3$ releases additional H$_2$SO$_4$. This extra acid can participate in the sulfation reaction thereby can increase the extraction efficiency of target elements. Unlike FeSO$_4$·H$_2$O and (H$_3$O)Fe(SO$_4$)$_2$ that have a weak layered hydrogen bonded structure, Fe$_2$(SO$_4$)$_3$ produced at 400° C. has a cubic structure; thus, the leaching kinetic of the sample baked at 400° C. is slower than that of samples baked at 200° C., as shown in FIGS. 7 (a) and (b).

As can be seen in FIG. 9 (a), the residue after the water leaching step mainly consists of CaSO$_4$ and since it has low solubility in water, the extraction efficiency of Ca is low.

The microfluidic transport environment in silicate-rich phases can occasionally lead to the polymerization of silica gels, which negatively affects the leaching process. As shown in FIG. 9 (a), the major silicate phase (CaSiO$_4$) in the EAF slag was fully digested during the acid baking process, and no Si bearing phase was detected in the acid-baked sample at both baking temperatures. As a result, no silica gel formation was detected during the water leaching step.

The morphology change of EAF slag before baking and after baking at 200° C. and 400° C., and after water leaching was characterized using SEM. The EAF slag feed shown in FIG. 9 (b) has a rough surface with a mean particle size of 25.3 μm (FIG. 4). As shown in FIG. 9 (c), when the slag sample was acid baked at a low temperature (200° C.), the morphology changed to large plate-like crystals, consistent with the six-sided tabular morphology reported for (H$_3$O)Fe(SO$_4$)$_2$ crystals. On the contrary, as shown in FIG. 9 (d), the slag sample baked at a high temperature (400° C.) has a cubic crystal structure, consistent with the structure of rhombohedral Fe$_2$(SO$_4$)$_3$. FIG. 9 (e) presents the SEM image of the sample after water leaching which is 100% CaSO$_4$. These microstructure observations are consistent with the XRD spectra.

(a) Mechanistic Investigation of the EAF Slag Extraction

ABWL experiments were carried out to extract Ti from CaTiO$_3$ as a reference material.

Figure 10:
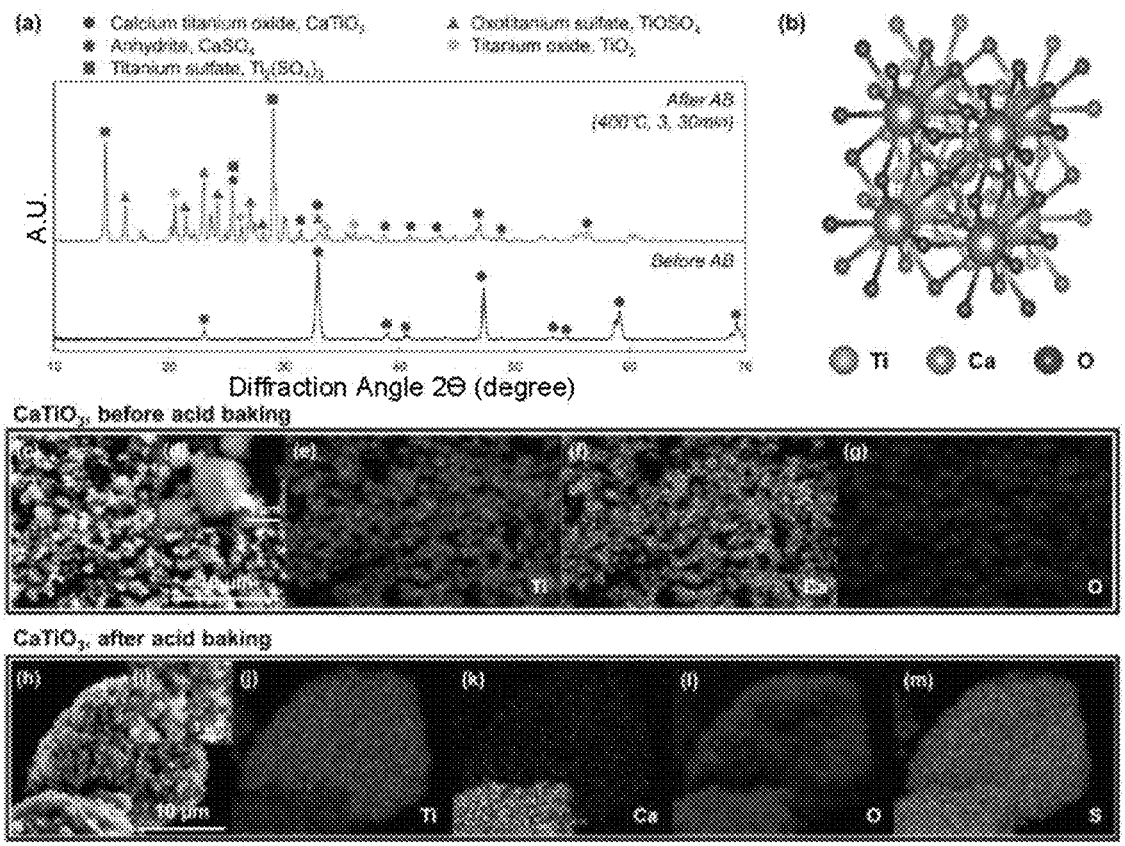
FIG. 10 (a) displays XRD diffractograms of the calcium titanate before and after the acid baking process, (b) is a representation of the 3D structure of calcium titanate, (c) to (m) are SEM images and EDS elemental mapping of calcium titanate before or after the acid baking process for various elements, as described in Example 1 (h).

FIG. 10 (a) to (m) presents XRD and SEM-EDS results of CaTiO$_3$ samples before and after the acid baking process. As shown in the XRD diffractogram in FIG. 10 (a), the CaTiO$_3$ phase transforms into four main different phases after the acid baking process i.e., anhydrite (CaSO$_4$), titanium sulfate (Ti$_2$(SO$_4$)$_3$), oxotitanium sulfate (TiOSO$_4$), and titanium oxide (TiO$_2$). The change in crystal structure may suggest that the following reactions occurred during the ABWL process.

$$CaTiO_3+H_2SO_4 \rightarrow CaSO_4+TiO_2+H_2O \quad [eq. 15]$$

$$TiO_2+H_2SO_4 \rightarrow TiOSO_4+H_2O \quad [eq. 16]$$

$$4TiOSO_4+2H_2SO_4 \rightarrow 2Ti_2(SO_4)_3+2H_2O+O_2 \quad [eq. 17]$$

It was demonstrated that when CaTiO$_3$ reacts with H$_2$SO$_4$, the precipitation of anhydrite and formation of TiO$_2$ occurred first, followed by the reaction between TiO$_2$ and H$_2$SO$_4$, forming either Ti$_2$(SO$_4$)$_3$ or TiOSO$_4$.

As shown in FIG. 10 (b), CaTiO$_3$ has a cubic crystal structure with a Pm-3m space group and Ti is located at the center of the unit cell and is surrounded by 8 Ca atoms. Therefore, to extract Ti using an acid baking process, Ca must first be sulfated by H$_2$SO$_4$ forming CaSO$_4$ (FIG. 8 (b)).

FIG. 10 (c) to (m) presents the SEM micrographs and EDS elemental mapping of the sample before and after acid baking and the results are in good agreement with the results for Ca and Ti obtained by XRD. In the sample before acid baking, Ca and Ti were highly associated with each other as CaTiO$_3$ with a particle size of less than about 3 μm and a substantially smooth surface. However, after the acid baking process, the particle size increased to about 20-30 μm, and the surface of the particle became significantly rougher and more porous. Furthermore, elemental mapping results indicated that Ti and Ca were separated after the acid baking process and were concentrated in different regions. This implies that Ca converted to CaSO$_4$, which easily precipitates, whereas Ti$_2$(SO$_4$)$_3$ and TiOSO$_4$ particles were produced after the reaction between Ti and H$_2$SO$_4$ and agglomerated making larger particles. It is well known that TiOSO$_4$ has a high solubility in water, while a dilute sulfuric acid solution is required to dissolve Ti$_2$(SO$_4$)$_3$. Although TiOSO$_4$ likely forms at low baking temperature and converts to Ti$_2$(SO$_4$)$_3$ at 400° C., a low enough pH of the leachate enables both Ti phases to easily dissolve during the water leaching process.

Example 2: Recovery of Valuable Elements from BF Slag by ABWL (a) BF Particles Preparation and Characterization BF slag samples were crushed and ground using a ball mill to obtain BF slag particles. The BF slag particles were then screened and classified into narrow sized fractions to obtain a substantially uniform −200 mesh particle size.

Figure 11:
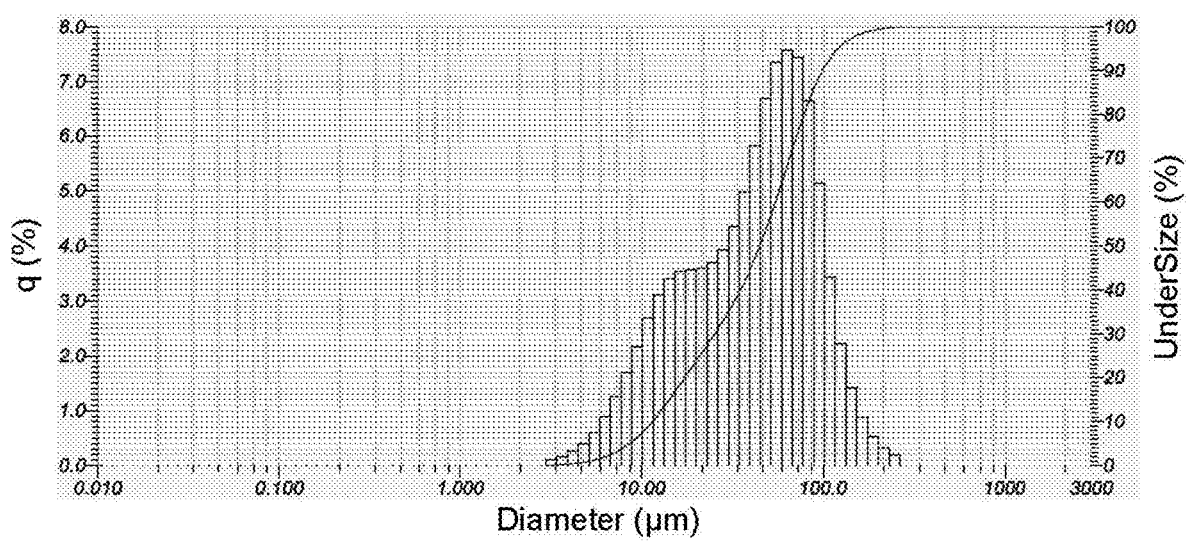
FIG. 11 is a graph of the particle-size distribution of a ground Blast Furnace (BF) slag, as described in Example 2 (a).

The particle-size distribution of ground BF slag was calculated using a particle size analyzer and results are presented in FIG. 11. As can be seen in FIG. 11, the median particle size is about 44.75 μm, the mean particle size is about 51.23 μm, D$_{10}$ is about 11.44 μm and the D$_{90}$ is about 98.76 μm.

The BF slag particles were characterized to identify valuable materials in the BF slag, to obtain baseline concentrations to calculate extraction efficiency, and to elucidate the reaction mechanism putting emphasis on structural, physical, and morphological changes.

Figure 12:
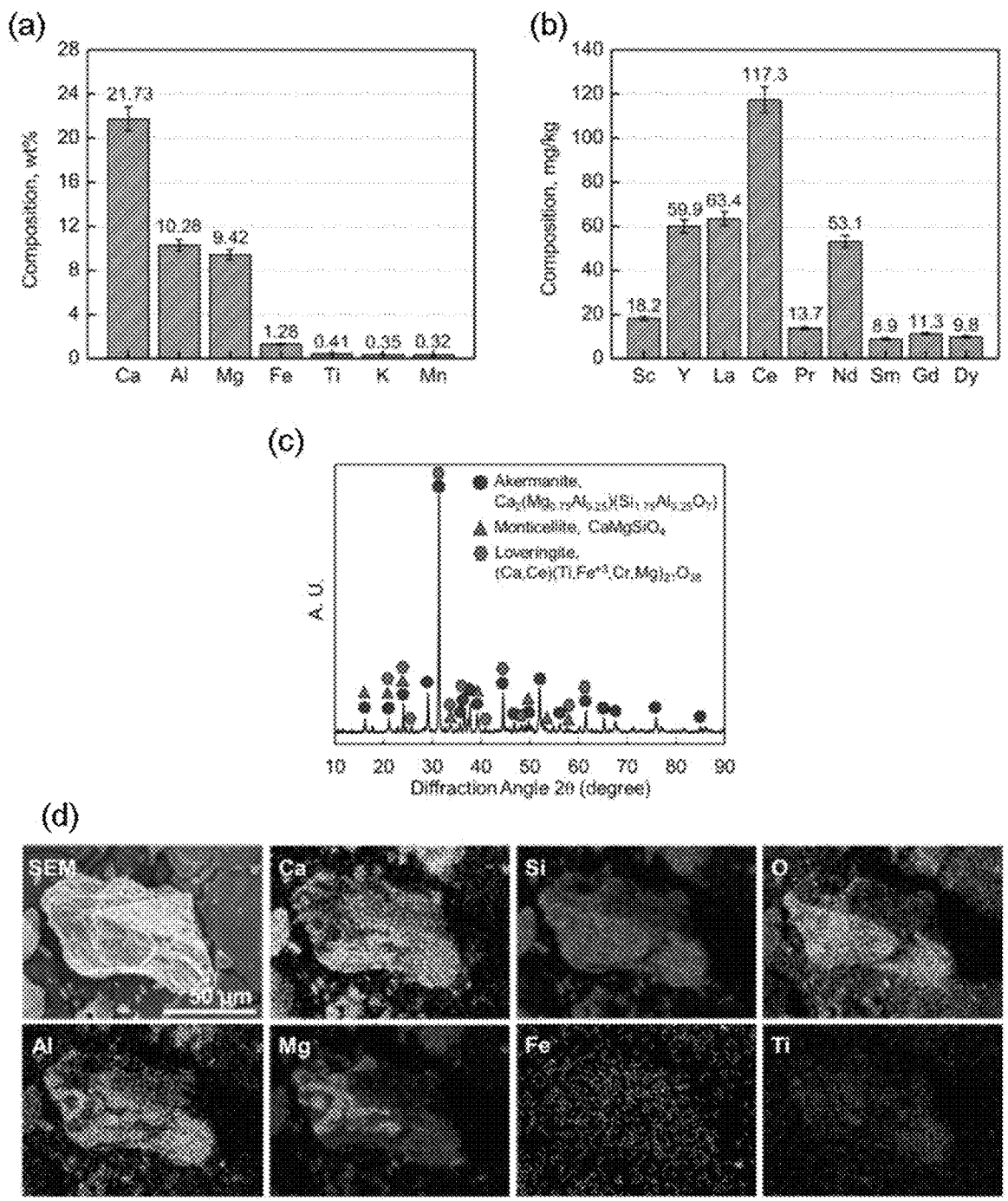
FIG. 12 displays the characterization results of a ground BF slag, showing graphs in (a) and (b) of the ICP-OES and inductively coupled plasma mass spectrometry (ICP-MS) results indicating elemental compositions, in (c) an X-ray powder diffractogram, in (d) a SEM image, an EDS elemental mapping of the BF slag particle, as described in Example 2 (a).

The elemental composition of the BF slag was characterized by ICP-OES and ICP-MS after an aqua regia digestion (FIGS. 12 (a) and (b)). ICP-OES was used for base metals quantification, whereas ICP-MS was utilized for REEs analysis because the matrix complexity effects during ICP- OES measurement hampered an accurate and precise quantification of REEs in the BF slag leachate.

As shown in FIGS. 12 (a) and (b), the major constituents of BF slag particles are Ca (about 21.7 wt. %), Al (about 10.3 wt. %), Mg (about 9.4 wt. %), and Fe (about 1.3 wt. %). Although it is well known that silica is the main component of BF slag, it was not measured by ICP-OES because aqua regia digestion could not completely dissolve silica. However, based on X-ray fluorescence (XRF) results presented in FIG. 12 (c), the silica content was determined to be about 14.3 wt. %. The ICP-MS (FIG. 12 (b)) results showed that the sample contains Sc, Y, La, Ce, Pr, Nd, Sm, Gd, and Dy, with a total REEs concentration of about 355 mg/kg.

XRD analysis was performed to study the crystal structure of the BF slag particles, results of which are presented in FIG. 12 (c). As shown in FIG. 12 (c), the BF slag particles comprise three major oxide phases, $Ca_2(Mg_{0.75}Al_{0.25})(Si_{1.75}Al_{0.25}O_7)$ (akermanite), $CaMgSiO_4$ (monticellite), and $(Ca,Ce)(Ti,Fe^{3+},Cr,Mg)_{21}O_{38}$ (loveringite). These results are in good agreement with ICP-OES results.

SEM-EDS analysis was performed (FIG. 12 (d)) to investigate the physical and morphological properties of the BF slag particles. The SEM results show that the BF slag particles have rough and porous surfaces.

The elemental mapping results showed that Ca, Si, and Al are highly associated with one another, whereas the degree of Mg association with these elements appears lower. Fe is almost uniformly distributed on the surface of the particle with low concentration, while Mg and Ti are concentrated in particular areas. REEs were not detected by XRD and EDS elemental mapping because of their low concentrations.

(a) Recovery of Metals from BF Slag Particles

This example illustrates the recovery of metals from BF slag particles. The screened BF slag particles of Example 2 (a) were dried in a convection oven for more than 24 hours.

After drying, the screened BF slag particles described in Example 2 (a) were mixed with concentrated (96 wt. % to 98 wt. %) $H_2SO_4$ and then baked in a box furnace at temperatures of 200° C. to 400° C. The acid baked samples were then leached in water at a temperature of 25° C. using a magnetic stirrer for 6 hours. The leachate solutions were sampled at specified time intervals and diluted before being characterized by ICP-OES and ICP-MS.

The BF slag particle samples were characterized using XRD and SEM-EDS before and after acid baking and water leaching.

(a) Experimental Design and Empirical Model Building

A systematic study was performed to investigate the quantitative effect of six operating factors namely the acid baking temperature ($X_1$), the acid-to-slag particle mass ratio ($X_2$), the acid baking time ($X_3$), the water-to-slag particles density ($X_4$), the agitation rate ($X_5$), and water-to-slag mass ratio ($X_6$) and the combinations of these factors on the extraction efficiency of REEs (Sc and Nd) and base metals (Ca, Al, Mg, and Fe).

For the statistical investigation, the test factors were coded to low (−1), mid (0), and high (+1) levels to allow direct comparison of the relative effect of each factor based on the magnitude of the factor model coefficients. Detailed information about the factor levels is presented in Table 6. Upper and lower limits of factor levels were selected on the basis of Example 1 (c) and preliminary experiments.

TABLE 6

Summary of factor −1, 0, and +1 levels for test factors

| Factor | Factor Description | −1 Level | 0 Level | +1 Level |
|---|---|---|---|---|
| $X_1$ | Baking temperature (° C.) | 200 | 300 | 400 |
| $X_2$ | Acid-to-slag mass ratio (g/$g_{DBFS}$) | 0.5 | 1.25 | 2 |
| $X_3$ | Baking time (min) | 30 | 60 | 90 |
| $X_4$ | Water-to-acid baked slag ratio (mL/$g_{ABBFS}$) | 4 | 10 | 16 |
| $X_5$ | Agitation rate (rpm) | 200 | 400 | 600 |
| $X_6$ | Water-to-slag mass ratio (g/$g_{DBFS}$) | 0 | 1 | 2 |

To build an empirical extraction model, $2_{IV}^{6-2}$ experimental matrix at fixed leaching time (360 minutes) was designed utilizing a fractional factorial design (Table 7).

TABLE 7

A $2_{IV}^{6-1}$ Experimental Design Matrix for empirical model building

| Runs | $X_1$ | $X_2$ | $X_3$ | $X_4$ | $X_5$ | $X_6$ |
|---|---|---|---|---|---|---|
| 1 | −1 | −1 | −1 | −1 | −1 | −1 |
| 2 | −1 | 1 | −1 | −1 | 1 | 1 |
| 3 | −1 | −1 | 1 | −1 | 1 | 1 |
| 4 | −1 | 1 | 1 | −1 | −1 | −1 |
| 5 | −1 | −1 | −1 | 1 | −1 | 1 |
| 6 | −1 | 1 | −1 | 1 | 1 | −1 |
| 7 | −1 | −1 | 1 | 1 | 1 | −1 |
| 8 | −1 | 1 | 1 | 1 | −1 | 1 |
| 9 | 1 | −1 | −1 | −1 | 1 | −1 |
| 10 | 1 | 1 | −1 | −1 | −1 | 1 |
| 11 | 1 | −1 | 1 | −1 | −1 | 1 |
| 12 | 1 | 1 | 1 | −1 | 1 | −1 |
| 13 | 1 | −1 | −1 | 1 | 1 | 1 |
| 14 | 1 | 1 | −1 | 1 | −1 | −1 |
| 15 | 1 | −1 | 1 | 1 | −1 | −1 |
| 16 | 1 | 1 | 1 | 1 | 1 | 1 |
| Center-point tests (3 replicates) | 0 | 0 | 0 | 0 | 0 | 0 |
| | 0 | 0 | 0 | 0 | 0 | 0 |
| | 0 | 0 | 0 | 0 | 0 | 0 |

The model of the format shown in Equation 18 was then fitted to the extraction efficiency data by mLLSR. The simplified models including only the significant parameters ($\alpha=0.05$) were assessed by ANOVA to adequately estimate the run variance. Kinetic tests were carried out at the lower and upper boundaries of baking temperatures, while other parameters were kept at the mid factor levels, to better exemplify the effects of kinetics on extraction efficiency at different temperatures.

$$\hat{y}_i = \hat{\beta}_0 + \hat{\beta}_1 X_1 + \hat{\beta}_2 X_2 + \hat{\beta}_3 X_3 + \hat{\beta}_4 X_4 + \hat{\beta}_5 X_5 + \hat{\beta}_6 X_6 + \hat{\beta}_{12} X_1 X_2 + \hat{\beta}_{13} X_1 X_3 + \hat{\beta}_{14} X_1 X_4 + \hat{\beta}_{15} X_1 X_5 + \hat{\beta}_{16} X_1 X_6 + \hat{\beta}_{24} X_2 X_4 + \hat{\beta}_{26} X_2 X_6$$ [eq. 18]

The detailed description of statistical analysis is provided in Example 1 (c).

(a) Kinetic Experiments

Two kinetic experiments were performed, one at −1 level at an $X_1$ of 200° C. and the other at +1 level at 400° C., while other factors were kept at mid-level ($X_2$=1.25 g/$g_{DBFS}$, $X_3$=60 minutes, $X_4$=10 mL/$g_{ABBFS}$, $X_5$=400 rpm, and $X_6$=1 g/$g_{DBFS}$) to investigate the effects of time on the extraction efficiency at different baking temperatures.

Figure 13:
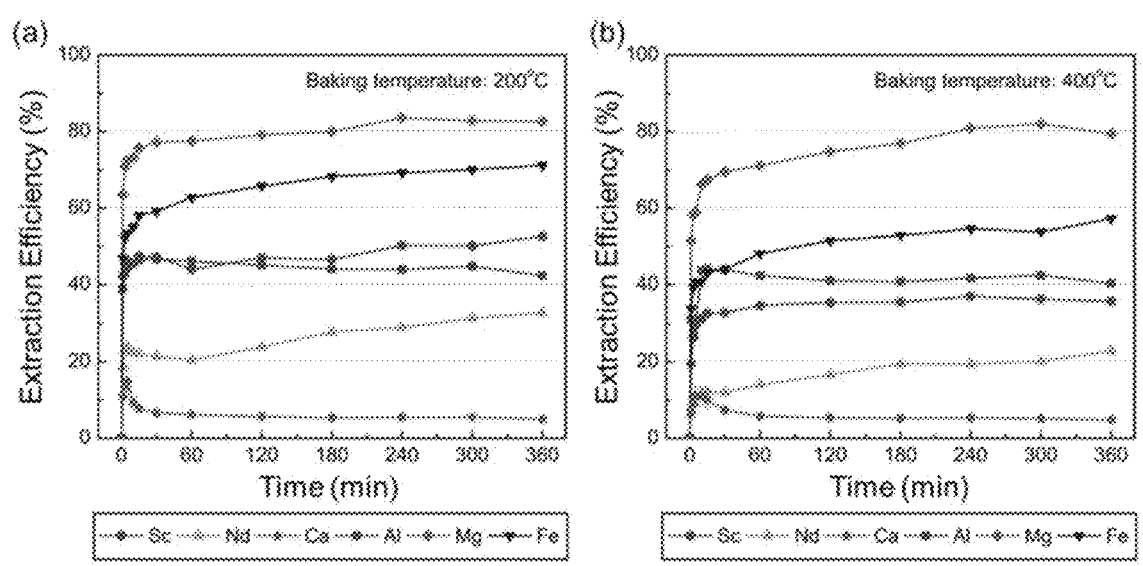
FIG. 13 displays graphs of the kinetic test results of rare earth elements and base metals under (a) −1 level condition for baking temperature (200° C.); and (b) 1-level condition for baking temperature (400° C.) and mid-level conditions for other operating parameters, as described in Example 2 (d).

As shown in FIG. 13, at −1 level $X_1$, all elements except Nd reached equilibrium within 6 hours. Al and Mg showed fast kinetics plateauing in 1 hour, whereas Fe and Sc extraction efficiency slightly increased. The Nd concentration kept increasing over time, indicating that it has the slowest kinetics among the elements of interest. When $X_1$ changed to the +1 level, the maximum extraction of Sc and Al was obtained within 2 h leaching time. The kinetics of other elements extraction was slower; thus, more than 6 hours was required to reach the equilibrium. In general, the extraction efficiency of base metals was higher than that of REEs, and Sc showed higher extraction compared with Nd.

At 6 hours of leaching time, it was found that increasing $X_1$ had a negative effect on the extraction efficiency of all elements, except Al. In particular, Sc, Nd, and Fe extraction were significantly affected by this factor, with changing extraction efficiency varying from 52.6%, 32.8%, and 71.1% to 35.8%, 22.8%, and 57.2%, respectively.

The results of this kinetic investigation indicated that leaching time significantly affects the extraction process. The leaching time for the further experiments was set at 360 minutes, as it ensures equilibrium to be achieved in most cases.

(a) Effect of Operating Parameters and Empirical Model Building

Experiments were carried out to investigate the quantitative effects of the six operating parameters and the second-order interaction between at least two parameters.

Figure 14:
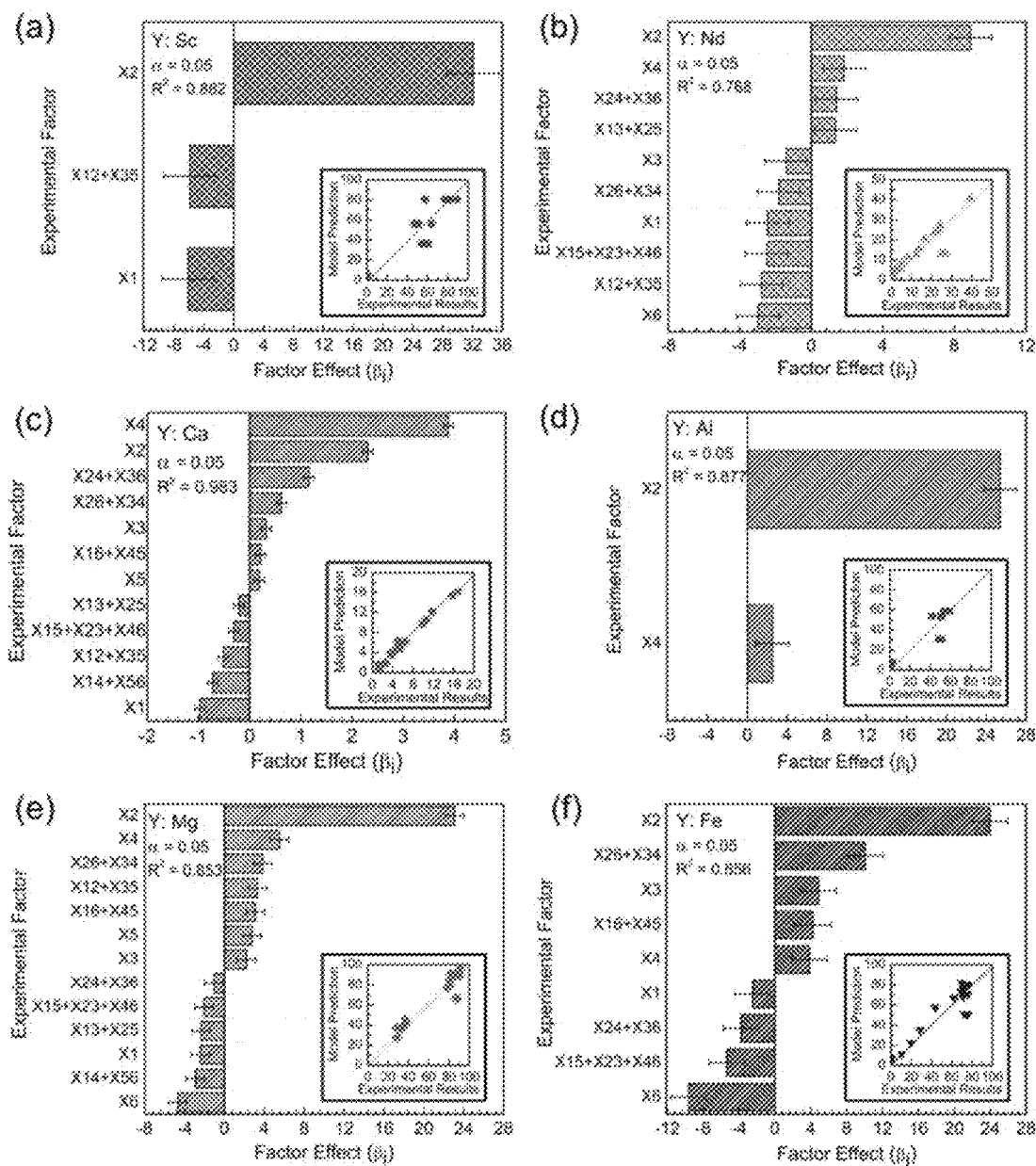
FIG. 14 is a graph of the factor effect coefficients for an empirical extraction model, showing in (a) results for Sc, in (b) results for Nd, in (c) results for Ca, in (d) results for Al, in (e) results for Mg, and in (f) results for Fe, as described in Example 2 (e). The inset graphs show the correlation between the predicted results from the empirical models and the experimental results.

A total of 19 runs were conducted including 3 center-point runs, and the leachate sample was collected after 360 minutes leaching time. FIG. 14 presents the quantitative effect of the primary factors and second-order interactions on the basis of the ordered factor effect coefficients for the empirical models for each element. Only the factors with enough significance ($\alpha$=0.05) are presented.

As shown in FIG. 14 (a), the extraction efficiency of Sc was positively affected by $X_2$, while $X_{12}$+$X_{35}$ (baking temperature and acid-to-slag mass ratio, baking time and agitation rate) and $X_1$ had a negative effect. The positive effect of the $X_2$ is understandable because the amount of acid controls the phase conversion from water-insoluble oxides and silicates to water-soluble sulfate. $X_1$ effect is in line with the kinetic test results, which already showed the adverse impact of $X_1$ on the extraction efficiency for most elements except Al. This effect can be attributed to the decomposition of sulfuric acid at high temperature. It was revealed that at an elevated temperature higher than 250° C., the liquid sulfuric acid either change into gas phase or decomposes into $SO_3$, $SO_2$, $H_2O$, and $O_2$ gases.

As shown in FIG. 14 (b), the extraction efficiency of Nd was positively affected by $X_2$, $X_4$, and two second-order interactions ($X_{24}$+$X_{36}$ and $X_{13}$+$X_{25}$), whereas negatively affected by $X_1$, $X_3$, $X_6$, and several second-order interactions ($X_{26}$+$X_{34}$, $X_{15}$+$X_{23}$+$X_{46}$ and $X_{12}$+$X_{35}$).

First, at a higher level of water ratio, the solution is undersaturated, thus more salt can be dissolved. Longer duration and higher baking temperature can lead to a more vigorous decomposition and phase transition of sulfuric acid, thereby hampering the extraction. The negative effect of $X_6$ can be explained by the fact that adding water to the mixture of slag and acid decreases the boiling point of the sulfuric acid, thus impeding the reaction between the acid and the slag in the acid baking step. If the +1 levels of $X_2$ and $X_6$ are used, the final concentration of acid decreases from 98% to 49%, and the boiling point decreases from about 337° C. to about 195° C. Therefore, even if the $X_1$ is at the −1 level, the acid evaporates before reaching the set temperature and reacting with the BF slag particles.

As shown in FIG. 14 (c), the extraction efficiency of Al is only dependent on two factors i.e., $X_2$ and $X_4$. As shown in FIGS. 14 (d) and (e), the extraction efficiency of Mg and Fe was positively affected by $X_2$, $X_3$, $X_4$, and several second-order interactions (including $X_{26}$+$X_{34}$ and $X_{16}$+$X_{45}$), whereas negatively affected by $X_1$, $X_6$, and a few second-order terms (including $X_{24}$+$X_{36}$ and $X_{15}$+$X_{23}$+$X_{46}$). Moreover, unlike other elements, the dissolution of Mg was improved with increasing $X_6$. A summary of operating conditions and the corresponding extraction efficiency for Sc, Nd, Ca, Al, Mg, and Fe is provided in Table 8 below.

TABLE 8

Overview of the experimental runs with corresponding operating parameters and extraction efficiency for Sc, Nd, Ca, Al, Mg, and Fe

| Run # | $X_1$ | $X_2$ | $X_3$ | $X_4$ | $X_5$ | $X_6$ | Extraction Efficiency (%) | | | | | |
|---|---|---|---|---|---|---|---|---|---|---|---|---|
| | | | | | | | Sc | Nd | Ca | Al | Mg | Fe |
| 1 | 200 | 0.5 | 30 | 4 | 200 | 0 | 0.7 | 1.8 | 1.5 | 0.7 | 38.1 | 28.7 |
| 2 | 200 | 2 | 30 | 4 | 600 | 2 | 77.4 | 23.2 | 4.7 | 50.0 | 78.8 | 70.5 |
| 3 | 200 | 0.5 | 90 | 4 | 600 | 2 | 0.3 | 0.4 | 1.4 | 0.6 | 28.2 | 0.0 |
| 4 | 200 | 2 | 90 | 4 | 200 | 0 | 89.4 | 21.2 | 3.7 | 51.3 | 80.8 | 76.4 |
| 5 | 200 | 0.5 | 30 | 16 | 200 | 2 | 0.7 | 0.3 | 5.6 | 2.7 | 33.5 | 0.0 |
| 6 | 200 | 2 | 30 | 16 | 600 | 0 | 81.8 | 39.3 | 15.7 | 58.9 | 91.1 | 69.6 |
| 7 | 200 | 0.5 | 90 | 16 | 600 | 0 | 0.4 | 4.3 | 9.8 | 2.5 | 80.9 | 76.0 |
| 8 | 200 | 2 | 90 | 16 | 200 | 2 | 57.5 | 16.7 | 16.8 | 56.5 | 87.9 | 69.2 |
| 9 | 400 | 0.5 | 30 | 4 | 600 | 0 | 0.1 | 1.6 | 1.4 | 0.6 | 36.1 | 19.7 |
| 10 | 400 | 2 | 30 | 4 | 200 | 2 | 46.8 | 8.3 | 3.8 | 50.2 | 81.5 | 71.9 |
| 11 | 400 | 0.5 | 90 | 4 | 200 | 2 | 0.0 | 2.7 | 1.3 | 0.6 | 28.9 | 10.5 |
| 12 | 400 | 2 | 90 | 4 | 600 | 0 | 50.7 | 13.8 | 2.6 | 41.7 | 83.4 | 62.1 |
| 13 | 400 | 0.5 | 30 | 16 | 600 | 2 | 0.1 | 0.2 | 5.4 | 2.9 | 32.9 | 0.0 |
| 14 | 400 | 2 | 30 | 16 | 200 | 0 | 63.8 | 24.3 | 10.7 | 53.0 | 90.4 | 71.2 |
| 15 | 400 | 0.5 | 90 | 16 | 200 | 0 | 0.1 | 5.2 | 6.5 | 2.3 | 36.9 | 43.7 |
| 16 | 400 | 2 | 90 | 16 | 600 | 2 | 48.5 | 12.2 | 11.8 | 57.7 | 90.8 | 71.6 |
| 17 | 300 | 1.25 | 60 | 10 | 400 | 1 | 58.1 | 25.8 | 5.2 | 48.3 | 86.7 | 72.4 |
| 18 | 300 | 1.25 | 60 | 10 | 400 | 1 | 60.5 | 27.0 | 5.0 | 51.1 | 88.2 | 75.4 |
| 19 | 300 | 1.25 | 60 | 10 | 400 | 1 | 54.1 | 24.8 | 5.1 | 50.7 | 88.0 | 75.8 |

(a) Validation and Optimization

Figure 15:
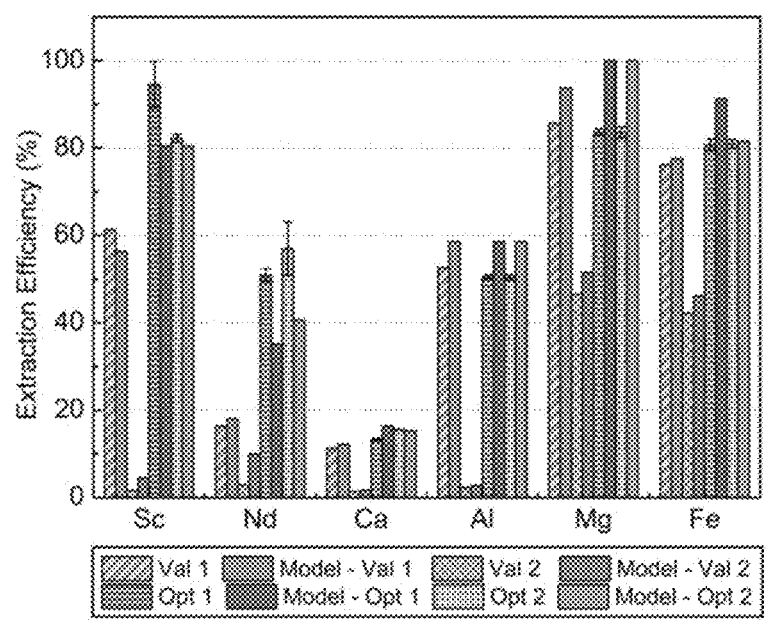
FIG. 15 is a graph of the predicted and actual extraction efficiency of Sc, Nd, Al, Mg, and Fe, as described in Example 2 (f).

An empirical extraction model was built for each element using Equation 18, to predict the extraction efficiency under certain conditions. Two validation tests were conducted to assess the applicability of the model, as shown in FIG. 15. The first validation test was at an $X_1$=400° C., an $X_2$=2 g/$g_{DBFS}$, an $X_3$=30 min, an $X_4$=16 mL/$g_{ABBFS}$, an $X_5$=200 rpm, and $X_6$=2 g/$g_{DBFS}$. The results were in agreement with the model predicted values, having a model accuracy of 7.7%. The second validation test was conducted under mild conditions ($X_1$=200° C., $X_2$=0.5 g/$g_{DBFS}$, $X_3$=30 min, $X_4$=4 mL/$g_{ABBFS}$, $X_5$=600 rpm, and $X_6$=0 g/$g_{DBFS}$), using these conditions, the actual extraction efficiencies for REEs and Al were less than 11% and the model accuracy was determined to be 15.8%.

An optimization test was performed in order to maximize the economic profit obtained from all studied elements. The conditions that satisfy this optimization were $X_1$=200° C., $X_2$ 2 g/$g_{DBFS}$, $X_3$=90 min, $X_4$=16 mL/$g_{ABBFS}$, $X_5$=600 rpm, and $X_6$=0 g/$g_{DBFS}$. The predicted benefits from all elements were 264.3 USD/tonne$_{DBFS}$, and the actual benefits were calculated to be 238.1 USD/tonne$_{DBFS}$ (accuracy=±20.4%). The price of Sc, Nd, Al, Mg, and Fe considered for the optimization calculation are presented in Table 9.

TABLE 9

Price of Sc, Nd, Al, Mg, and Fe

| Element | Phase | Value (USD/kg) |
|---|---|---|
| Sc | Oxide | 4600.0 |
| Nd | Oxide | 69.0 |
| Al | Hydroxide | 1.0 |
| Mg | Carbonate | 1.2 |
| Fe | Carbonate | 1.0 |

An optimization test was performed in order to maximize the economic profits obtained from REEs.

The conditions that satisfy this optimization were $X_1$=200° C., $X_2$=2 g/$g_{DBFS}$, $X_{3=30}$ min, $X_4$=16 mL/$g_{ABBFS}$, $X_5$=600 rpm, and $X_6$=0 g/$g_{DBFS}$. As can be seen in FIG. 15, the actual extraction efficiency were similar to those predicted with high accuracy (±12.8%). The predicted and actual profits considering REEs were calculated to be 69.0 and 71.1 USD/tonne$_{DBFS}$, respectively.

The overall validation and optimization results demonstrate that the empirical models can successfully predict the optimum conditions and the extraction efficiency.

Example 3: Optimized Parameters for Individual Target Metal Recovery by ABWL (a) Recovery of Valuable Elements from EAF Slag The optimized parameters for the recovery of Nb, Ti, Fe, Ca, Mn, Mg and Al from EAF slag as determined in Example 1 are presented in Table 10 below.

TABLE 10

Optimized parameters for the recovery of Nb, Ti, Fe, Ca, Mn, Mg and Al from EAF slag

| Element | $X_1$ | $X_2$ | $X_3$ | $X_4$ (g/L) | $X_5$ | Model Predicted Extraction Efficiency (%) |
|---|---|---|---|---|---|---|
| Nb | 400 | 3 | 120 | 125 | 350 | 99.6 |
| Ti | 400 | 3 | 30 | 50 | 550 | 105.9 |
| Fe | 400 | 3 | 120 | 50 | 550 | 105.2 |
| Ca | 200 | 3 | 120 | 50 | 550 | 38.1 |
| Mn | 400 | 3 | 120 | 50 | 550 | 108.9 |
| Mg | 400 | 3 | 30 | 50 | 550 | 104.0 |
| Al | 400 | 3 | 30 | 60 | 550 | 101.5 |
| Cr | 400 | 3 | 30 | 60 | 550 | 103.2 |

(b) Recovery of Valuable Elements from BF Slag

The optimized parameters for the recovery of Sc, Nd, Ca, Al, Mg, and Fe from BF slag as determined in Example 2 are presented in Table 11 below.

TABLE 11

Optimized parameters for the recovery of Sc, Nd, Ca, Al, Mg, and Fe from BF slag

| Element | $X_1$ | $X_2$ | $X_3$ | $X_4$ (mL/g) | $X_5$ | $X_6$ | Model Predicted Extraction Efficiency (%) |
|---|---|---|---|---|---|---|---|
| Sc | 200 | 2 | 90 | 16 | 600 | 0 | 80.5 |
| Nd | 200 | 2 | 30 | 16 | 600 | 0 | 40.7 |
| Ca | 200 | 2 | 30 | 16 | 600 | 2 | 17.2 |
| Al | 200 | 2 | 30 | 16 | 600 | 0 | 58.6 |
| Mg | 200 | 2 | 90 | 16 | 600 | 0 | 109.3 |
| Fe | 200 | 2 | 90 | 16 | 600 | 0 | 91.3 |

Example 4: Recovery of Valuable Elements from EAF Slag by Carbothermic Reduction Followed by ABWL (a) EAF Slag Particles Preparation and Characterization The EAF was first crushed and ground using a jaw crusher and a disk to obtain a substantially uniform ~200 mesh particle size (about ~74 μm). The ground slag samples were dried in a convection oven at a temperature of 50° C. for more than 24 hours to remove the water content.

Next, the samples were mixed with lignite and flux ($SiO_2$ and/or $Al_2O_3$) and the mixture was then pelletized using a pneumatic/hydraulic press at a pressure of about 250 MPa for 3 minutes (pellet diameter=28.6 mm). The pellet was then placed in a graphite crucible and smelted in a box furnace at different set temperatures (1500° C. or 1600° C., heating rate of 180° C./hour, cooling rate of 180° C./hour, holding time of 1.5 hours) under an argon atmosphere. After smelting, the metallic Fe phase and slag phase were manually separated using a Dremel™ and a hammer and the slag phase was ground using a mixer mill. To reduce the Fe content in the slag phase, the ground slag samples were magnetically separated using a Davis™ tube. The Fe-depleted slag samples thus obtained were then dried in a convection oven, and digested in an aqua regia solution using a microwave digestor (ramp-up time of 40 minutes, holding time of 30 minutes, set temperature of 220° C.) for the characterization.

The dried Fe-depleted slag samples were then mixed with concentrated sulfuric acid. The mixture was placed in a porcelain crucible and baked in a muffle furnace. The acid baked samples were then water leached at ambient temperature and pressure using a magnetic stirrer. The leachate solutions thus obtained were then filtered and diluted using a Hamilton™ Microlab 600™ dual diluter and dispenser system for the characterization. Specific solid samples before and after each process were also prepared for the postmortem characterization.

(a) Experimental Design and Empirical Model Building

For the carbothermic reduction process, a fractional factorial design methodology was used to design an experimental matrix, to build an empirical model, and consequentially to optimize the process. A systematic study was carried out to investigate the effect of four operating parameters, namely the smelting temperature ($X_1$), carbon-to-slag mass ratio ($X_2$), flux-to-slag mass ratio ($X_3$), flux type ($X_4$), and the second-order interactions of these factors, on the composition of the slag phase. The low level of smelting temperature ($X_1$) was selected based on the preliminary test results to ensure the complete melting of the pellet and a clear phase separation between metallic Fe and slag phases. The stoichiometric calculation results indicated that at least 0.06 g of carbon per 1 g of EAF slag is required to reduce all iron in the form of FeO in the slag; thus, the low level of carbon-to-slag mass ratio ($X_2$) was set at 0.06 $g/g_{EAFS}$. Due to the high calcium content in the EAF slag, the fluxing agents used in this study were determined to be silica and alumina.

For the ABWL process, a response surface methodology was employed to investigate the effect of four operating parameters, namely, the baking temperature ($X_1$), the acid-to-slag mass ratio ($X_2$), the baking time ($X_3$), and the water-to-slag ratio ($X_4$), on the extraction of elements of interest (Ti, Fe, Ca, Mn, Mg, Al, Cr, and Sr).

For this process, boundaries for factor levels were determined based on the preliminary test results and operating ranges of analogous processes in the literature, within the operating range in which the system response could be relatively linear (Anawati et al., Waste Management 95 (2019): 549-559; Demol et al., Hydrometallurgy 179 (2018): 254-267; Kim et al., Hydrometallurgy 191 (2020): 105203; Meshram, et al., Journal of Cleaner Production 157 (2017): 322-332; Sadri et al, International Journal of Mineral Processing 159 (2017): 7-15; Safarzadeh et al., Mining, Metallurgy & Exploration 29, no. 2 (2012): 97-102; and Safarzadeh et al., International Journal of Mineral Processing 124 (2013): 128-131).

On the basis of a fractional factorial design and response surface method, two experimental matrices were designed for the carbothermic reduction process and ABWL process, respectively. For the carbothermic reduction process, a $2_{IV}^{4-1}$ factorial series of tests (total 14 runs) was performed including three center-point runs to estimate the run variance, two validation runs to evaluate the predictability of the empirical models, and one optimum run. For the ABWL process, 28 design of experiment runs and two optimum runs were carried out. The empirical model presented in Equations 19 and 20 were then fitted to the experimental data using mLLSR shown in Equation 21 (below).

$$\hat{y}_i = \hat{\beta}_0 + \hat{\beta}_1 X_{1+1} \hat{\beta}_2 X_2 + \hat{\beta}_3 X_3 + \hat{\beta}_4 X_4 + \hat{\beta}_{12} X_1 X_2 + \hat{\beta}_{13} X_1 X_3 + \hat{\beta}_{14} X_1 X_4 \quad [eq. 19]$$

where $\hat{\beta}_0$ is the vector containing each of the model parameters, $\beta_0$ corresponds to the baseline bias for the analyte, $\beta_1$ corresponds the smelting temperature, $\beta_2$ corresponds to the carbon-to-slag mass ratio, $\beta_3$ corresponds to the flux-to-slag mass ratio, $\beta_4$ corresponds to the flux type, and $\beta_{ij}$ corresponds to the combination of the two different factors.

$$\hat{y}_i = \hat{\beta}_0 + \hat{\beta}_1 X_{1+1} \hat{\beta}_2 X_2 + \hat{\beta}_3 X_3 + \hat{\beta}_4 X_4 + \hat{\beta}_{12} + X_1 X_2 + \hat{\beta}_{13} X_1 X_3 + \hat{\beta}_{14} X_1 X_4 + \hat{\beta}_{23} X_2 X_3 + \hat{\beta}_{24} X_2 X_4 30 \hat{\beta}_{34} X_3 X_4 + \hat{\beta}_{11} X_1^2 + \hat{\beta}_{22} X_2^2 + \hat{\beta}_{33} X_3^2 + \hat{\beta}_{44} X_4^2 \quad [eq. 20]$$

where $\hat{\beta}$ is the vector containing each of the model parameters, $\beta_0$ corresponds to the baseline bias for the analyte, $\beta_1$ corresponds to the baking temperature, $\beta_2$ corresponds to the acid-to-slag mass ratio, $\beta_3$ corresponds to the baking time, $\beta_4$ corresponds to the water-to-acid ratio, $\beta_{ij}$ corresponds to the combination of the two different factors, and $\beta_{ii}$ corresponds to the quadratic term.

$$\hat{\beta} = (X^T X)^{-1} (X^T Y_i) \quad [eq. 21]$$

where X is the experimental design matrix, and $Y_i$ is the response matrix including the actual response for analyte i.

(a) Mineralogical, Morphological, and Compositional Characterization

The mineralogical characteristic of the solid sample was investigated by XRD. The morphological and compositional analysis was carried out by SEM-EDS. For the compositional characterization of solid samples, a electron probe microanalyzer was used. The concentration of elements in liquid samples was measured by ICP-OES. The silica content of solid samples was quantified by XRF. The carbon content of the metallic Fe phase was analyzed using LECO (CS 444 Carbon-Sulfur analyzer).

(b) Characterization of EAF Slag

The chemical composition of the EAF slag was investigated with aqua regia digestion followed by ICP-OES analysis and XRF analysis (Table 12). As shown in Table 12, the main constituent of the EAF slag is Fe accounting for 24.3 wt. % of the composition. The high Fe content confirmed that the EAF slag sample was suitable to be subjected to the carbothermic reduction process. As shown in Table 12, the EAF slag also comprises Ca (17.3 wt. %), Si (7.5 wt. % measured by XRF), Mg (5.5 wt. %), Mn (5.5 wt. %), Al (2.5 wt. %), and Cr (1.9 wt. %). The EAF also contains trace amounts of Ti (1862 mg/kg), Na (1184 mg/kg), Nb (489 mg/kg), Sr (341 mg/kg), Cu (303 mg/kg), and Ni (300 mg/kg).

TABLE 12

Elemental composition of EAF slag

| Element | Composition (wt. %) |
|---|---|
| Fe | 24.288 ± 0.747 |
| Ca | 17.252 ± 0.399 |
| Si* | 7.547 ± 1.624 |
| Mg | 5.502 ± 0.094 |
| Mn | 5.501 ± 0.093 |
| Al | 2.521 ± 0.016 |
| Cr | 1.900 ± 0.014 |
| Ti | 0.186 ± 0.003 |
| Na | 0.118 ± 0.051 |
| Nb | 0.049 ± 0.006 |
| Sr | 0.034 ± 0.001 |
| Cu | 0.030 ± 0.008 |
| Ni | 0.030 ± 0.003 |

*Si content was measured by XRF.

(a) Effect of Operating Parameters and Empirical Model Building

Carbothermic reduction was conducted to selectively separate Fe, Nb, Cr, Mn, and partially Ti, by reporting them into the metallic phase while reporting other elements into the slag phase. On the basis of a fractional factorial design methodology, $2_{IV}^{4-1}$ experimental matrix was designed and a total of 11 runs including three center-point runs were performed. The detailed information about experimental conditions and the concentration of five elements (Fe, Nb, Cr, Mn, and Ti) in the slag phase is shown in Table 13.

TABLE 13

An overview of the experimental runs with the corresponding operating conditions and concentration of five elements (Fe, Nb, Cr, Mn, and Ti) in a slag phase

| Run # | $X_1$ (° C.) | $X_2$ (g/$g_{EAFS}$) | $X_3$ (g/$g_{EAFS}$) | $X_4$ | Concentration in the slag phase (wt. %) | | | | |
|---|---|---|---|---|---|---|---|---|---|
| | | | | | Fe | Nb | Cr | Mn | Ti |
| 1 | 1500 | 0.06 | 0 | Silica | 2.508 | 0.035 | 0.281 | 3.193 | 0.348 |
| 2 | 1500 | 0.06 | 0.1 | Alumina | 0.597 | 0.012 | 0.157 | 2.741 | 0.271 |
| 3 | 1500 | 0.12 | 0 | Alumina | 1.845 | 0.043 | 0.270 | 3.986 | 0.346 |
| 4 | 1500 | 0.12 | 0.1 | Silica | 0.101 | 0.002 | 0.039 | 3.349 | 0.260 |
| 5 Centerpoint | 1550 | 0.09 | 0.05 | Mix | 0.348 | 0 | 0.037 | 0.903 | 0.313 |
| 6 Centerpoint | 1550 | 0.09 | 0.05 | Mix | 0.150 | 0 | 0.016 | 0.776 | 0.308 |
| 7 Centerpoint | 1550 | 0.09 | 0.05 | Mix | 0.313 | 0 | 0.039 | 0.785 | 0.313 |
| 8 | 1600 | 0.06 | 0 | Alumina | 0.320 | 0.001 | 0.041 | 0.545 | 0.308 |
| 9 | 1600 | 0.06 | 0.1 | Silica | 0.482 | 0 | 0.063 | 0.598 | 0.183 |
| 10 | 1600 | 0.12 | 0 | Silica | 0.276 | 0 | 0.041 | 0.470 | 0.299 |
| 11 | 1600 | 0.12 | 0.1 | Alumina | 0.241 | 0 | 0.020 | 1.568 | 0.157 |

Figure 16:
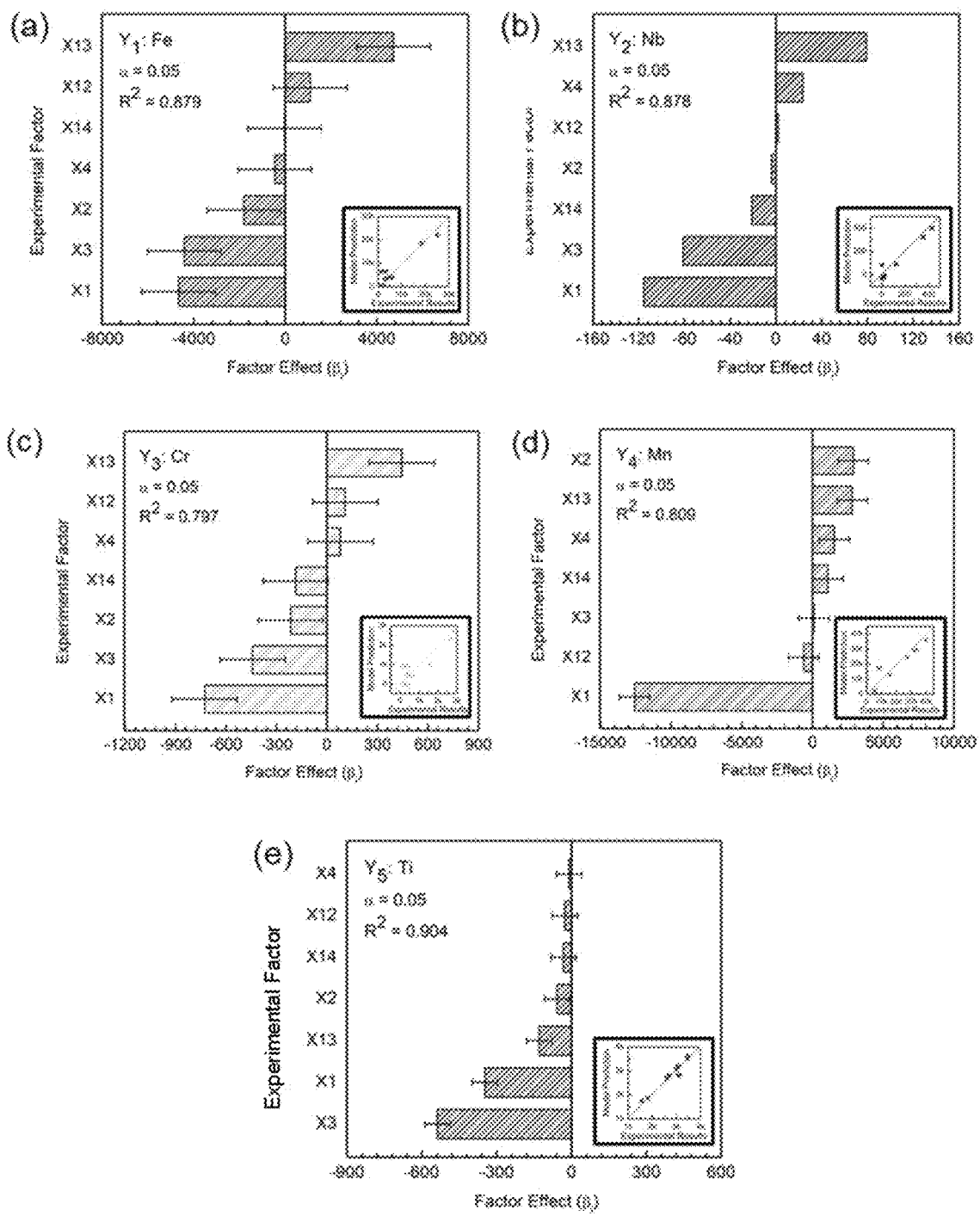
FIG. 16 is a graph of the factor effect coefficients for an empirical extraction model, showing in (a) results for Fe, in (b) results for Nb, in (c) results for Cr, in (d) results for Mn, and in (e) results for Ti, as described in Example 4 (e). The inset graphs show the correlation between the predicted results from the empirical models and the experimental results.

The ordered factor effect coefficients with enough significance ($\alpha=0.05$) on the concentration of each element in the slag phase are presented in FIG. 16. It should be noted here that the goal of this process is to minimize the concentration of five elements in the slag phase as they are expected to report into the metallic phase.

As shown in FIG. 16 (a), the Fe concentration in the slag phase was negatively affected by three primary factors: $X_1$, $X_2$, and $X_3$. In other words, increasing these factors resulted in decreasing the Fe concentration in the slag phase, which is desirable. The negative impact of $X_1$ is understandable since higher $X_1$ reduces the viscosity of the slag and consequentially enhances the separation of the metallic phase from the slag phase. An inverse relationship between $X_1$ and slag viscosity is shown in Equation 22.

$$\eta = \eta_0 \times \exp(E_a/RT) \quad [\text{eq. 22}]$$

where $\eta$ is the slag viscosity, R is the universal gas constant, $E_a$ is activation energy, and T is the absolute temperature (K).

It was observed that the Fe concentration in the slag phase increases with decreasing $X_2$. Meaning that a low level of $X_2$ (0.06 g/$g_{EAFS}$) was not enough to reduce all Fe, although this level was selected based on the stoichiometrically value of carbon for reducing all Fe in the slag. This phenomenon can be explained by Mn and Cr carbide formation occurring during the smelting process.

Figure 17:
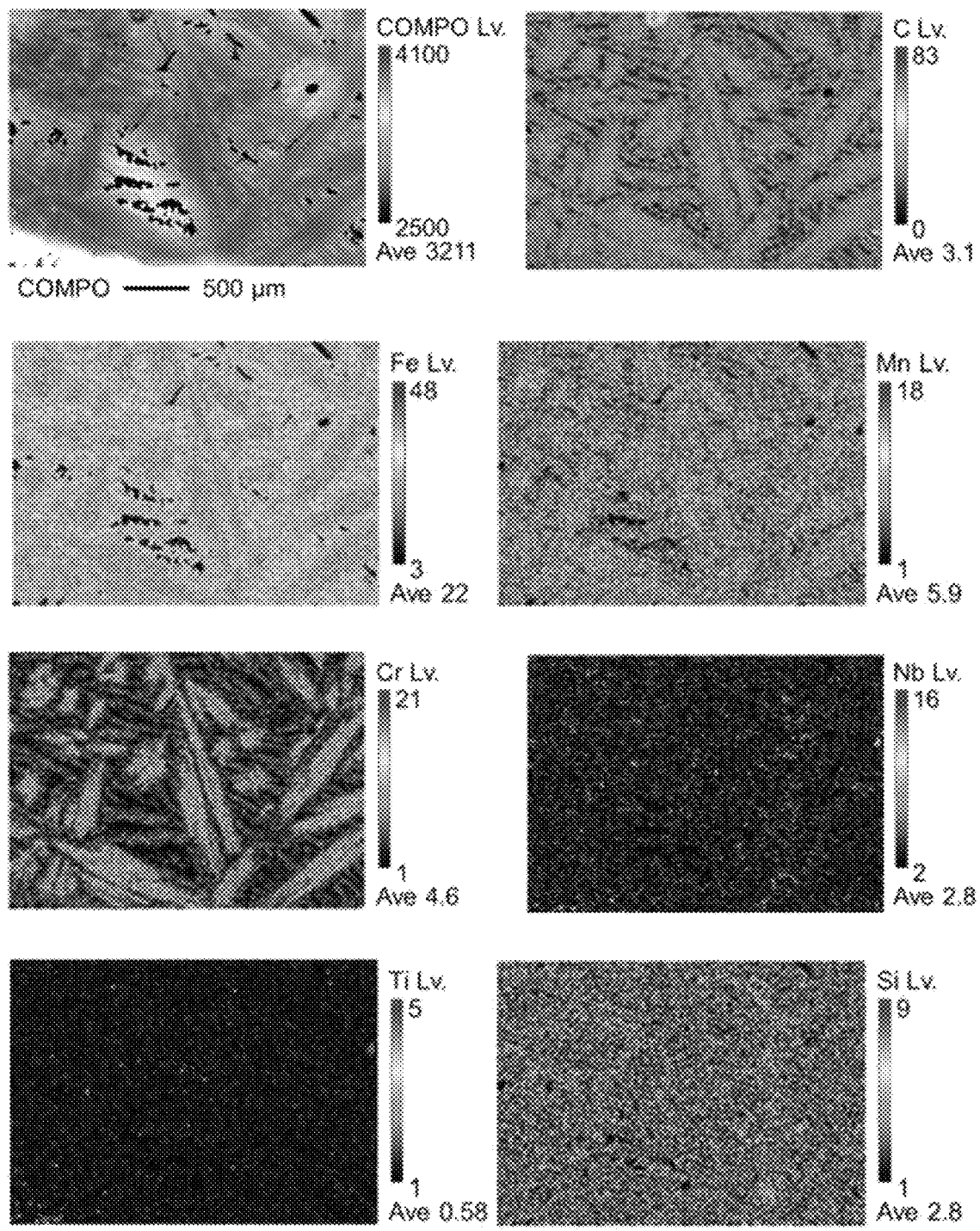
FIG. 17 displays electron probe microanalyzer (EPMA) phase mapping results of a metallic phase obtained after the carbothermic reduction, as described in Example 4 (e).

EPMA elemental mapping results of the metallic phase were obtained after the carbothermic reduction process (run 10) and the results are presented in FIG. 17. The results showed a substantially strong correlation between C, Mn, and Cr-rich regions where Fe concentration was relatively low. This indicates that Fe—Mn—C, Fe—Cr—C, and Fe—Mn—Cr—C alloy formation reaction took place, consuming a significant amount of the carbon present in the mixture. On the basis of the chemical composition of EAF slag, it was calculated that at a low level of $X_2$ (0.06 g of carbon per g of EAF slag), the FeO phase present in the EAF slag could not completely reduced to metallic Fe if more than 30 wt. % of Mn and Cr participate in the carbide formation reaction. However, this reaction could not affect the FeO reduction rate when $X_2$ was at mid-level (0.09 g of carbon per g of EAF slag) and high level (0.12 g of carbon per g of EAF slag).

The negative impact of $X_3$ can be explained by the basicity of the slag. The quaternary basicity (R) was calculated, based on Equation 23:

$$R = (\text{wt \%}_{CaO} + \text{wt \%}_{MgO})/(\text{wt \%}_{SiO_2} + \text{wt \%}_{Al_2O_3}) \quad [\text{eq. 23}]$$

When no fluxing agent was added, the slag phase obtained after the carbothermic reduction process has a substantially excessive basicity (R=2.584) because of the high contents of basic oxides in the EAF slag. This substantially excessive basicity can increase the melting temperature of EAF slag, which results in solid precipitation, i.e. CaO and MgO, and high apparent viscosity of the EAF slag. Therefore, metallic iron droplets can be more easily entrapped in the slag. The fluxing agents used in this process is either acidic ($SiO_2$) or amphoteric ($Al_2O_3$). Given the basic conditions and low alumina content (<15 wt %) in the system, $Al_2O_3$ is highly likely to act as an acidic oxide. Adding these acidic fluxing agents could, for example, decrease the basicity and the liquidus point of the EAF slag, leading to the clear separation between the metallic phase and slag phase. Therefore, the Fe content in the slag phase decreases in the presence of $SiO_2$ or $Al_2O_3$. To verify these explanations, the carbothermic reduction of EAF slag samples with/without a fluxing agent ($SiO_2$ or $Al_2O_3$) at a carbon-to-slag mass ratio of 0.09 g/$g_{EAFS}$ (0 level) was simulated using FactSage software and the results confirmed that the liquidus point of the slag significantly decreases when either $SiO_2$ or $Al_2O_3$ was added as a fluxing agent.

The concentration of other elements in the slag phase showed a similar trend compared with that of Fe. However, flux type ($X_4$) showed the additional positive effect on the concentration of Nb and Mn. Nb and Mn concentration in the slag phase decreases when $SiO_2$ rather than $Al_2O_3$ is used as a fluxing agent (FIGS. 16 (b) and (d)). This can be attributed to the fact that $SiO_2$ is a stronger acidic oxide than $Al_2O_3$. The presence of $SiO_2$ contributes to lowering the liquidus of the EAF slag, enhancing the phase separation; $Al_2O_3$ has the same effect but to a lesser extent. Furthermore, it was captured that $X_2$ has a positive impact on the concentration of Mn in the slag phase, unlike other elements. This can be explained by the desulfurization of metal by Mn. As described in Example 4 (a), lignite coal was used as a reducing agent; this type of coal contains about 0.4 to 1.0 wt. % of sulfur, becoming the main source for sulfur. Substantially high sulfur content can make the metal product brittle, less weldable, and vulnerable to corrosion, it is desired to keep sulfur content below 0.015 wt. % (Schrama et al., Ironmaking & Steelmaking 44, no. 5 (2017): 333-343). MnO is one of the major desulfurizing agents along with CaO and MgO, utilized to transfer sulfur from the metal to the slag, following the reaction shown below (Equation 24):

$$FeS_{(metal)} + Mn_{(metal)} \rightarrow Fe_{(metal)} \rightarrow MnS_{(slag)} \quad [eq. 24]$$

When a greater amount of carbon (high level of $X_2$) is introduced into the system, more sulfur is introduced, reacts with Fe metal, and consequentially produces more FeS. Following Le Chatelier's principle, the desulfurization actively takes places by the formation of MnS, which reports to the slag phase.

The post-mortem characterization for the metallic phase obtained after the carbothermic reduction was carried out using XRD and EPMA analysis. The X-ray diffractogram indicated that the metallic phase was composed of Fe, $Fe_3C$, and C, confirming the clear separation between metallic phase and slag phase. The presence of niobium phosphides was observed with EPMA (a) Optimization and Validation of Carbothermic Reduction Process.

Based on the experimental results and factor effect coefficients, the empirical models were built to predict the concentration of Fe, Nb, Cr, Mn, and Ti in the slag phase. An empirical model for Fe concentration is shown in Equation 25:

$$\hat{y}_i = 6529 - 4665X_1 - 1805X_2 - 4411X_3 + 4727X_1X_3 \quad [eq. 25]$$

Two validation tests were performed to evaluate the predictability of the models. As presented in Table 14, the results showed that the models have high model accuracy for predicting the concentration of five elements (Fe, Nb, Cr, Mn, and Ti) in the slag phase (15.6 and 12.1% average absolute relative deviation (AARD) for each test set).

TABLE 14

Validation and optimization results of the carbothermic reduction process

| | Fe (mg/kg) | Nb (mg/kg) | Cr (mg/kg) | Mn (mg/kg) | Ti (mg/kg) |
|---|---|---|---|---|---|
| Val. 1 | 3264 | 0 | 506 | 6221 | 1979 |
| Val. 1 - Model | 3985 | −28 | 405 | 7132 | 1865 |
| Error (%) | 22.1 | N.A. | 19.9 | 14.7 | 5.8 |
| Val. 2 | 14348 | 342 | 2056 | 35311 | 3234 |
| Val. 2 - Model | 18527 | 311 | 2311 | 35014 | 3520 |
| Error (%) | 29.1 | 9.1 | 12.4 | 0.8 | 8.8 |
| Opt. | 1620 | 0 | 175 | 6803 | 2993 |
| Opt. - Model | −257 | −28 | −32 | 7266 | 3085 |
| Error (%) | N.A. | N.A. | N.A. | 6.8 | 3.1 |

The carbothermic reduction process was then optimized with to minimize the concentration of Fe in the slag phase. The optimized conditions were high levels of smelting temperature ($X_1$ 1600° C.) and carbon-to-slag mass ratio ($X_2$, 0.12 $g/g_{EAFS}$), and low levels of flux-to-slag mass ratio ($X_3$, 0 $g/g_{EAFS}$) and flux type ($X_4$, silica). The minimal amount of Fe in the slag phase at a concentration of 1620 mg/kg, along with the metallic Fe enriched with Mn, Cr, and Nb (about 70 wt. % Fe, about 4.14 wt. % C, about 17 wt. % Mn, about 7 wt. % Cr, and about 0.2 wt. % Nb) was obtained after smelting process under optimum conditions (Table 14). Table 15 shows the composition of feed EAF slag and that of metallic and slag phases obtained after the carbothermic reduction process under optimum conditions.

TABLE 15

Elemental composition of feed EAF slag and that of metallic and slag phases obtained after the carbothermic reduction under optimum conditions

| Elemental composition (wt. %) | EAF slag | Metallic phase | Slag phase |
|---|---|---|---|
| Nb | 0.033 | 0.186 | 0 |
| Ti | 0.186 | 0.189 | 0.299 |
| Fe | 24.29 | 70.18 | 0.162 |
| Ca | 17.25 | 0.161 | 30.19 |
| Mn | 5.501 | 17.25 | 0.68 |
| Mg | 5.502 | 0.009 | 11.74 |
| Al | 1.867 | 0.001 | 4.877 |
| Cr | 0.950 | 6.961 | 0.017 |
| Cu | 0.030 | 0.036 | 0.002 |
| Sr | 0.034 | 0.001 | 0.063 |
| Ni | 0.030 | 0.026 | 0 |
| Na | 0.118 | 0 | 0 |
| C | 0.701 | 5.010 | 0.020 |
| S | 0.0803 | 0.00095 | 0.0206 |

(a) Acid baking water leaching results and characterization of Fe-depleted slag

Figure 18:
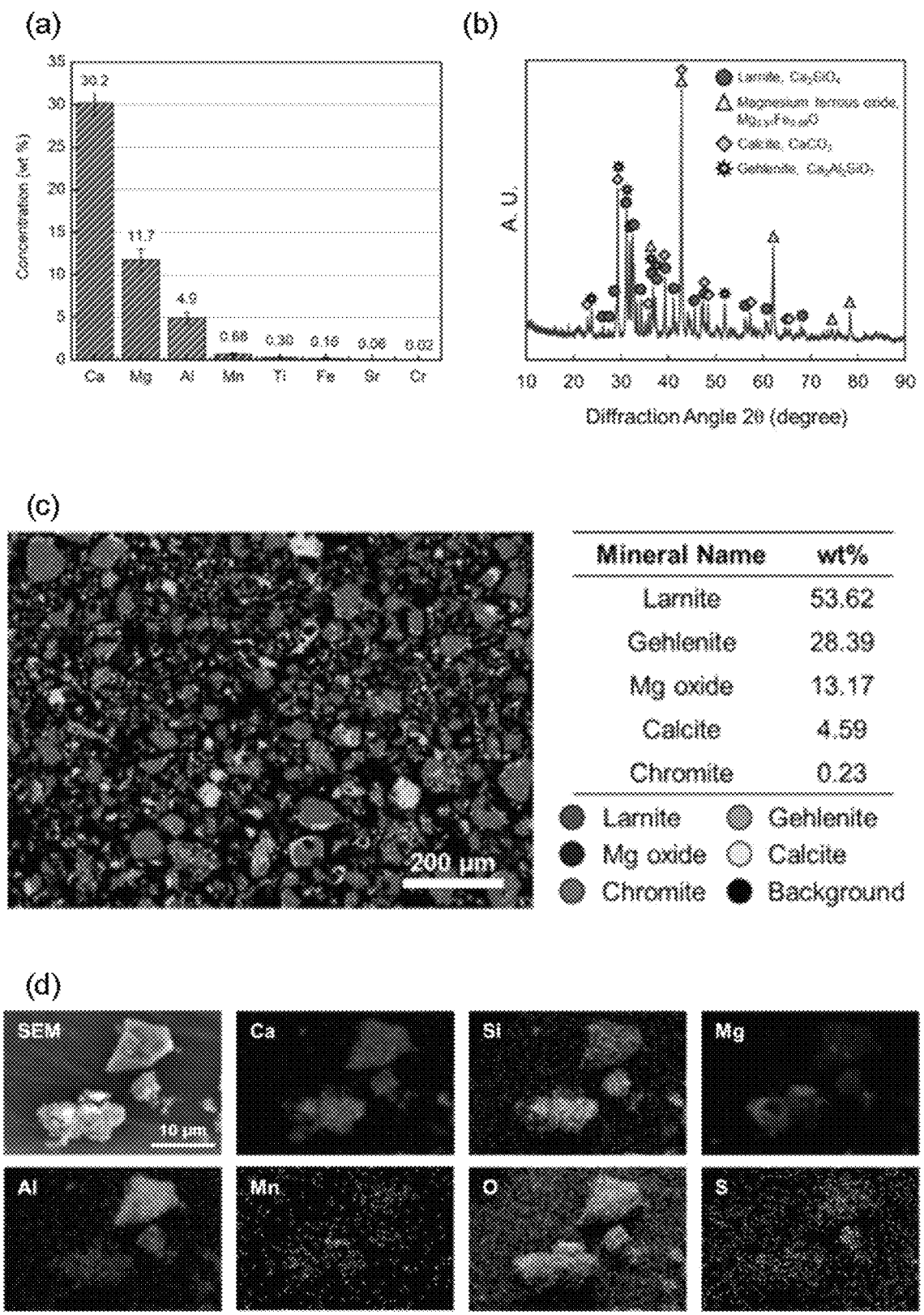
FIG. 18 displays the characterization results of a Fe-depleted slag, showing graphs in (a) of the ICP-OES results indicating elemental compositions, in (b) an X-ray powder diffractogram, in (c) EPMA phase mapping results, and in (d) a secondary electron image (scale bar represents 10 μm) and an EDS elemental mapping of Fe-depleted slag particles, as described in Example 4 (g).

The slag produced after the carbothermic reduction process under optimum conditions was thoroughly characterized using aqua regia digestion followed by ICP-OES, XRD, EPMA, and SEM-EDS (FIG. 18). Because the majority of Fe, Nb, Cr, Mn, and partially Ti reported into the metallic phase, the concentration of these elements in the slag phase was minimal.

FIG. 18 (a) shows the elemental composition of Fe-depleted slag. The slag sample is mainly composed of Ca (30.2 wt. %), Mg (11.7 wt. %), and Al (4.9 wt. %), while there are trace amounts of Mn (6803 mg/kg), Ti (2993 mg/kg), Fe (1620 mg/kg), Sr (628 mg/kg), and Cr (175 mg/kg). On the basis of the XRD results shown in FIG. 18 (b), the slag consists of four phases, namely larnite ($Ca_2SiO_4$), magnesium ferrous oxide ($Mg_{0.91}Fe_{0.09}O$), calcite ($CaCO_3$), and gehlenite ($Ca_2Al_2SiO_7$). The EPMA phase mapping results further confirm that the slag contains these four phases, along with a small portion of chromite which contributes to the trace amounts of Fe and Cr (FIG. 18 (c)). The EDS elemental mapping in FIG. 18 (d) shows that Ca and Si are highly associated with each other, confirming the presence of $Ca_2SiO_4$. Aluminum is also present in the Ca- and Si-rich regions in some cases, which is indicative of $Ca_2Al_2SiO_7$. Mg only matches with oxygen, confirming the presence of $Mg_{0.91}Fe_{0.09}O$. The SEM image shows that $Ca_2Al_2SiO_7$ has a sharp shape with a smooth surface, while $Ca_2SiO_4$ and $Mg_{0.91}Fe_{0.09}O$ have a layered structure (FIG. 18 (d)).

(a) Effect of Operating Parameters and Empirical Model Building

For the ABWL process, a response surface methodology was used to design the circumscribed central composite experimental matrix and to build a quadratic empirical extraction model for the target element. The detailed experimental conditions and corresponding extraction efficiency of Ti, Fe, Ca, Mn, Mg, Al, Cr, and Sr are shown in Table 16. The ordered factor effect coefficients with enough significance ($\alpha=0.05$) for the extraction efficiency of each element are presented in FIG. 19.

TABLE 16

Experimental runs with the corresponding operating conditions and extraction efficiency of elements of interest (Ti, Fe, Ca, Mn, Mg, Al, Cr, and Sr)

| Run # | $X_1$ (° C.) | $X_2$ (g/g) | $X_3$ (min) | $X_4$ (mL/g) | Extraction Efficiency (%) | | | | | | | |
|---|---|---|---|---|---|---|---|---|---|---|---|---|
| | | | | | Ti | Fe | Ca | Mn | Mg | Al | Cr | Sr |
| 1 | 200 | 1 | 60 | 6 | 0.1 | 11.5 | 1.9 | 78.6 | 83.0 | 0.1 | 0.9 | 7.5 |
| 2 | 200 | 1 | 60 | 14 | 0.2 | 0.0 | 4.4 | 56.1 | 74.4 | 0.1 | 0.2 | 14.0 |
| 3 | 200 | 1 | 120 | 6 | 0.1 | 0.0 | 1.9 | 45.6 | 76.4 | 0.0 | 0.4 | 6.9 |
| 4 | 200 | 1 | 120 | 14 | 0.2 | 5.4 | 4.8 | 75.8 | 77.2 | 0.1 | 0.5 | 14.4 |
| 5 | 200 | 2 | 60 | 6 | 81.4 | 100.0 | 3.4 | 100.0 | 100.0 | 100.0 | 100.0 | 12.3 |
| 6 | 200 | 2 | 60 | 14 | 82.5 | 100.0 | 8.5 | 100.0 | 99.2 | 100.0 | 100.0 | 20.1 |
| 7 | 200 | 2 | 120 | 6 | 85.4 | 100.0 | 3.6 | 100.0 | 100.0 | 100.0 | 100.0 | 10.5 |
| 8 | 200 | 2 | 120 | 14 | 86.1 | 100.0 | 8.3 | 100.0 | 100.0 | 100.0 | 100.0 | 17.4 |
| 9 | 400 | 1 | 60 | 6 | 0.1 | 0.0 | 1.8 | 31.6 | 68.8 | 0.1 | 0.3 | 6.1 |
| 10 | 400 | 1 | 60 | 14 | 0.1 | 0.0 | 4.0 | 22.0 | 66.9 | 0.2 | 0.0 | 10.1 |
| 11 | 400 | 1 | 120 | 6 | 0.1 | 0.0 | 1.3 | 29.5 | 62.9 | 0.1 | 0.3 | 5.1 |
| 12 | 400 | 1 | 120 | 14 | 0.1 | 0.0 | 3.2 | 20.3 | 57.9 | 0.2 | 0.0 | 9.2 |
| 13 | 400 | 2 | 60 | 6 | 4.0 | 70.0 | 2.3 | 89.7 | 96.0 | 70.8 | 53.6 | 7.6 |
| 14 | 400 | 2 | 60 | 14 | 1.1 | 48.3 | 5.1 | 89.8 | 95.8 | 57.5 | 32.9 | 12.6 |
| 15 | 400 | 2 | 120 | 6 | 4.8 | 54.5 | 2.1 | 79.2 | 83.0 | 58.0 | 41.2 | 7.1 |
| 16 | 400 | 2 | 120 | 14 | 0.9 | 47.0 | 4.4 | 78.3 | 80.9 | 43.3 | 20.5 | 11.5 |
| 17 centerpoint | 300 | 1.5 | 90 | 10 | 0.2 | 87.4 | 3.5 | 56.2 | 96.8 | 4.2 | 1.4 | 11.5 |
| 18 centerpoint | 300 | 1.5 | 90 | 10 | 0.1 | 74.3 | 3.1 | 48.8 | 88.3 | 2.8 | 1.0 | 10.2 |
| 19 centerpoint | 300 | 1.5 | 90 | 10 | 0.2 | 67.8 | 3.2 | 47.8 | 90.4 | 8.1 | 2.3 | 9.6 |
| 20 centerpoint | 300 | 1.5 | 90 | 10 | 0.2 | 64.1 | 3.1 | 46.4 | 88.4 | 11.1 | 3.4 | 9.8 |
| 21 | 500 | 1.5 | 90 | 10 | 0.1 | 31.2 | 3.3 | 73.1 | 97.5 | 0.2 | 0.7 | 11.6 |
| 22 | 100 | 1.5 | 90 | 10 | 0.9 | 66.5 | 4.6 | 90.0 | 96.0 | 77.1 | 30.7 | 21.3 |
| 23 | 300 | 2.5 | 90 | 10 | 60.3 | 100.0 | 3.1 | 81.3 | 64.8 | 61.0 | 100.0 | 11.6 |
| 24 | 300 | 0.5 | 90 | 10 | 0.1 | 0.0 | 2.1 | 0.1 | 8.3 | 0.2 | 0.0 | 4.7 |
| 25 | 300 | 1.5 | 150 | 10 | 0.7 | 68.3 | 2.3 | 78.1 | 66.7 | 32.7 | 20.5 | 8.6 |
| 26 | 300 | 1.5 | 30 | 10 | 1.5 | 99.7 | 2.7 | 74.5 | 65.5 | 44.7 | 35.6 | 9.8 |
| 27 | 300 | 1.5 | 90 | 18 | 0.3 | 62.8 | 3.9 | 43.8 | 66.9 | 6.6 | 2.2 | 11.0 |
| 28 | 300 | 1.5 | 90 | 2 | 0.0 | 0.0 | 0.5 | 0.0 | 72.9 | 8.3 | 0.0 | 0.0 |

Figure 19:
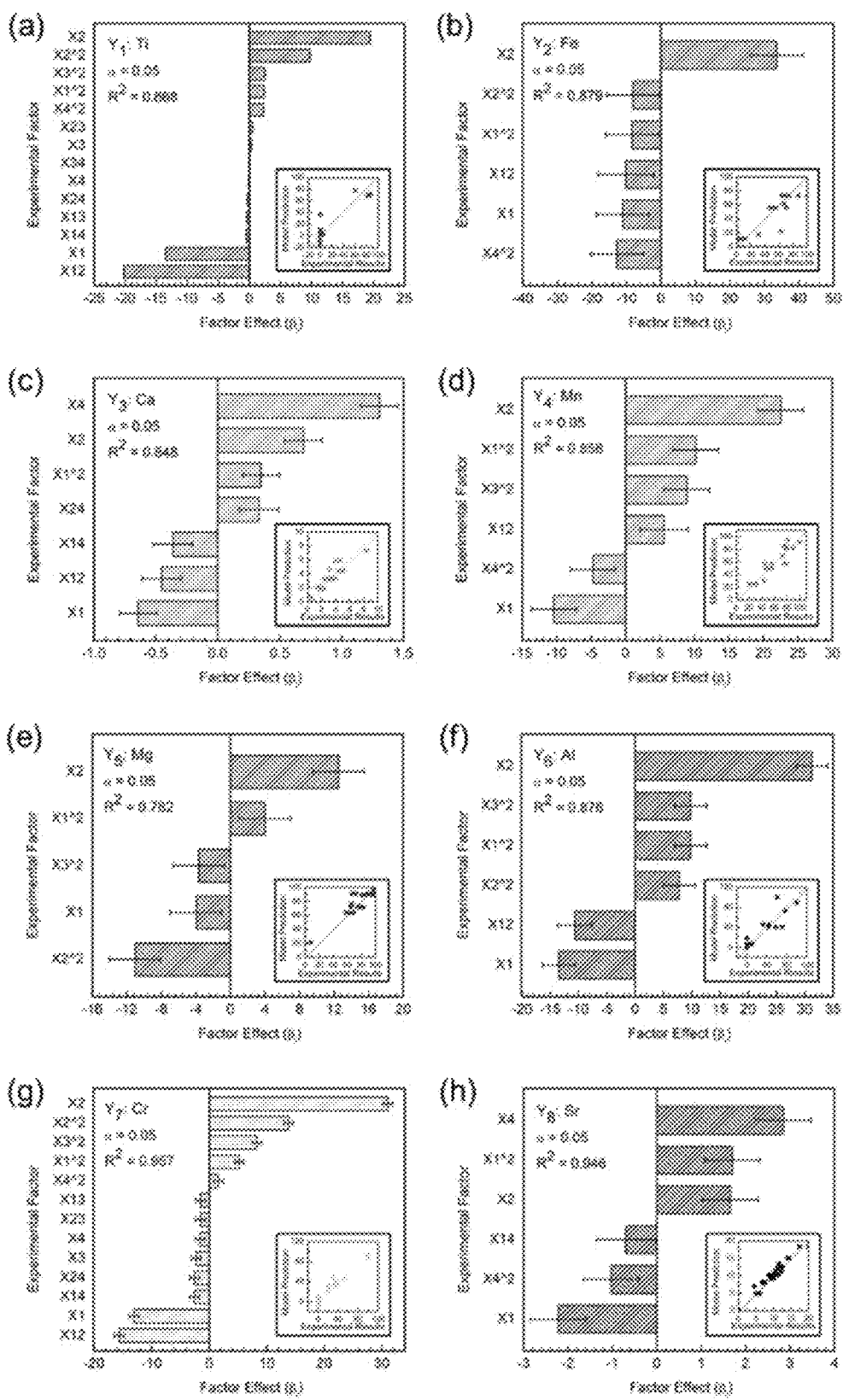
FIG. 19 is a graph of the factor effect coefficients for an empirical extraction model, showing in (a) results for Ti, in (b) results for Fe, in (c) results for Ca, in (d) results for Mn, in (e) results for Mg, in (f) results for Al, in (g) results for Cr, and in (h) results for Sr, as described in Example 4 (h). The inset graphs show the correlation between the predicted results from the empirical models and the experimental results.

As can be seen in FIG. 19, the acid-to-slag mass ratio ($X_2$) showed a significant positive impact on the extraction of all elements. This may suggest that $H_2SO_4$ is a limiting reagent for the digestion reaction. It was calculated that at 0 level of acid-to-slag ratio (1.5 g/g), there is an equivalent amount of $H_2SO_4$ which can completely react with slag samples in the system; thus, the digestion reaction was not fully taken place at lower levels of acid ratio (0.5 g/g and 1 g/g).

Unlike other elements, Ca and Sr were also positively affected by water-to-slag ratio ($X_4$) (FIGS. 19 (c) and 19 (h)). This may be attributed to the low solubility of $CaSO_4$ and $SrSO_4$ in water. The solubility of $CaSO_4$ and $SrSO_4$ in water is 2.00 g/L and 0.117 g/L, respectively, which is more than 100 times lower than that of common salts. Therefore, the higher water-to-slag ratio was required to increase the extraction of Ca and Sr.

The baking temperature ($X_1$) showed a negative effect on the extraction of all elements of interest. This effect can be explained, for example, by the phase transition and decomposition of $H_2SO_4$ at high baking temperature. At temperatures above 250° C., liquid $H_2SO_4$ starts vaporizing and decomposing into $SO_2$, $SO_3$, $H_2O$, and $O_2$ gases; thus, no liquid $H_2SO_4$ can be present at temperature higher than 350° C. This phenomenon leads to the loss of the substantial amounts of liquid $H_2SO_4$ highly reactive with slag particles. The baking temperature is potentially the main contributor to the mass loss, confirming the adverse impact of this factor. It was also revealed that higher level of acid-to-slag mass ratio ($X_2$), baking time ($X_3$), and the second-order interaction of baking temperature x acid-to-slag mass ratio ($X_{12}$) and baking temperature x baking time ($X_{13}$) accelerates the mass loss of the acid and slag mixture. This explains why $X_3$, $X_{12}$, and $X_{13}$ along with $X_1$ have negative impacts on extraction in most cases; although more mass loss occurred at higher levels of $X_2$, the higher absolute quantity of available $H_2SO_4$ molecules causes the positive impact of this factor on extraction.

Figure 20:
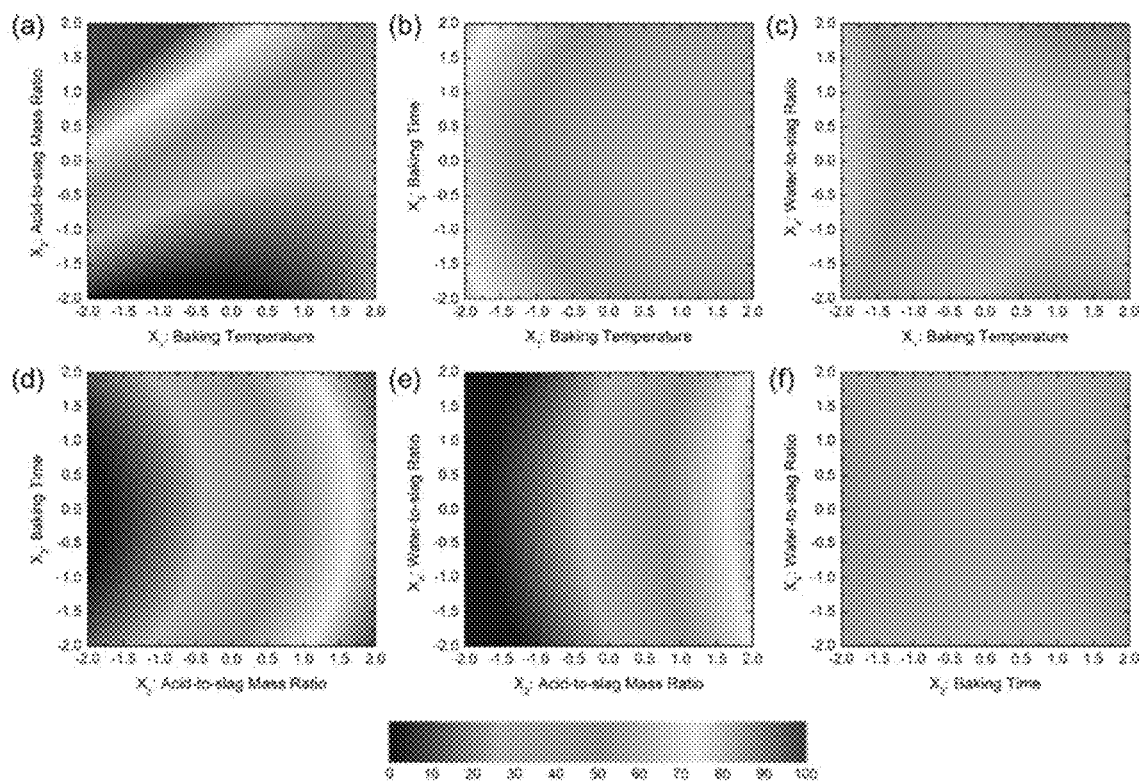
FIG. 20 displays 2-Dimensional contour plots showing interaction effects of two primary factors of the acid-baking water-leaching process on the average extraction efficiency, showing in (a) results for the baking temperature ($X_1$) and the acid-to-slag mass ratio ($X_2$); in (b) results for the baking temperature ($X_1$) and the baking time ($X_3$); in (c) results for the baking temperature ($X_1$) and the water-to-slag ratio ($X_4$); in (d) results for the acid-to-slag mass ratio ($X_2$) and the baking time ($X_3$); in (e) results for the acid-to-slag mass ratio ($X_2$) and the water-to-slag ratio ($X_4$); and in (f) results for the baking time ($X_3$) and the water-to-slag ratio ($X_4$), as described in Example 4 (h).

FIG. 20 shows the 2-D contour plots that visualize the interaction effects of two primary factors on the average extraction efficiency of all elements except Ca. The extraction efficiency of Ca was not taken into account as this process was designed to recover Ca as a gypsum ($CaSO_4 \cdot 2H_2O$) in the residue. As can be seen, the acid-to-slag mass ratio ($X_2$) plays an important role in increasing the overall extraction efficiency while the other factors do not significantly affect the extraction.

(a) Optimization of Acid Baking Water Leaching Process

On the basis of the factor effect coefficients obtained after design of experiments tests, the ABWL process was optimized for maximizing the extraction of Ti, Fe, Mn, Mg, Al, Cr, and Sr. Calcium extraction efficiency was not taken into account for the process optimization as Ca was recovered as gypsum ($CaSO_4 \cdot 2H_2O$) in the residue.

Figure 21:
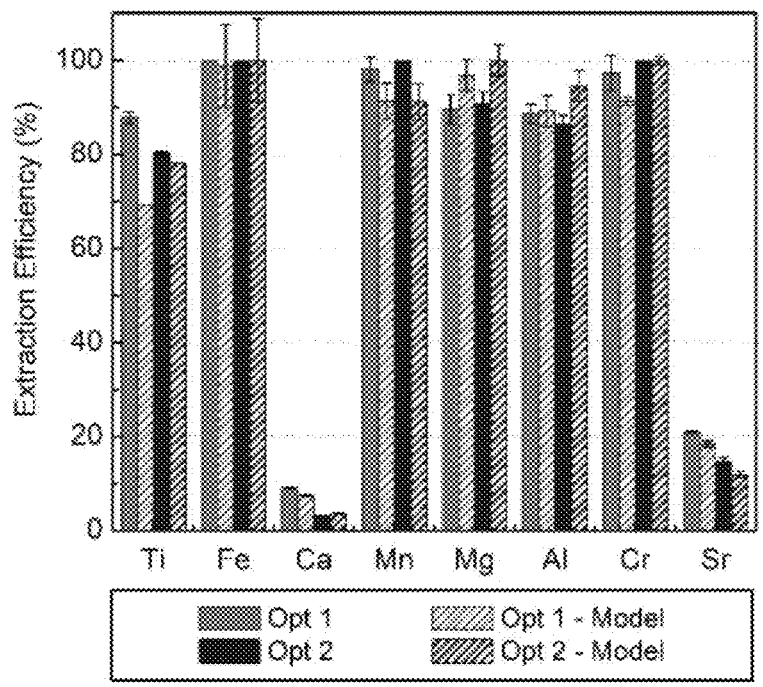
FIG. 21 is a graph of the predicted and actual extraction efficiency of Ti, Fe, Ca, Mn, Mg, Al, Cr, and Sr, as described in Example 4 (i).

A response surface methodology enables to explore a wider range of response surface as long as the Euclidian distance is kept constant. Therefore, unlike a fractional factorial design methodology, the optimized factor levels are not limited to −1 and 1 but can be any numbers. However, it should also be noted that the predicted extraction efficiency can exceed 100% under certain conditions while the actual efficiency cannot; thus, extraction efficiency ≤100% was added as a limiting condition for process optimization. Two optimized conditions were then determined with and without limitations on factor level to be limited to −1 and 1. FIG. 21 shows the optimization results (i.e., the extraction efficiency) of the acid-baking water leaching-process The results showed that more than 80% of extraction efficiency was achieved for almost all elements except Ca and Sr regardless of the limitations on factor level. The low efficiency of Ca and Sr can be attributed to their low solubility in water.

The invention claimed is:

1. A method for recovering at least one a target metal from electric arc furnace or basic oxygen furnace iron or steel slag, the method comprising the steps of:
mixing particles of the iron or steel slag, at least one a reducing agent in a reducing agent-to-iron or steel slag mass ratio in the range of from about 0.06 to about 0.12, and at least one fluxing agent in a fluxing agent-to-iron or steel slag particles mass ratio in the range of up to about 0.1 to produce a mixture;
wherein the fluxing agent is selected from alumina or a combination comprising silica and alumina;
smelting the mixture at a temperature of from about 1300° C. to about 1800° C. to form a metallic phase comprising iron as a first said target metal and a slag phase; and
separating the metallic phase comprising the first target metal from the slag phase to produce a metallic phase comprising the target metal and an iron-depleted slag.

2. The method of claim 1, wherein:
the reducing agent comprises a carbon source; or
the iron or steel slag particles have a size of less than about 200 mesh.

3. The method of claim 1, further comprising at least one of the following steps:
grinding the iron or steel slag particles prior to mixing;
classifying and separating the iron or steel slag particles by size into fractions;
drying the iron or steel slag particles prior to mixing;
pelletizing the mixture prior to the smelting step;
grinding the slag phase to obtain slag particles; and
reducing the iron metal content in the slag phase to produce an iron-depleted slag.

4. The method of claim 1, wherein the separating step is carried out by a mechanical separation method.

5. The method of claim 1, wherein the smelting step is carried out at a temperature in the range of from about 1500° C. to about 1600° C.

6. The method of claim 1, wherein the iron or steel slag particles and the reducing agent undergo an oxidation reduction (redox) reaction releasing chemical energy.

7. The method of claim 1, further comprising subjecting the iron-depleted slag to a pyro-hydrometallurgical process to recover a second said target metal.

8. The method of claim 7, wherein the pyro-hydrometallurgical process is a method for recovering the second target metal from the iron-depleted slag including:
mixing particles of the iron-depleted slag and an acid together in an acid-to-iron-depleted slag particles mass ratio in the range of from about 0.5 to about 5 to produce a further mixture;
baking the further mixture at a temperature of from about 100° C. to about 600° C. to digest the further mixture, to remove excess water and acid, and to produce pyrolysis gas and a dried mixture comprising at least one soluble metal salt;
leaching the dried mixture by adding water to obtain a density in the range of from about 50 g/L to about 250 g/L to produce a mixture comprising an aqueous leachate rich in said second target metal and solid residue; and
separating the aqueous leachate rich in said second target metal from the solid residue.

9. The method of claim 1, wherein the mixing step comprises mixing the at least one fluxing agent in a fluxing agent-to-iron or steel particles mass ratio of about 0.05.

10. The method of claim 1, wherein the mixing step comprises mixing the at least one fluxing agent in a fluxing agent-to-iron or steel particles mass ratio of about 0.1.

11. A method for recovering at least one target metal from electric arc furnace or basic oxygen furnace iron or steel slag, the method comprising the steps of:
mixing particles of the iron or steel slag, at least one a reducing agent in a reducing agent-to-iron or steel slag mass ratio in the range of from about 0.06 to about 0.12, and at least one fluxing agent in a fluxing agent-to-iron or steel slag particles mass ratio in the range of up to about 0.1 to produce a mixture; and
wherein the fluxing agent is selected from the group consisting of silica, alumina and a combination comprising silica and alumina;
smelting the mixture at a temperature of from about 1300° C. to about 1800° C. to form a metallic phase comprising iron as a first said target metal and a slag phase; and
separating the metallic phase comprising the first target metal from the slag phase to produce a metallic phase comprising the target metal and an iron-depleted slag, wherein:
the reducing agent comprises a carbon source; or
the iron or steel slag particles have a size of less than about 200 mesh,
and wherein the method further comprises at least one of the following steps:
grinding the iron or steel slag particles prior to mixing;
classifying and separating the iron or steel slag particles by size into fractions;
drying the iron or steel slag particles prior to mixing;
pelletizing the mixture prior to the smelting step;
grinding the slag phase to obtain slag particles; and
reducing the iron metal content in the slag phase to produce an iron-depleted slag.

12. The method of claim 11, wherein the separating step is carried out by a mechanical separation method.

13. The method of claim 11, wherein the smelting step is carried out at a temperature in the range of from about 1500° C. to about 1600° C.

14. The method of claim 11, wherein the iron or steel slag particles and the reducing agent undergo an oxidation reduction (redox) reaction releasing chemical energy.

15. The method of claim 11, further comprising subjecting the iron-depleted slag to a pyro-hydrometallurgical process to recover a second said target metal.

16. The method of claim 15, wherein the pyro-hydrometallurgical process is a method for recovering the second target metal from the iron-depleted slag including:
mixing particles of the iron-depleted slag and an acid together in an acid-to-iron-depleted slag particles mass ratio in the range of from about 0.5 to about 5 to produce a further mixture;
baking the further mixture at a temperature of from about 100° C. to about 600° C. to digest the further mixture, to remove excess water and acid, and to produce pyrolysis gas and a dried mixture comprising at least one soluble metal salt;
leaching the dried mixture by adding water to obtain a density in the range of from about 50 g/L to about 250 g/L to produce a mixture comprising an aqueous leachate rich in said second target metal and solid residue; and separating the aqueous leachate rich in said second target metal from the solid residue.

* * * * *